United States Patent [19]

May et al.

[11] Patent Number: 4,989,133

[45] Date of Patent: Jan. 29, 1991

[54] SYSTEM FOR EXECUTING, SCHEDULING, AND SELECTIVELY LINKING TIME DEPENDENT PROCESSES BASED UPON SCHEDULING TIME THEREOF

[75] Inventors: Michael D. May; Roger M. Shepherd, both of Bristol, United Kingdom

[73] Assignee: Inmos Limited, Bristol, England

[21] Appl. No.: 274,741

[22] Filed: Nov. 14, 1988

Related U.S. Application Data

[63] Continuation of Ser. No. 897,061, filed as PCT GB84/00413 on Nov. 30, 1984, published as WO86/03311 on Jun. 5, 1986, abandoned.

[51] Int. Cl.$^5$ ............................................. G06F 9/44
[52] U.S. Cl. ...................... 364/200; 364/281.3; 364/281.8; 364/271.3; 364/254.6
[58] Field of Search ... 364/200 MS File, 900 MS File

[56] References Cited

U.S. PATENT DOCUMENTS

| | | | |
|---|---|---|---|
| 3,614,745 | 9/1969 | Povdin et al. | 364/200 |
| 4,369,494 | 1/1983 | Bienvenu et al. | 364/200 |
| 4,497,023 | 1/1985 | Moorer | 364/200 |
| 4,704,678 | 11/1987 | May | 364/200 |
| 4,733,347 | 3/1988 | Fukuoka | 364/200 |
| 4,819,151 | 4/1988 | May | 364/200 |

*Primary Examiner*—Thomas C. Lee
*Attorney, Agent, or Firm*—Edward D. Manzo

[57] ABSTRACT

A microcomputer has a processor arranged to share its time between a plurality of concurrent processes. Each process may have means (69) for indicating a time when the process may be executed. The processes may form a linked list of processes (T, U. V) awaiting scheduling for execution. A location (90) is provided for indicating the beginning of a timer list of processes awaiting execution and means (68) is provided for indicating the end of a timer list. The microcomputer may provide more than one timer list of processes of different priority. Each process may include a number of alternative components one or more of which is time dependent.

51 Claims, 27 Drawing Sheets

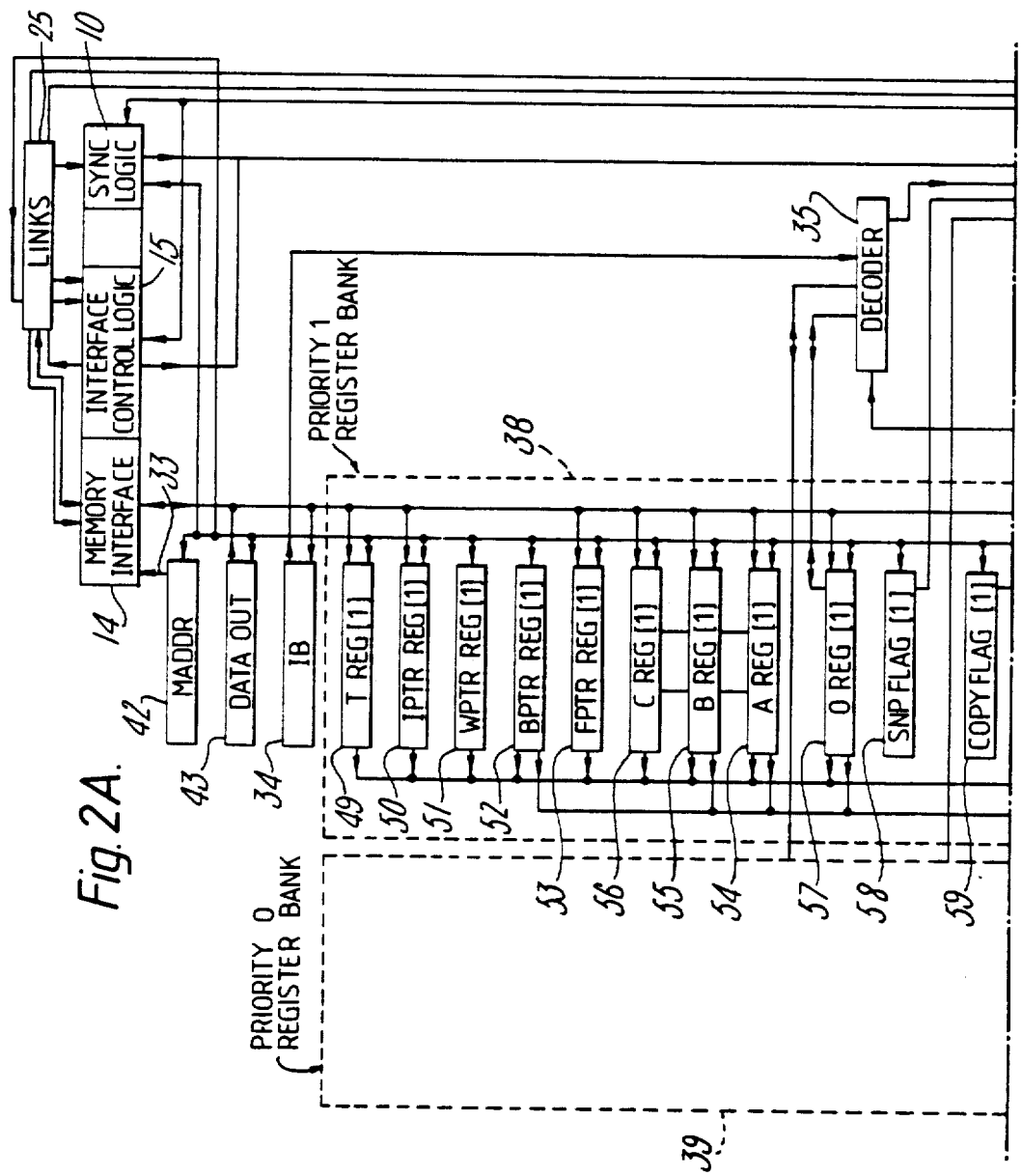

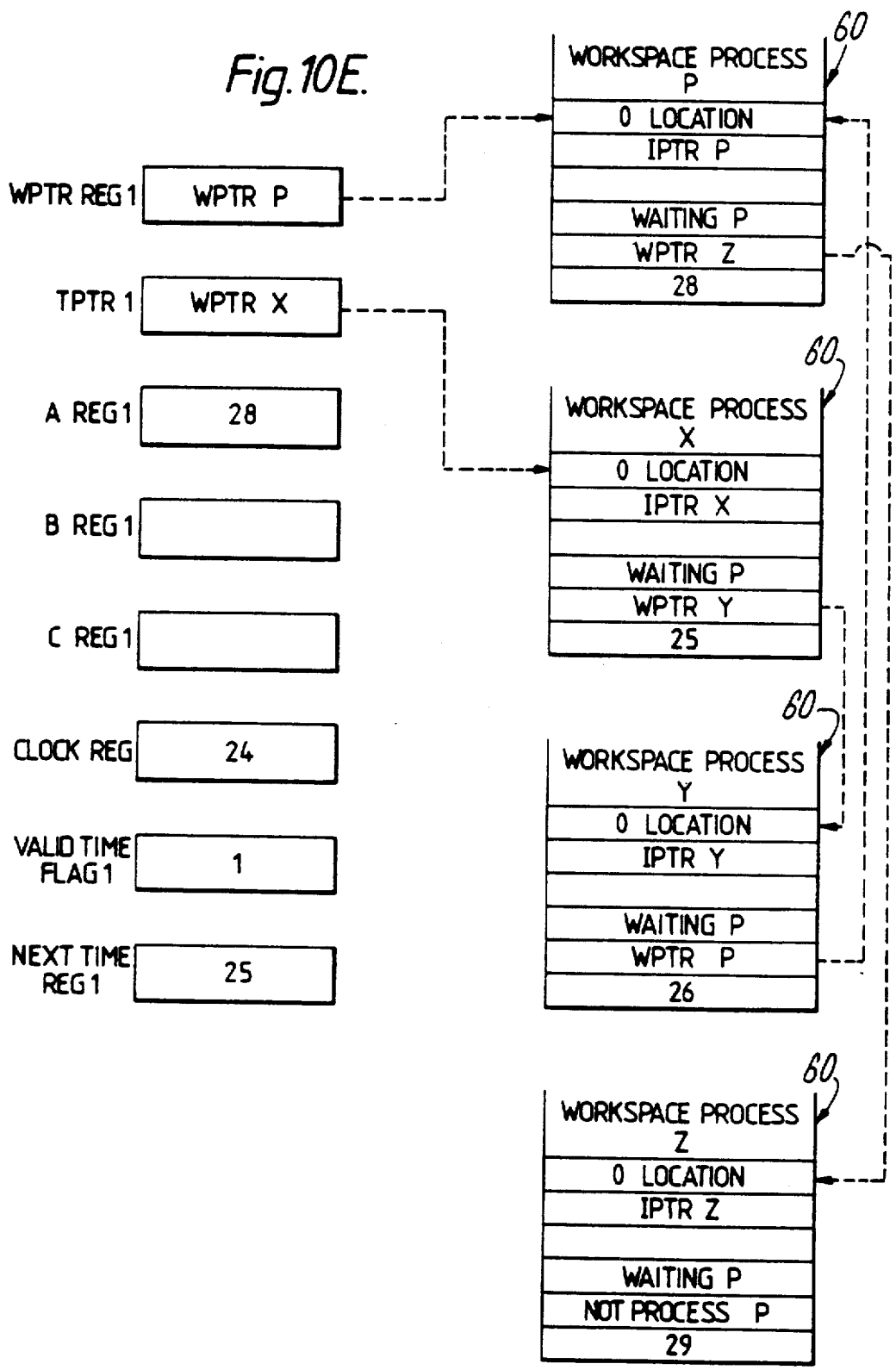

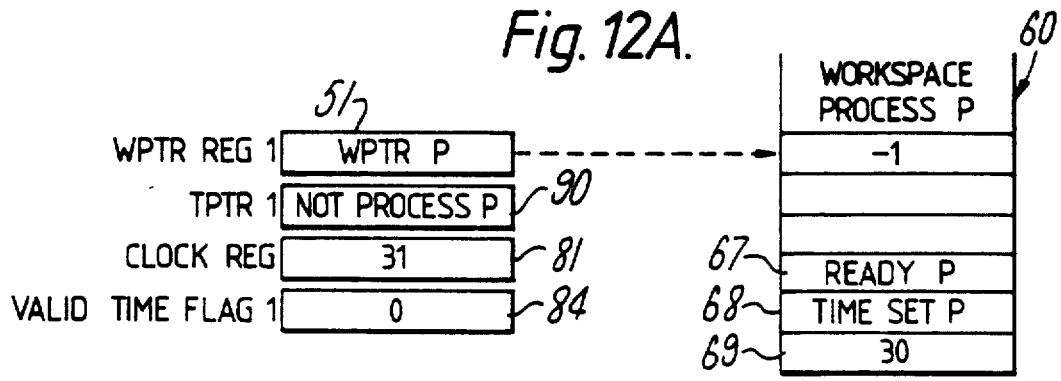
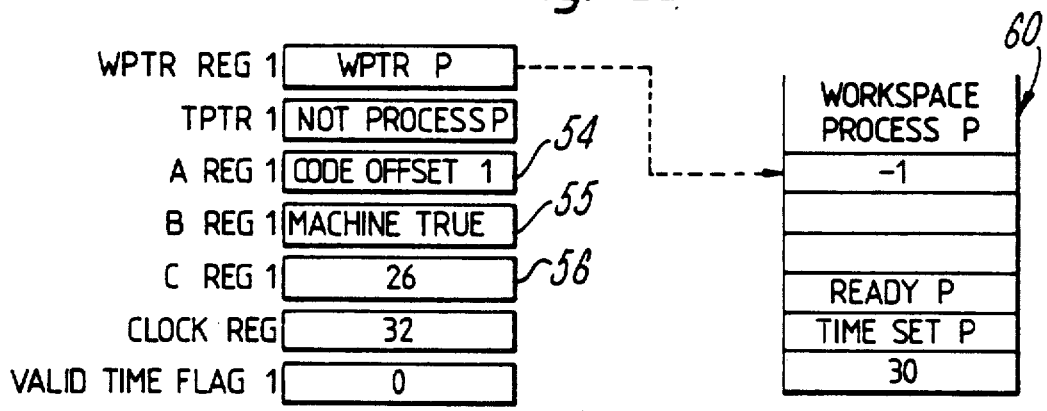
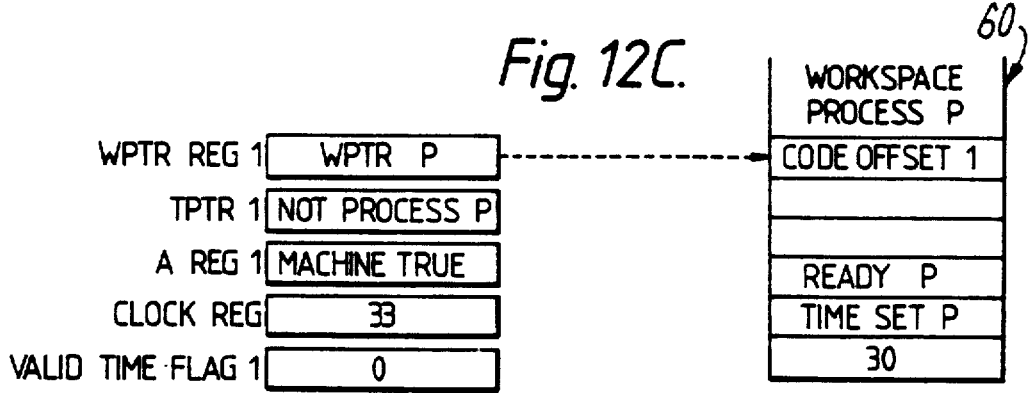

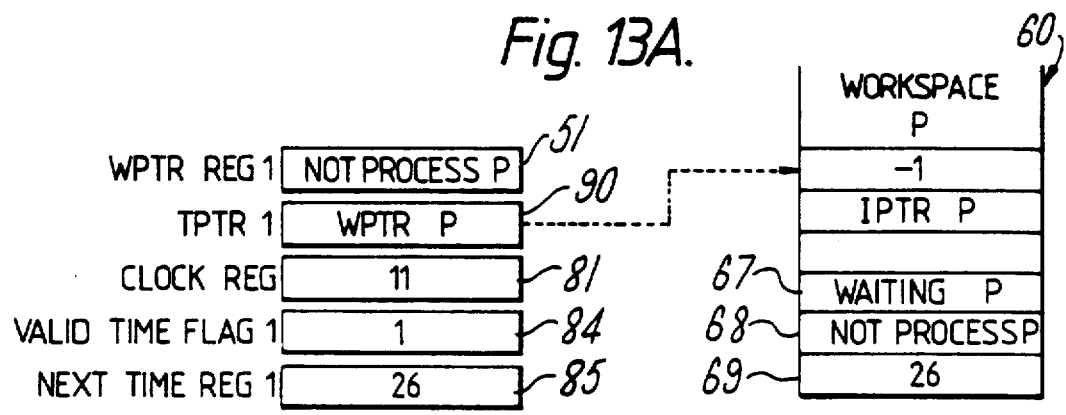
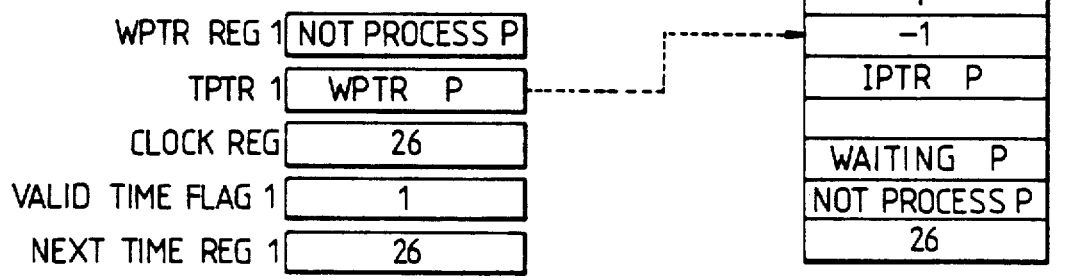
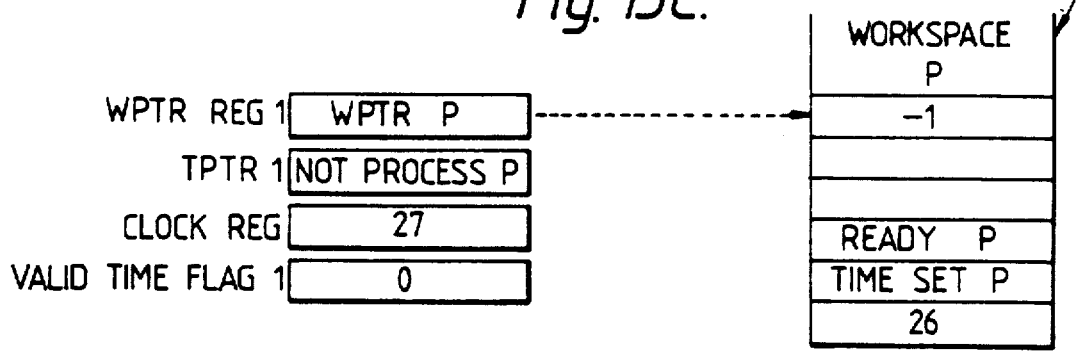

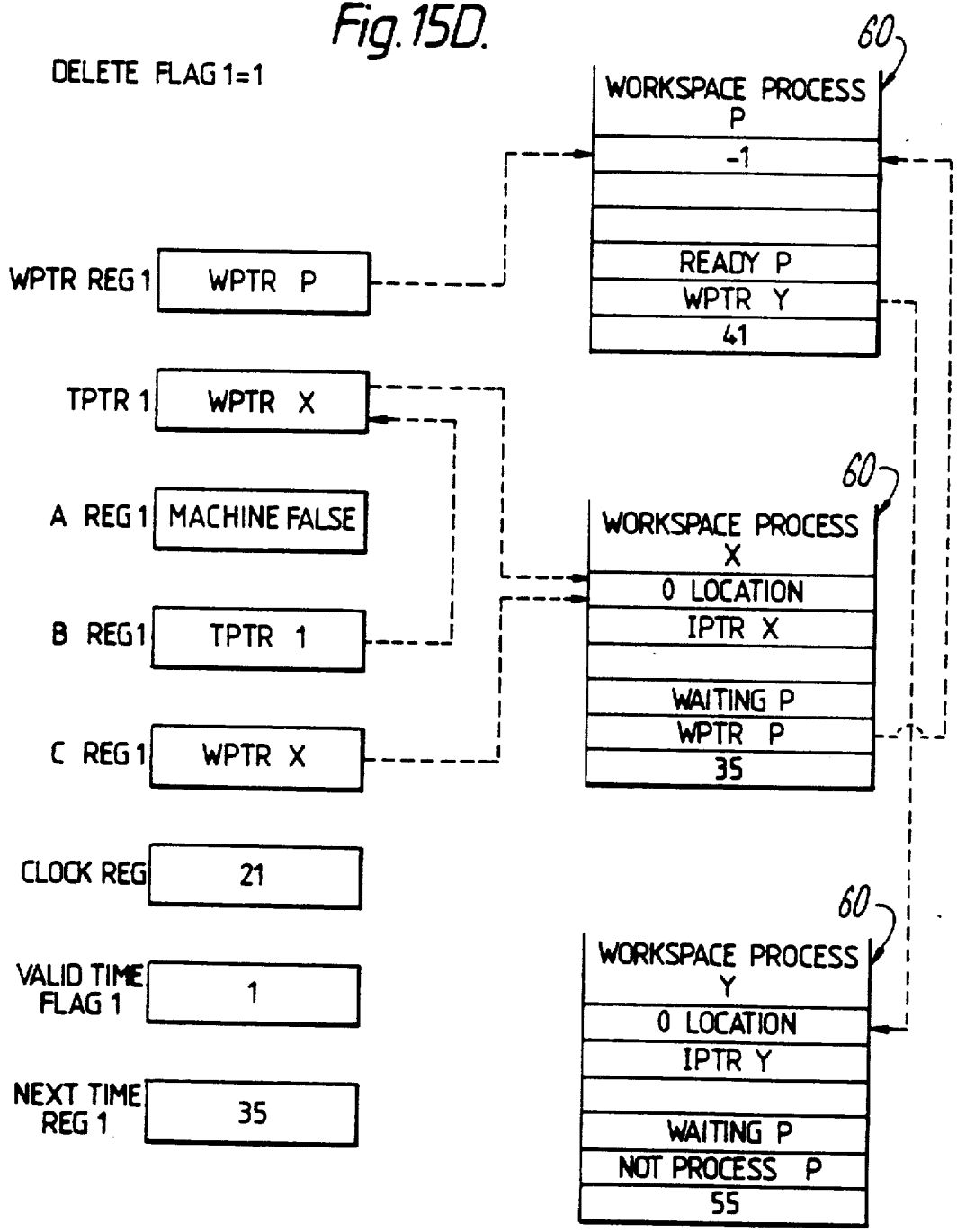

SYSTEM FOR EXECUTING, SCHEDULING, AND SELECTIVELY LINKING TIME DEPENDENT PROCESSES BASED UPON SCHEDULING TIME THEREOF

This is a continuation of co-pending application Ser. No. 06/897,061 filed as PCT GB84/00413 on Nov. 30, 1984, published as WO84/03311 on Jun. 5, 1986 now abandoned.

The invention relates to computers including microcomputers and is particularly applicable to microcomputers capable of executing time dependent processes.

BACKGROUND OF THE INVENTION

A microcomputer is described in our European Patent Specification No. 0110642 which includes scheduling means to permit the processor to share its processing time between a plurality of concurrent processes. A linked list of scheduled processes awaiting execution may be formed. A currently executing process may be descheduled and processes may be scheduled by adding to a scheduled list when required. This may for example arise in effecting message transmission between two processes where it is required that both processes be at corresponding stages in their program sequence when the message transmission occurs. However that patent specification does not describe the use of time dependent processes wherein scheduling of a process may be effected in accordance with a specfified time for the process.

OBJECTS OF THE INVENTION

It is an object of the present invention to provide an improved microcomputer for use in executing time dependent processes.

It is a further object of the present invention to provide an improved microcomputer with means for scheduling a plurality of concurrent processes so that the processor shares its processing time between a plurality of processes, together with means for responding to time dependent parameters for one or more processes.

It will be understood that the term microcomputer relates to small size computers generally based on integrated circuit devices but it does not impose any limit on how small a computer may be.

SUMMARY OF THE INVENTION

In the present invention, a processor in a computer system shares its time between a plurality of concurrent processes. At least some of the processes are allocated a scheduling time prior to which they are not to be executed. In order to schedule any time dependent process for execution, it is given a scheduling time so that the processor may execute the process any time after its scheduling time. The scheduling times in the preferred embodiment are absolute times rather than units of delay after some other event. Processes which have been allocated scheduling times are put into a time-ordered list (sometimes also called a "timer list") so that the process at the "top" of the list has the earliest time for execution and the process at the "end" or "bottom" of the list has the latest scheduling time. In between, the processes are arranged in a time-ordered manner so that each process can be taken off the top of the list in turn. When any process has to be added to the list by being given a scheduling time, it is slotted into the list at a time-ordered position so that its scheduling time follows that of the immediately preceding process and is ahead of the immediately following process. This system allows efficient operation of a computer system so that a processor can efficiently handle a plurality of concurrent processes while allowing time control so that no process is executed prior to its allocated scheduling time.

Preferably, the computer system, in addition to maintaining a time-ordered list, also maintains a list of scheduled processes. In the preferred embodiment, those processes which are on the time-ordered list await scheduling after their respective scheduling times have occurred. The preferred embodiment of this invention notes the occurrences and takes the process from the time-ordered list once its scheduling time has occurred so that the process is scheduled in the list of scheduled processes (sometimes called a "scheduled list") and will be executed in due course.

The preferred embodiment also includes a storage location which indicates the process in the time-oriented list which has the earliest scheduling time. This storage location may comprise an addressable memory location.

According to the preferred embodiment, each process is assigned a respective workspace which is a set of addressable memory locations. This workspace includes first locations for recording variables associated with the process. Preferably, a processor register is employed to hold a workspace pointer identifying an address of the workspace for the process which is currently being executed, and that process thus is called the "current process."

Preferably, according to this invention, the workspaces are used to form two linked lists. One linked list indicates those processes which have been scheduled for execution. The other linked list consists of the time-ordered list described supra. Preferably the linked list of scheduled processes is formed by an addressable memory location at a prescribed location at each of the several workspaces corresponding to the processes on the scheduled list. Preferably the linked list of time-ordered processes is formed by a different memory location at each of the workspaces of processes on the time-ordered list.

Thus, according to the preferred embodiment, any given scheduled process will have, at a prescribed memory location in its workspace, an indication of the next process scheduled for execution if one exists. Similarly, any process which is on the time-ordered list will have at another prescribed memory location in the workspace an indication of the next process on the time-ordered list if one exists. Preferably, whichever process has the last scheduling time on the time-oriented list stores a special value at the link location. Another feature of the preferred embodiment of this invention is that the workspace for each process includes an addressable location for indicating the scheduling time of that process.

In the preferred embodiment, the microcomputer allocates different priorities to the processes. Thus, one group of processes may have first priority and another group may have second priority. Correspondingly, in the preferred embodiment, when there are such different priorities, there will also be time-ordered linked lists. A first such linked list includes processes having only first priority, whereas a second time-ordered linked list has processes of only second priority, and so on. Similarly, in the case where there are different priority processes, corresponding, separate lists of scheduled processes are maintained, with all the processes in one scheduled list having one priority and all the processes in another scheduled list having a second priority, and so on.

The present invention extends also to a network having a plurality of interconnected microcomputers, each as described supra. Each microcomputer includes communication channels provided by one or more communication links which are connected by dedicated connections to similar links on further devices so that message transmission with synchronization between concurrent processes on different microcomputers is permitted.

The microcomputer of the preferred embodiment is arranged to execute a process with a plurality of alternative time related components. Such a microcomputer also indicates the time associated with each component, tests the time associated with each component, and determines whether the earliest time associated with a component has yet occurred.

Still another feature of the preferred embodiment is that a time duration may be specified for the execution of a process. The microcomputer is responsive to this time duration and causes the processor to stop executing the current process after expiration of this time duration. It reschedules the process which has thus been terminated by adding it to a scheduled collection.

BRIEF DESCRIPTION OF THE DRAWINGS

An embodiment of the invention will now be described by way of example and with reference to the accompanying drawings in which:

FIGS. 10A to 10E illustrate a sequence for inserting a process into a timer list, FIGS. 12A to 12C illustrate a sequence of operations by a process selecting between one of a number of alternative times, one of which has already arrived, FIGS. 13A to 13F illustrate a sequence of operations for a process selecting between a number of alternative times, none of which has arrived when the process first attempts selection, FIGS. 15A to 15F illustrate a sequence of operations for a process selecting between the alternative of an input through a message channel or the occurrence of a specified time in which the channel is not ready to input a message nor has the time occurred when the process attempts to select one of the alternatives.

DESCRIPTION OF THE PREFERRED EMBODIMENT

Figure 1:
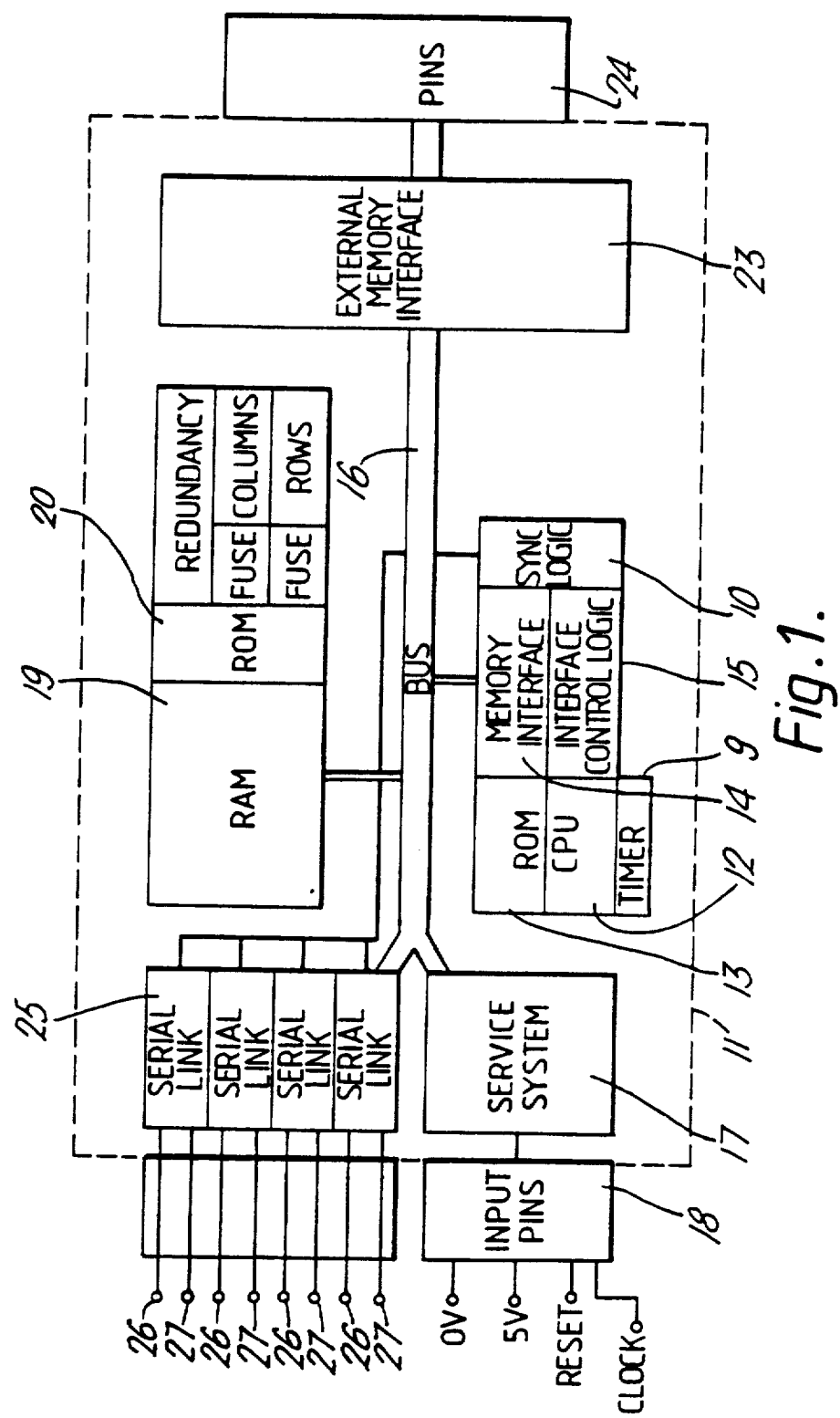
FIG. 1 is a block diagram showing the main features of a microcomputer embodying the present invention.
Figure 8:
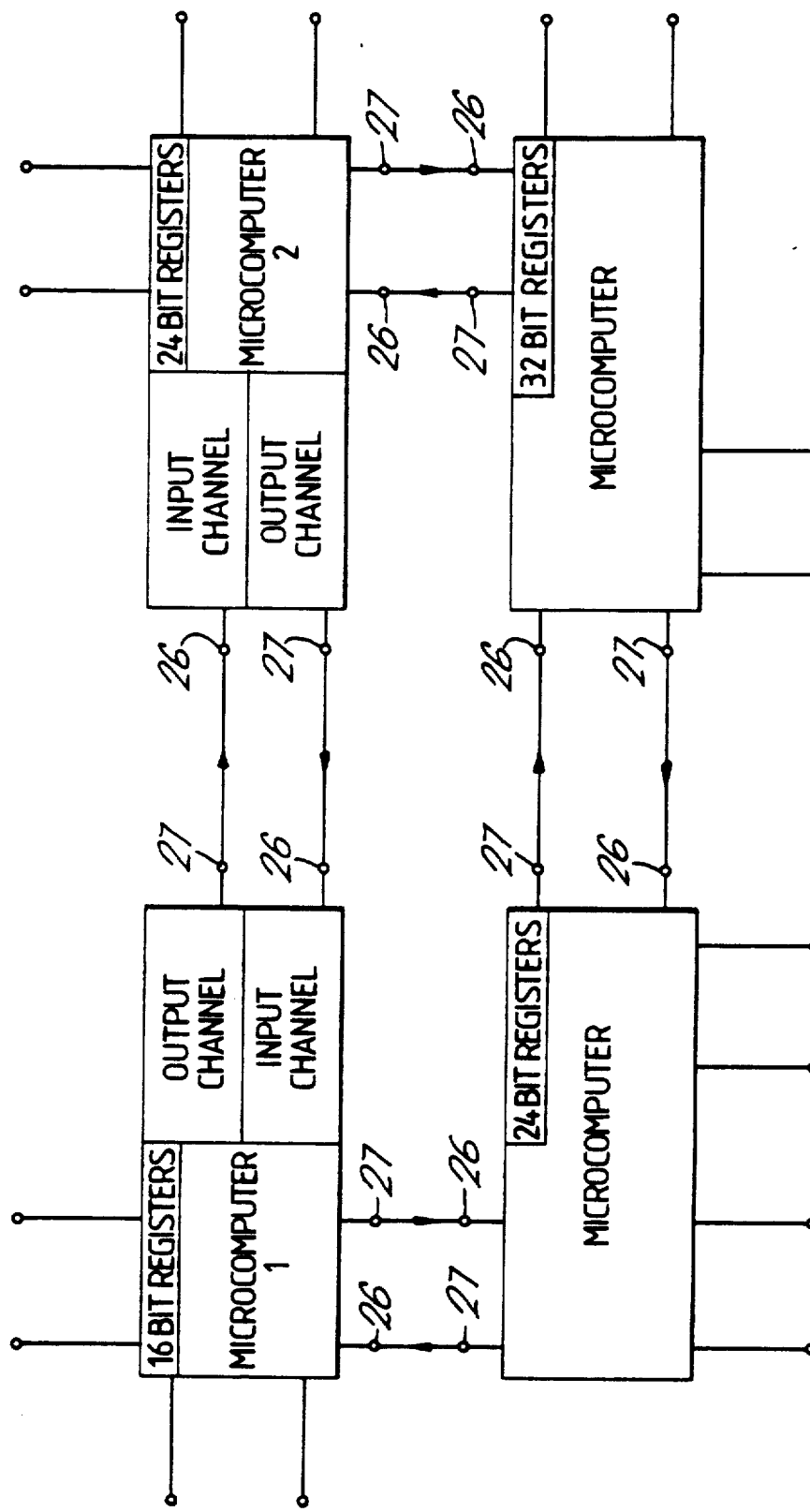
FIG. 8 illustrates a network of communicating microcomputers in accordance with the present invention, the microcomputers in the network having different wordlengths.

The microcomputer described in this example comprises an integrated circuit device in the form of a single silicon chip having both a processor and memory in the form of RAM as well as links to permit external communication. The main elements of the microcomputer are illustrated in FIG. 1 on a single silicon chip 11 using p-well complementary MOS technology. A central processing unit (CPU) 12 is provided with a timer 9 to allow time control of the execution of processes. It also includes some read-only memory (ROM) 13 and is coupled to a memory interface 14 controlled by interface control logic 15. The CPU 12 incorporates an arithmetic logic unit (ALU), registers and data paths illustrated more fully in FIG. 2. The CPU 12 and memory interface 14 are connected to a bus 16 which provides interconnection between the elements on the chip 11. A service system 17 is provided with a plurality of input pins 18. The microcomputer is provided with a random access memory (RAM) 19 and ROM 20 and the amount of memory on the chip is not less than 1K byte so that the processor 12 can be operated without external memory. Preferably the memory on the chip is at least 4K bytes. An external memory interface 23 is provided and connected to a plurality of pins 24 for connection to an optional external memory. To allow the microcomputer to be linked to other computers to form a network, a plurality of serial links 25 are provided having input and output pins 26 and 27 respectively. The input and output pins of one serial link may each be connected by its own single wire non-shared unidirectional connection to the corresponding output and input pins of a serial link on another microcomputer as shown in FIG. 8. Each serial link is connected to a synchronisation logic unit 10 comprising process scheduling logic.

This embodiment is a development of the microcomputer described in our copending PCT patent application No. PCTGB84/00379 and European Patent Application No. 84307586.2. To avoid unnecessary repetition of description, the full details of the construction and operation of that microcomputer will not be set out below but the description in the above mentioned patent applications is hereby incorporated herein by reference.

The present embodiment provides an improved form of Transputer (Trade Mark of INMOS International plc) microcomputer. It provides for timer control so that processes may be executed in dependence on timer data and timer lists of processes awaiting specified times before execution may be formed.

The overall arrangement of the microcomputer is generally similar to that described in the above mentioned patent applications. In the following description similar names will be given to those parts corresponding to the embodiment in the above mentioned patent applications. The memory provides a plurality of process workspaces having addressable locations which can be indicated by pointers. Message communication can be effected through channels which may comprise addressable memory locations in the case of process to process communication on the same microcomputer. To effect process to process communication between different microcomputers input and output channels are provided in serial links and these channels may also be addressed in a manner similar to the locations provided in the memory.

In order to implement the improvements discussed above, various modifications in the construction and operation of the microcomputer are necessary and the following description will be directed to those aspects where modifications are involved in order to effect those improvements.

As in the example of the above mentioned patent applications, the particular wordlength of the example described is 16 bits but it will be understood that other wordlengths such as 8, 16, 24, 32 or other wordlengths may be used. Furthermore, in the present case different wordlength microcomputers can be connected in the same network as shown in FIG. 8 so that they may communicate with each other regardless of their independent wordlength.

Each pointer is a single word and is treated as a two's complement signed value. That means that if the most significant bit in the pointer is a 1 the most signficant bit is taken as negative with all the remaining bits representing positive numbers. If the most significant bit is 0 then all bits in the pointer are taken as representing positive values. This enables the standard comparison functions to be used on pointer values in the same way that they are used on numerical values.

Certain values are never used as pointers as they are reserved to indicate that some special action is required.

In the following description, names are used to represent these and other values as follows:

| MostNeg | the most negative value (the most significant bit is one, and all other bits are zero) |
|---|---|
| MostPos | the most positive value (the most significant bit is zero, and all other bits are one) |
| MachineTRUE | 1 |
| MachineFALSE | 0 |
| NotProcess.p | MostNeg |
| Enabling.p | MostNeg + 1 |
| Waiting.p | MostNeg + 2 |
| Ready.p | MostNeg + 3 |
| TimeSet.p | MostNeg + 1 |
| TimeNotSet.p | MostNeg + 2 |

The special values for TimeSet.p and TimeNotSet.p are never used in the same locations as Enabling.p or Waiting.p so that no ambiguity arises from the dual use of the values MostNeg +1 and MostNeg +2.

As in the example of the above mentioned patent applications, each process has a workspace consisting of a vector of words in memory used to hold the local variables and temporary values manipulated by the process. A workspace pointer WPTR is used to point to a set location for the process workspace. Each process can be identified by a "process descriptor" of which the least significant bit indicates the priority of the process and the most significant 15 bits indicate the word in memory identifying the process workspace. In this example the microcomputer allocates one of two possible priorities to each process. A high priority process is given the designation Pri=0 and a low priority process has a designation Pri=1. It can therefore be seen that each process descriptor comprises a single word which is formed by taking the "bitwise OR" of the workspace pointer WPTR and the process priority Pri. Similarly the workspace pointer WPTR can be obtained from a process descriptor by forming the "bitwise AND" of the process descriptor and NOT 1. The priority of the process can be obtained by forming the "bitwise AND" of the process descriptor and 1.

CPU Data Paths and Registers

Figure 2B:
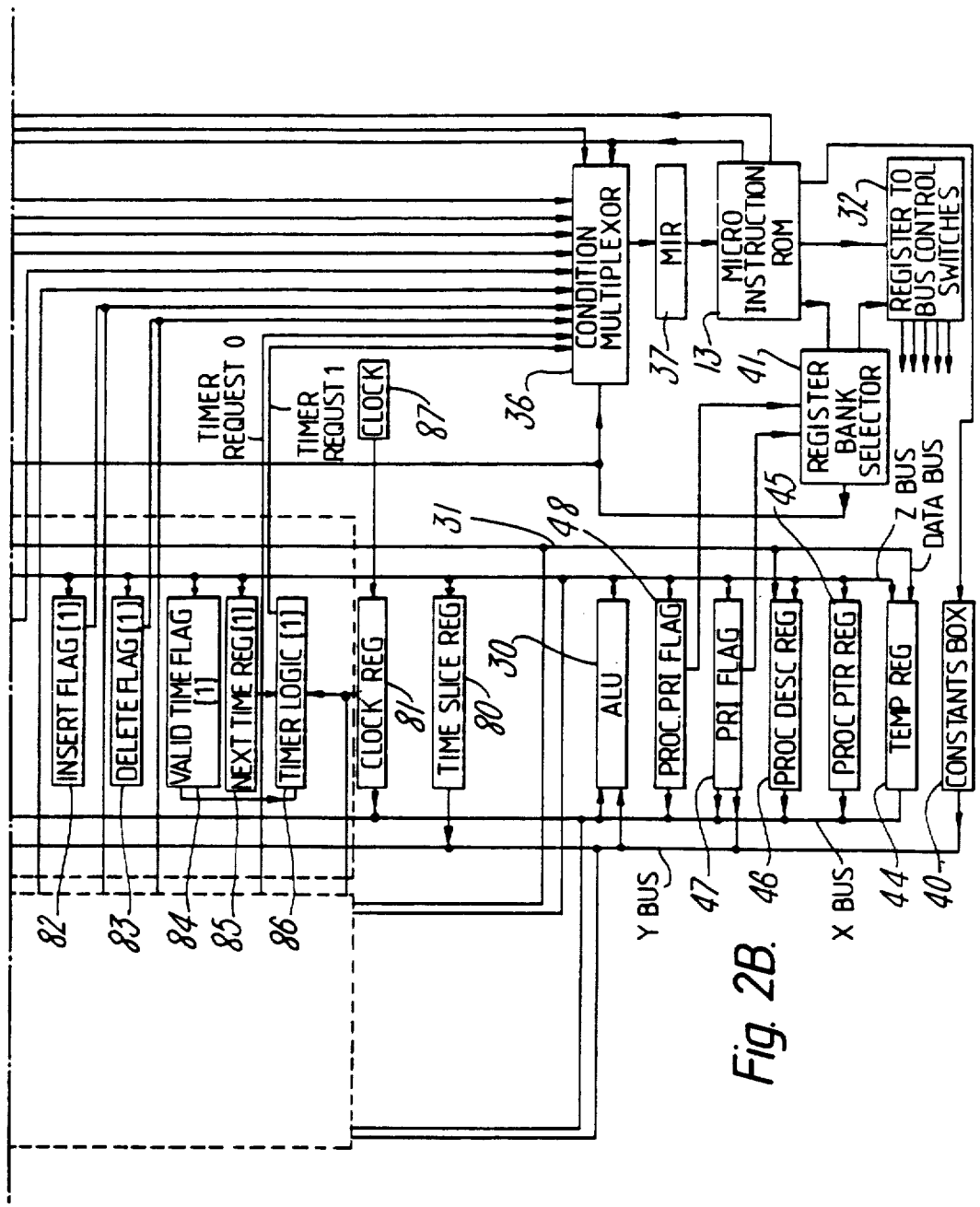
FIG. 2 is a block diagram of part of the microcomputer and for convenience has been split into two parts shown on FIGS. 2A and 2B, the Figure particularly illustrates the registers, data paths and arithmetic logic unit of the central processing unit as well as the interface between the central processing unit and the memory and communication links.

The central processing unit 12 and its operation will be more fully understood with reference to FIG. 2. For convenience this has been split into FIGS. 2A and 2B but it is to be understood that the diagrams of FIGS. 2A and 2B are joined together to form the register set and data paths.

The CPU 12 includes an arithmetic logic unit (ALU) 30 and a plurality of data registers connected to an X bus, Y bus, Z bus and bidirectional data bus 31. The operation of the registers and their interconnections with the buses is controlled by a plurality of switches diagrammatically represented at 32 and controlled by signals derived from a microinstruction program contained in the ROM 13. Communication between the CPU and the memory is effected via a unidirectional address path 33 leading to the memory interface 14 as well as the data bus 31.

As in the above mentioned patent applications, each instruction consists of 8 bits, 4 bits representing the required function of the instruction and 4 bits being allocated for data. Each instruction derived from the program sequence for the process is fed to an instruction buffer 34 and the instruction is decoded by a decoder 35. The output of the decoder is fed through a condition multiplexor 36 to a microinstruction register 37 used for addressing the microinstruction ROM 13. The operation of the instruction buffer 34, decoder 35, condition multiplexor 36, MIR 37, microinstruction ROM 13 and switches 32 are generally as described in the above mentioned patent applications, and in European Patent Specification No. 0110642.

As the present embodiment is arranged to deal with two sets of processes, those with priority 0 and those with priority 1, two register banks are provided. Register bank 38 is provided for the priority 1 processes and a similar register bank 39 is provided for the high priority 0 processes. Both register banks have a similar set of registers similarly connected to the X, Y, Z and data buses. For simplicity, the registers and their connections have only been shown in detail for register bank 38. In addition to the two register banks allocated to specific priorities, the CPU includes a constants box 40, a register bank selector 41 and a number of other registers indicated in FIGS. 2A and 2B which are common to both priority 0 and priority 1 processes. The registers are as follows:

| Abbreviation | Register |
|---|---|
| Common to both priority processes | |
| MADDR | Memory address register 42 containing the address of the memory location required. |
| DATAOUT | A register 43 for supplying data to the memory on the data bus 31. |
| IB | Instruction buffer 34 for receiving sequentially instructions from the memory. |
| TEMP REG | A temporary register 44. |
| PROCPTR REG | A register 45 for holding a process pointer (no priority indication). |
| PROCDESC REG | A register 46 for containing a process descriptor |
| PRIFLAG | A 1 bit register or flag 47 for indicating the priority 0 or 1 of the currently executing process. If the processor is not executing a process this is set to 1. |
| PROCPRIFLAG | A 1 bit register or flag 48 for indicating a process priority. |
| TIME SLICE REG | A register 80 for holding the time at which the current process must be temporarily stopped. |
| CLOCK REG | A register 81 for indicating the current time |
| Registers in Bank 38 for Priority 1 | |
| TREG | A temporary register 49. |
| IPTR REG | A register 50 which holds the instruction pointer (IPTR) of any process indicated by register 51 |
| WPTR REG | A register 51 for holding the workspace pointer (WPTR) of the current process or an interrupted process. |
| BPTR REG | A register 52 holding the workspace pointer of a process at the end of a list of priority 1 processes awaiting execution. |
| FPTR REG | A register 53 holding the workspace pointer of a process at the front of a list of priority 1 processes awaiting execution. |
| AREG | A first register 54 for holding an operand for the ALU 30 and arranged as a stack with registers 55 and 56. |
| BREG | A second register 55 forming part of the stack. |
| CREG | A register 56 forming a third register in the stack. |
| OREG | An operand register 57 for receiving the data derived from an instruction in the instruction buffer 34, and used as a temporary register. |
| SNPFLAG | A 1 bit register or flag 58 which when set to 1 indicates that the current process should be descheduled on completion of the current instruction. |
| COPYFLAG | A 1 bit register or flag 59 which when set to 1 indicates that the process is copying a block of data to or from memory. |
| INSERTFLAG | A 1 bit register or flag 82 which is set to 1 when the processor is inserting a process into a timer list. |
| DELETEFLAG | A 1 bit register or flag 83 which is set to 1 when the processor is deleting a process from a timer list. |
| VALIDTIMEFLAG | A 1 bit register or flag 84 which is set to 1 if there are any processes on the timer list of appropriate priority. |
| NEXTTIMEFLAG | A register 85 for holding the time at which the first process on the timer list of appropriate priority becomes ready for scheduling. |

The bank of registers 39 for priority 0 processes is the same as that already described for priority 1 processes. In the description that follows the suffix [1] indicates a register relevant to the priority 1 bank and the suffix [0] indicates that the register relates to the priority 0 bank. Where the priority is not known the suffix [Pri] indicates that a register of appropriate priority to the process is used.

The registers are generally of word length which in this case is 16 bits apart from the 1 bit flags 47, 48, 58, 59, 82, 83 and 84. The instruction buffer may be of 8 bit length if arranged to hold only 1 instruction at a time. The A, B and C register stack 54, 55 and 56 are the sources and destinations for most arithmetic and logical operations. They are organised as a stack.

In addition the registers and flags, each of the banks 38 and 39 includes TIMER LOGIC 86 arranged to receive inputs from the VALID TIME FLAG 84, the next TIME REG 85 and the CLOCK REG 81. The TIMER LOGIC 86 will be described more fully with reference to FIG. 3. The CLOCK REG 81 receives an input from a PROCESSOR CLOCK 87. The TIMER LOGIC 86 for each of the register banks constitutes the timer 9 of FIG. 1. The OREG 57 of both register banks 38 and 39 are connected to the decoder 35 so that for both priority processes that part of the instruction which is fed into the OREG register reaches the decoder for use in generating appropriate microinstructions. The SNP FLAG 58, COPY FLAG 59, INSERT FLAG 82, DELETE FLAG 83 and TIMER LOGIC 86 of both priority banks are also connected to the condition multiplexor 36 so that the microinstructions can take into account the setting of these flags and the logic output for either priority process in determining the next action to be effected by the processor at any time.

As the workspace pointer (WPTR) of a process is used as a base from which local variables of the process can be addressed, it is sometimes necessary to calculate offset values from the location indicated by the workspace pointer. The constants box 40 is connected to the Y bus and enables constant values to be placed on that bus under the control of the microinstruction ROM 13. These can be used in pointing to offset locations in a process workspace and providing time slice periods. In order to effect selection of one or other of the register banks 38 or 39, the register bank selector 41 has inputs from the PRI FLAG 47, the PROCPRI FLAG 48 and the microinstruction ROM 13. The output from the register bank selector is connected to the condition multiplexor 36, to the decoder 35 and to the switches 32. Depending on the output of the microinstruction ROM 13, the selector will chose the register bank indicated by the PRI FLAG 47 or the PROCPRI FLAG 48.

Figure 3:
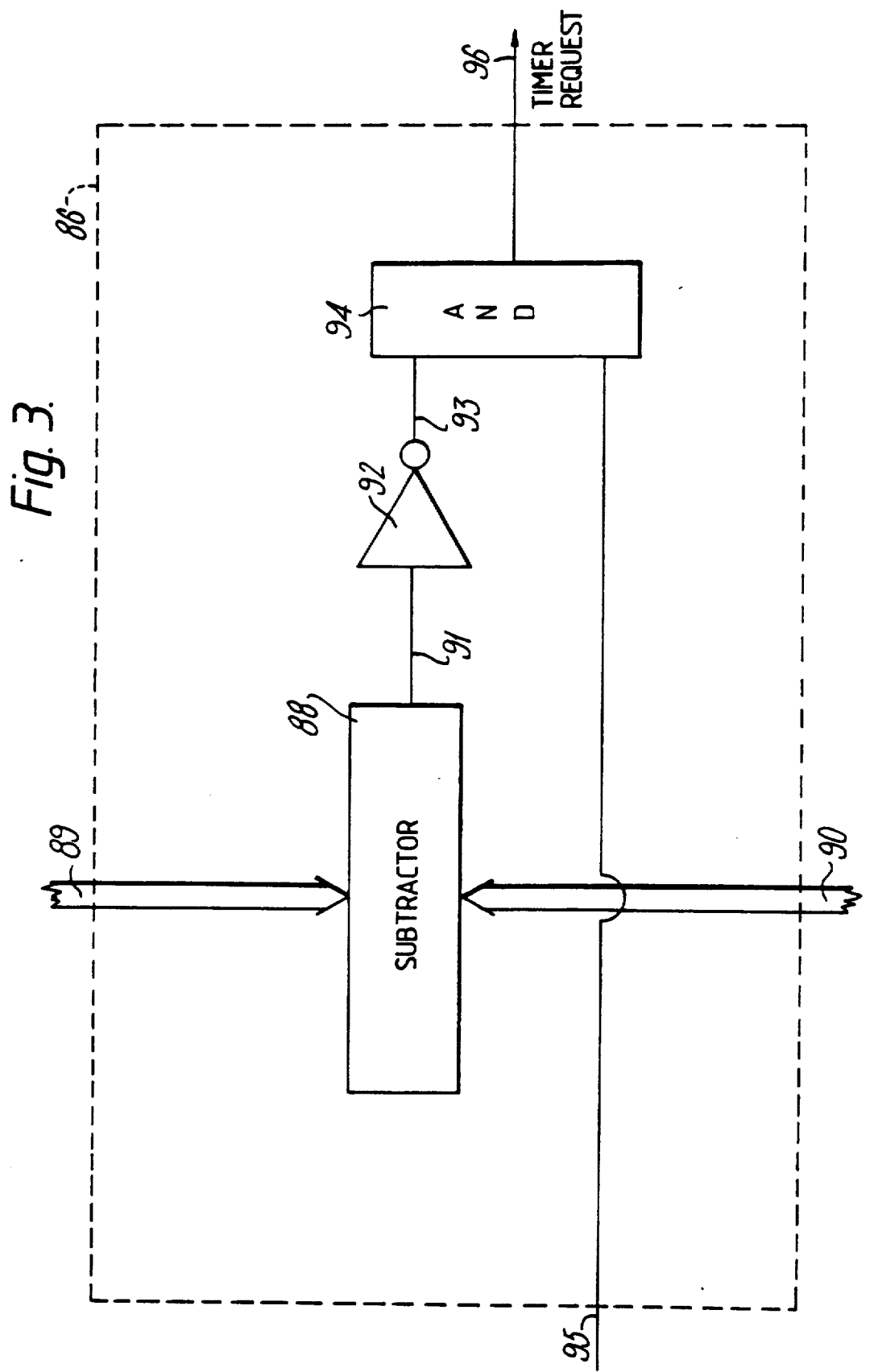
FIG. 3 illustrates a timer logic circuit which forms part of FIG. 2B.

The TIMER LOGIC 86 is similar for each of the register banks and one is shown more fully in FIG. 3. The logic unit 86 comprises a subtractor 88 arranged to receive an input on line 89 from the NEXT TIME REG and this time value is subtracted in the subtractor 88 from the time value supplied on a line 90 from the CLOCK REG 81. The most significant bit of the difference is provided on an output on line 91 to an inverter 92 which supplies a signal on line 93 to as logical AND gate 94. The gate 94 also receives an input on line 95 from the VALID TIME FLAG 84. The AND gate 94 provides an output on line 96 which is fed to the condition multiplexor 36. The signal on line 96 is called a "Timer Request" signal and is arranged to cause the processor to remove a process from the top of a timer list so that it becomes ready for execution. This will be described more fully below. It will be appreciated that the logic diagram shown in FIG. 3 is arranged so that a "Timer Request" signal on line 96 is only output when two conditions are met simultaneously. Firstly the VALID TIME FLAG 84 must be set to the value 1 and the time indicated by the CLOCK REG 81 must either be after or equal to the time indicated by the NEXT TIME REG 85. The subtractor 88 is used to subtract the value contained in the NEXT TIME REG 85 from the value held in the CLOCK REG 81 and if the result of that subtraction is a negative number the most significant bit will be 1 due to the use of two's complement signed values as referred to above. For this reason line 91 is arranged to output the most significant bit resulting from the subtraction and the inverter 92 is required so that the AND gate 94 only provides the "Timer Request" when the result of the subtraction provides a positive result thereby causing a 0 bit on line 91.

Memory Allocation for Process Workspaces

Figure 4:
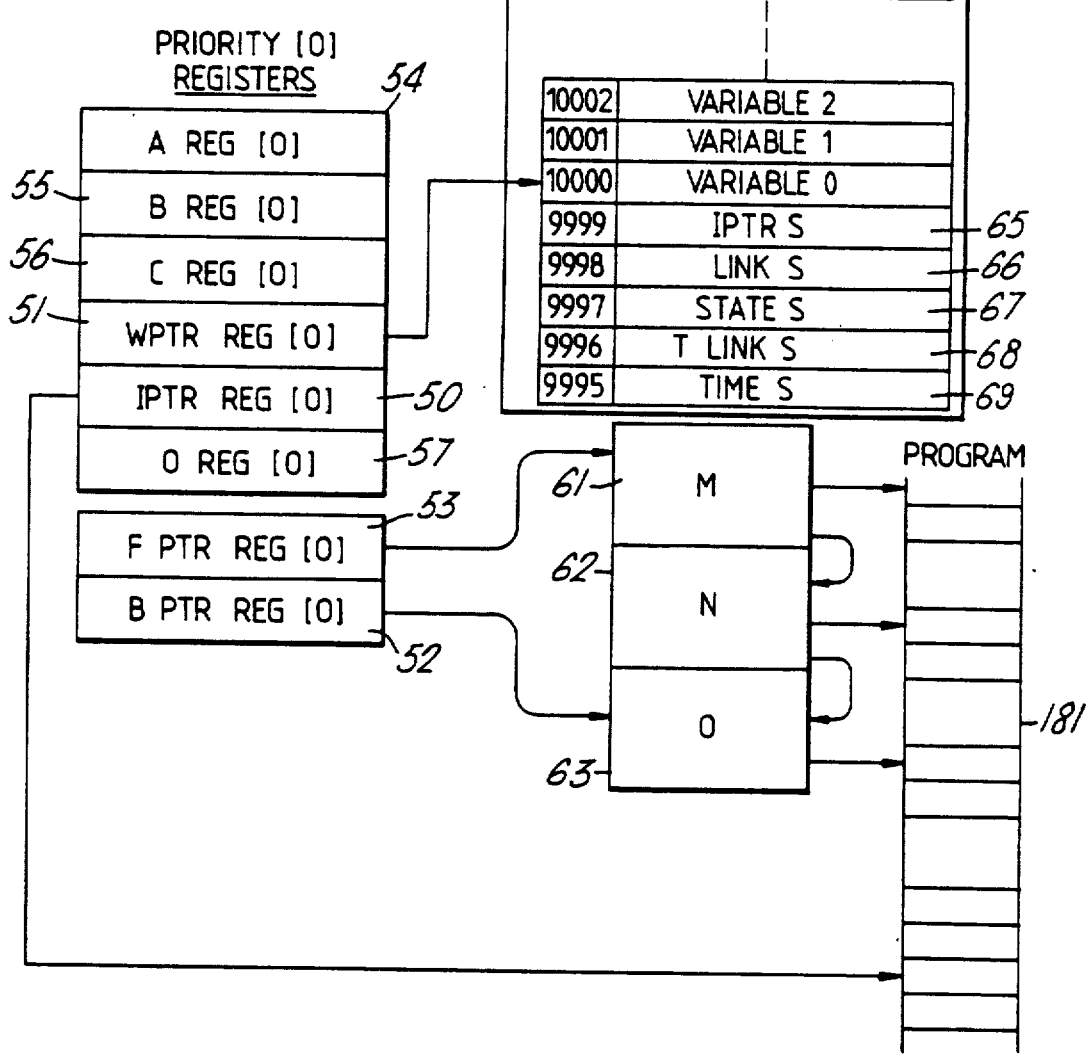
FIG. 4 illustrates the relationship between processor registers and the workspaces of a scheduled list of high priority processes for execution by the microcomputer.

As in the example described in the above mentioned patent applications, the microcomputer carries out a number of processes together sharing its time between them. Processes which are carried out together are called concurrent processes and at any one time the process which is being executed is called the current process. Each concurrent process has a region of memory called a workspace for holding the local variables and temporary values manipulated by the process. The address of the first local variable of the workspace is indicated by the workspace pointer (WPTR). This is indicated in FIG. 4 where four concurrent processes, Processes L, M, N and O have workspaces 60, 61, 62 and 63. The workspace 60 has been shown in more detail and the workspace pointer held in the WPTR REG 51 points to the 0 location which is a single word location having the address indicated in this example as 10000. The other local variables for this process are addressed as positive offset addresses from the word indicated by the workspace pointer. Some of the workspace locations with small negative offsets from the 0 location are used for scheduling timing and communication purposes. In this example five additional word locations 65, 66, 67, 68 and 69 are shown having negative offsets of 1, 2, 3, 4 and 5 respectively below the 0 location indicated by the WPTR. These locations are as follows:

| Offset | Name of Offset | Name of Location |
|--------|----------------|------------------|
| −1 | Iptr.s | Iptr location |
| −2 | Link.s | Link location |
| −3 | State.s | State location |
| −4 | TLink.s | TLink location |
| −5 | Time.s | Time location |

Location 65 is used when a process is not the current process to hold a pointer (IPTR) to the next instruction to be executed by the process when it becomes the current process. Location 66 is used to store a workspace pointer of a next process on a linked list or queue of scheduled processes awaiting execution. Location 67 is normally used to contain an indication of the state of a process performing an alternative input operation or as a pointer for copying of a block of data. Location 68 is used to store a workspace pointer of a next process on a linked timer list of processes awaiting predetermined times before being scheduled for execution and it is also used to indicate the state of a process performing an alternative timer input operation. Location 69 is used to indicate a time after which the process may be executed.

The memory also provides word locations for process to process communication and FIG. 3 indicates such a channel 70.

Notation

In the following description of the way in which the microcomputer operates, particularly with reference to its functions, operations and procedures, notation is used in accordance with the OCCAM (Trade Mark of INMOS International plc) language. This language is set forth in the booklet entitled "*Programming Manual—OCCAM*" published and distributed by INMOS Limited in 1983 in the United Kingdom. Furthermore the notation used has been set out fully in European Patent Application No. 0110642 and for simplicity will not be repeated in this specification. However the explanation of OCCAM and the notation used which is set out in European Patent Application No. 0110642 is incorporated herein by reference.

In addition to the above mentioned notation the following description refers to certain memory access procedures which are defined as follows:

| | |
|---|---|
| AtWord(Base, N, A) | sets A to point at the Nth word past Base |
| AtByte(Base, N, A) | sets A to point at the Nth byte past Base |
| RIndexWord(Base, N, X) | sets X to the value of the Nth word past Base |
| RIndexByte(Base, N, X) | sets X to the value of the Nth byte past Base |
| WIndexWord(Base, N, X) | sets the value of the Nth word past Base to X |
| WIndexByte(Base, N, X) | sets the value of the Nth byte past Base to X |
| WordOffset(Base, X, N) | set N to the number of words between X and Base |

PROCEDURES USED BY THE MICROCOMPUTER

In the following description various procedures (PROC) are referred to. The following nine procedures are used in the description of the behaviour of the processor.

Dequeue
Run
StartNextProcess
HandleRunRequest
HandleReadyRequest
HandleTimerRequest
BlockCopyStep
Insert Step
Delete Step The procedures "HandleRunRequest" and "HandleReadyRequest" and "BlockCopyStep" have been fully described in our copending PCT patent application No. PCTGB84/00379 and European Patent Application No. 84307586.2. The definition of these procedures is not changed for the present invention and as they do not relate to the timer control they will not be repeated in this patent application.

Procedure "Dequeue" makes the process on the front of the priority "Pri" scheduled process queue the current process. If Pri=1 it sets the TIME SLICE REG 80 to the time at which that process must be temporarily stopped to allow other processes to be executed. The length of time slice is determined by a constant time duration stored as one of the constants in the constants box 40.

```
1.  PROC Dequeue =
2.  SEQ
3.      WptrReg[Pri] := FptrReg[Pri]
4.      IF
5.          FptrReg[Pri] = BptrReg[Pri]
6.              FptrReg[Pri] := NotProcess.p
7.          TRUE
8.              RIndexWord(FptrReg[Pri], Link.s, FptrReg[Pri])
9.      RIndexWord(WptrReg[Pri], Iptr.s, IptrReg[Pri]) :
10.     IF
11.         Pri = 1
12.             TimeSliceReg := ClockReg + LengthOfTimeSlice
13.         Pri = 0
14.             SKIP :
```

Procedure "Run" schedules the process whose descriptor is contained in the ProcDesc register. This will cause a priority 0 process to start running immediately, in preference to any already executing priority 1 process. In the following, all lines beginning—are merely by way of explanation and do not form part of the definition.

```
1.  PROC Run =
2.  SEQ
3.      ProcPriFlag := ProcDescReg /\ 1
4.      ProcPtrReg := ProcDescReg /\ (NOT 1)
5.      IF
6.          (Pri = 0) OR ((ProcPriFlag = Pri) AND (WptrReg
            [Pri] <> NotProcess.p))
7               SEQ -- add process to queue
8.                  IF
9.                      FptrReg[ProcPriFlag] = NotProcess.p
10.                         FptrReg[ProcPriFlag] := ProcPtrReg
11.                     TRUE
12.                         WIndexWord(BptrReg[ProcPriFlag],
                            Link.s, ProcPtrReg)
13.                 BptrReg[ProcPriFlag] := ProcPtrReg
14.         TRUE
15.             SEQ -- either Pri 0 interrupting Pri 1, or Pri 1
                and idle m/c
16.                 Pri := ProcPriReg
17.                 WptrReg[Pri] := ProcPtrReg
18.                 RIndexWord(WptrReg[Pri], Iptr.s, IptrReg[Pri])
19.                 Oreg[Pri] := 0 :
```

Procedure "StartNextProcess" deschedules the current process and, if there is another runnable process, selects the next runnable process. This may cause the resumption of an interrupted priority 1 process if there are no further priority 0 processes to run.

Procedure "StartNextProcess" is always executed as a result of the SNPFlag being set. The first action of this process is, therefore, to clear that flag.

```
1.  PROC StartNextProcess =
2.  SEQ
3.      SNPFlag[Pri] := 0        -- Clear the SNP flag
4.      IF
5.          FptrReg[Pri] <> NotProcess.p
6.              Dequeue
7.          Pri = 0
8.              SEQ
9.                  Pri := 1
10.                 IF
11.                     (WptrReg[Pri] = NotProcess.p) AND
12.                     (FptrReg[Pri] <> NotProcess.p)
13.                         Dequeue
14.                     TRUE
15.                         SKIP
16.         Pri = 1
17.             WptrReg[Pri] := NotProcess.p :
```

Procedure "HandleTimerRequest" is executed as a result of a TIMER REQUEST on line 96 from one of the TIMER LOGIC units 86. If the request is for a priority 0 process the TimerRequest0 signal will have occurred and the processor will have set the ProcPri register to 0. If the request is for a priority 1 process the TimerRequest1 signal will have occurred and the processor will have set the ProcPri register to 1. The procedure identifies the process which has become ready from the contents of the appropriate TPTR word. The procedure schedules the process if appropriate and updates the TPTR word, NextTimeReg and ValidTimeFlag for the relevant priority level.

```
PROC HandleTimerRequest =
1.  SEQ
2.      -- set ProcptrReg to first process on list
3.      RIndexWord(TptrLocO, ProcPri, TempReg)
4.      ProcPtrReg := TempReg
5.      -- set TempReg to TLink location of first process
6.      RIndexWord(ProcPtrReg, TLink.s, TempReg)
7.      WIndexWord(ProcPtrReg, TLink.s, TimeSet.p)
8.      -- update timer pointer word
9.      WIndexWord(TprtrLoc0, ProcPri, TempReg)
10.     -- is the list now empty?
11.     IF
12.         TempReg = NotProcess.p
13.             -- Yes.
14.             ValidTimeFlag[ProcPri] := 0
15.         TempReg <> NotProcess.p
16.             -- No; set NextTimeReg
17.             RIndexWord(TempReg, Time.s, NextTimeReg
                [ProPri])
18.     -- check State location of process
19.     RIndexWord(ProcPtrReg, State.S, TempReg)
20.     IF
21.         TempReg = Ready.p
22.             SKIP
23.         TempReg = Waiting.p
24.             SEQ
25.                 WIndexWord(ProcPtrReg, State.s, Ready.p)
26.                 ProcDescReg := ProcPtrReg \/ ProcPri
27.                 Run :
```

In the above definition reference is made to Tptr LocO. It will be appreciated that there are two Tptr locations, one for priority 1 and another for priority 0. They occupy adjacent memory locations and that for priority 0 has the address TptrLoc0. In this way either of the locations can be addressed by an offset of 0 or 1 from TptrLoc0 depending on the relevant priority.

The procedure "InsertStep" is executed as a result of the InsertFlag[Pri] being set. Repeated performance of this procedure will insert the current process into the timer list for the current priority level in the correct position. The Breg[Pri] and Creg[Pri] registers identify the point at which the search for the correct location has so far reached.

When the insertion has been made the procedure clears the InsertFlag[Pri], resets the timer registers as appropriate and causes the next process to be executed.

```
PROC InsertStep =
    -- Areg[Pri] contains the time associated with this process
    -- Breg[Pri] is used as a pointer to the pointer to the next
    process
    -- Creg[Pri] is used as a pointer to the next process
1.  SEQ
2.      IF
3.          Creg[Pri] <> NotProcess.p
4.              -- pick up time associated with next process
5.              RIndexWord(Creg[Pri], Time.s, Treg[Pri])
```

-continued

```
6.        Creg[Pri] = NotProcess.p
7.        SKIP
8.   IF
9.        (Creg[Pri] <> NotProcess.p) AND (Areg[Pri] AFTER
          Treg[Pri])
10.       SEQ
11.         -- move on one process
12.         AtWord(Creg[Pri], TLink.s, Breg[Pri])
13.         RIndexWord(Breg[Pri], 0, Creg[Pr])
14.       TRUE
15.       SEQ
16.         -- found place to insert
17.         InsertFlag[Pri] := 0
18.         -- link in this process
19.         WIndexWord(Breg[Pri], 0, WptrReg[Pri])
20.         WIndexWord(WptrReg[Pri], TLink.s, Creg[Pri])
21.         -- Set the NextTimeReg
22.         RIndexWord(TptrLoc0, Pri, Treg[Pri])
23.         RIndexWord(Treg[Pri], Time.s, NextTimeReg[Pri])
24.         ValidTimeFlag[Pri] := 1
25.         WIndexWord(WptrReg[Pri], Iptr.s, IptrReg[Pri])
26.         SNPFlag[Pri] := 1 :
```

The procedure "DeleteStep" is executed as a result of the DeleteFlag[Pri] being set. Repeated performance of this procedure will delete the current process from the timer list for the current priority level. The Breg[Pri] and Creg[Pri] registers identify the point at which the search for the current process has so far reached.

When the deletion has been made the procedure clears the DeleteFlag[Pri] and resets the timer registers as appropriate.

```
     PROC DeleteStep =
1.   IF
2.      Creg[Pri] <> WptrReg[Pri]
3.      SEQ
4.        -- not yet found current process; step on
5.        AtWord(Creg[Pri], TLink.s, Breg[Pri])
6.        RIndexWord(Breg[Pri], 0, Creg[Pri])
7.      Creg[Pri] = WptrReg[Pri]
8.      SEQ -- found process; delete from list
9.        DeleteFlag[Pri] := 0
10.       RIndexWord(WptrReg[Pri], TLink.s, Creg[Pri])
11.       WIndexWord(Breg[Pri], 0, Creg[Pri])
12.       -- Check if there are any processes left on queue
13.       RIndexWord(TptrLoc0, Pri, Breg[Pri])
14.       IF
15.         Breg[Pri] = NotProcess.p
16.           -- No processes left
17.           ValidTimeFlag[Pri] := 0
18.         Breg[Pri] <> NotProcess.p
19.           -- Get time from first process
20.           RIndexWord(Breg[Pri], Time.s, NextTimeReg
                         [Pri])
21.       WIndexWord(WptrReg[Pri], TLink.s,
                      TimeNotSet.p) :
```

The processor performs a sequence of actions. These are performed either on behalf of the current process, or on behalf of a request made by a serial link 25 or the timer 9. An action which is performed on behalf of a priority 0 process, a priority 0 timer or a communication channel handling a priority 0 process, is called a "priority 0 action". A "priority 1 action" is correspondingly defined.

The actions which may be performed on behalf of the current process are the procedures "StartNextProcess", "InsertStep", "DeleteStep", "BlockCopyStep" or to fetch, decode and execute an instruction.

The actions which may be performed by the processor on behalf of a serial link are the procedures "HandleRunRequest" and "HandleReadyRequest" and these have been fully described in our copending patent applications referred to above. The actions which may be performed by the processor on behalf of the timer 9 are set out in the procedure "HandleTimerRequest" as defined above.

Each of these actions corresponds to a sequence of microinstructions. The last microinstruction in any of the sequences comprising these actions is "NextAction". This causes the processor to choose the next action to be performed.

The way in which the processor decides which action is to be performed next when a "NextAction" microinstruction is executed is as follows. The sync control logic 10 will forward to the processor at most one "RunRequest" or "ReadyRequest" at any time. It will not forward a priority 1 request if there is a priority 0 request outstanding. This results in two signals being input to the condition multiplexor 36, one indicating the presence of a request and the other indicating the priority of that request.

The two signals "TimerRequest0" and "TimerRequest1" are connected to the condition multiplexor 36 which is also connected to signals from the currently selected SNPFlag 58, DeleteFlag 83, InsertFlag 82 and CopyFlag 59. It is therefore able to make the selection as described below. The processor will perform the procedure "StartNextProcess" if the SNPFlag[Pri] is set. Otherwise the processor will select a priority 0 action is there is one that can be performed. Otherwise the processor will select a priority 1 action if there is one that can be performed. Otherwise the processor will wait until there is a request from a timer or communication channel.

The processor selects an action at a particular priority level Pri according to the following rules. The processor will perform a "DeleteStep" if the DeleteFlag[Pri] is set. Otherwise the processor will perform an "InsertStep" if the InsertFlag[Pri] is set. Otherwise the processor will handle any priority Pri channel request. Otherwise the processor will handle any priority Pri timer request. Otherwise the processor will perform the procedure "BlockCopyStep" if the CopyFlag[Pri] is set. Otherwise the processor will fetch, decode and execute an instruction if there is a current process of priority Pri.

Instructions are fetched, decoded and executed as described in our European Patent Specification No. 0110642.

The description of the function set which follows refers to the additional four procedures:
 TimeSlice
 InsertInTimerList
 DeleteFromTimerList
 IsThisSelectedProcess In the following definitions of these procedures reference is made to relative times. The CLOCK REG 81 increments by 1 regularly and goes through continuous cycles incrementing from the most negative value up to the most positive value. The next increment after the most positive value takes the register back to the most negative value. In the following description the expression (X after Y) means X is later than the time Y. All times between (X+1) and (X+MostPos) are defined to be AFTER X. All times which are between (Clock Reg+1) and (Clock Reg+MostPos) are considered to be in the future and those which are between (Clock Reg and (−1)) and (Clock Reg+MostNeg) are considered to be in the past.

The additional procedure definitions are as follows:

```
1.  PROC TimeSlice =
2.    IF
3.      (Pri = 1) AND ((ClockReg AFTER TimeSliceReg)
           OR (ClockReg = TimeSlice))
4.        SEQ
5.          ProcDescReg := Wptr \/ Pri
6.          Run
7.          SNP[Pri] := 1
8.      TRUE
9.        SKIP
1.  PROC InsertInTimerList =
      -- This sets up the registers and the Insert Flag so that
      repeated execution of InsertSep will result in this process
      being inserted into the time list at the time specified in
      Areg[Pri] and then descheduled
      -- Breg[Pri] is used as a pointer to the pointer to the next
      process
      -- Creg[Pri] is used as a pointer to the next process
2.    SEQ
3.      WIndexWord(WptrReg[Pri], Time.s, Areg[Pri])
4.      InsertFlag[Pri] := 1
5.      AtWord(TptrLocO, Pri, Breg[Pri])
6.      RIndexWord(Breg[Pri], 0, Creg[Pri]):
1.  PROC DeleteFromTimerList =
      -- This causes the current process to be deleted from the
      appropriate timer list, TimeNotSet to be written to the
      TLink location. This is achieved by setting up the
      registers and then repeatedly executing DeleteStep.
      -- Areg is NOT to be used
      -- Breg is used as a pointer to the pointer to the next
      process
      -- Creg is used as a pointer to the next process
2.    SEQ
3.      DeleteFlag[Pri] := 1
4.      AtWord(TptrLocO, Pri, Breg[Pri])
5.      RIndexWord(Breg[Pri], 0, Creg[Pri]):
1.  PROC IsThisSelectedProcess =
2.    -- this is used by all the disable instructions
3.    SEQ
4.      RIndexWord(WptrReg[Pri], 0, Oreg[Pri])
5.      IF
6.        Oreg[Pri] = (-1)
7.          SEQ
8.            WIndexWord(WptrReg[Pri], 0, Areg[Pri])
9.            Areg[Pri] := MachineTRUE
10.       Oreg[Pri] <> (-1)
11.         Areg[Pri] := MachineFALSE :
```

FUNCTION SET

As in European patent specification No. 0110642, each instruction for the microcomputer includes a function element selected from a function set. The functions executed by the microcomputer include direct functions, the prefixing functions pfix and nfix, and an indirect function opr which uses the operand register Oreg to select one of a set of operations. As in the above patent application, the Oreg[Pri] is cleared after the execution of all instructions except PFIX and NFIX.

The improved set of direct functions and operations of the present application is as follows:

| Code No | Abbreviation | Name |
|---|---|---|
| | | DIRECT FUNCTIONS |
| 0 | ldl | load local |
| 1 | stl | store local |
| 2 | ldlp | load local pointer |
| 3 | ldnl | load non-local |
| 4 | stnl | store non-local |
| 5 | ldnlp | load non-local pointer |
| 6 | eqc | equals constant |
| 7 | ldc | load constant |
| 8 | adc | add constant |
| 9 | j | jump |
| 10 | cj | conditional jump |
| 11 | call | call |

-continued

| Code No | Abbreviation | Name |
|---|---|---|
| 12 | ajw | adjust workspace |
| 13 | opr | operate |
| 14 | pfix | prefix |
| 15 | nfix | negative prefix |
| | | OPERATIONS |
| 0 | rev | reverse |
| 1 | ret | return |
| 2 | gcall | general call |
| 3 | gajw | general adjust workspace |
| 4 | ldpi | load pointer to instruction |
| 5 | bsub | byte subscript |
| 6 | wsub | work subscript |
| 7 | bcnt | byte count |
| 8 | wcnt | word count |
| 9 | lend | loop end |
| 10 | lb | load byte |
| 11 | sb | store byte |
| 12 | copy | copy message |
| 13 | gt | greater than |
| 14 | add | add |
| 15 | sub | subtract |
| 16 | mint | minimum integer |
| 17 | startp | start process |
| 18 | endp | end process |
| 19 | runp | run process |
| 20 | stopp | stop process |
| 21 | ldpri | load priority |
| 22 | in | input message |
| 23 | out | output message |
| 24 | alt | alt start |
| 25 | altwt | alt wait |
| 26 | altend | alt end |
| 27 | enbs | enable skip |
| 28 | diss | disable skip |
| 29 | enbc | enable channel |
| 30 | disc | disable channel |
| 31 | ldtimer | load timer |
| 32 | tin | timer input |
| 33 | talt | timer alt start |
| 34 | taltwt | timer alt wait |
| 35 | enbt | enable timer |
| 36 | dist | disable timer |

All the above listed functions and operations, except operations with code numbers 31 to 36, have already been defined in the copending patent applications referred to above and they will not be redefined in this specification. However, the function "jump" and the operation "loop end" have been redefined to permit use of the timer 9 and these are now defined as follows:

```
jump
  def:  SEQ
          AtByte(IptrReg[Pri], Oreg[Pri], IptrReg[Pri])
          TimeSlice
  pur-  to transfer control backwards or forwards to provide
  pose: loops and exits from loops, to cause a process to be
        rescheduled if its allotted time slice has elapsed
loop end
  def:  SEQ
          RIndexWord(Breg[Pri], 1, Creg[Pri])
          Creg[Pri] := Creg[Pri] - 1
          WIndexWord(Breg[Pri], 1, Creg[Pri])
          IF
            Creg[Pri] > 0
              SEQ
                RIndexWord(Breg[Pri], 0, Creg[Pri])
                Creg[Pri] := Creg[Pri] + 1
                WIndexWord(Breg[Pri], 0, Creg[Pri])
                AtByte(IptrReg[Pri], -Areg[Pri], IptrReg
                  [Pri])
            TRUE
              SKIP
          TimeSlice
  pur-  to implement replicators and to cause a process to be
```

The additional operations and "altend" are as follows:

OPERATIONS FOR TIMER INPUT load timer
- def: SEQ
  - Creg[Pri] := Breg[Pri]
  - Breg[Pri] := Areg[Pri]
  - Areg[Pri] := ClockReg
- purpose: to load the current value of the timer into Areg timer input
- def:
  1. IF
  2.   ClockReg AFTER Areg[Pri]
  3.     SKIP
  4.   TRUE
  5.     SEQ
  6.       WIndexWord(WptrReg[Pri], State.s, Waiting.p)
  7.       Areg[Pri] := Areg[Pri] + 1
  8.       InsertInTimerList
- purpose: to schedule the process after a certain time

OPERATIONS FOR ALTERNATIVE TIMER INPUT timer alternative start
- def:
  1. SEQ
  2.   WIndexWord(WptrReg[Pri], State.s, Enabling.p)
  3.   WIndexWord(WptrReg[Pri], TLink.s, TimeNotSet.p)
- purpose: to initialise the process state and the timer state prior to enabling alternative inputs and the timer timer alternative wait
- def:
  1. SEQ
  2.   WIndexWord(WptrReg[Pri], 0 −1)
  3.   RIndexWord(WptrReg[Pri], TLink.s, Breg[Pri])
  4.   RIndexWord(WptrReg[Pri], Time.s, Areg[Pri])
  5.   IF
  6.     (Breg[Pri] = TimeSet.p) AND (ClockReg AFTER Areg[Pri])
  7.       SEQ -- clock makes process ready
  8.         WIndexWord(WptrReg[Pri], State.s, Ready.p)
  9.         WIndexWord(WptrReg[Pri], Time.s, ClockReg)
  10.     TRUE
  11.       SEQ -- clock does not make process ready
  12.         RIndexWord(WptrReg[Pri], State.s, Creg[Pri])
  13.         IF
  14.           Creg[Pri] = Ready.p
  15.             WIndexWord(WptrReg[Pri], Time.s, ClockReg)
  16.           Creg[Pri] = Enabling.p
  17.             SEQ
  18.               WIndexWord(WptrReg[Pri], State.s, Waiting.p)
  19.               IF
  20.                 Breg[Pri] = TimeSet.p
  21.                   SEQ
  22.                     Areg[Pri] := Areg[Pri] + 1
  23.                     InsertInTimerList
  24.                 Breg[Pri] = TimeNotSet.p
  25.                   SEQ
  26.                     WIndexWord(WptrReg[Pri], Iptr.s, IptrReg[Pri])
  27.                     SNPFlag[Pri] := 1
- purpose: to wait for one of a number of enabled inputs, some of which may be timer inputs

OPERATIONS FOR ALTERNATIVE TIMER INPUT enable timer
- def:
  1. SEQ
  2.   IF
  3.     Areg[Pri] = MachineFALSE
  4.       SKIP
  5.     Areg[Pri] <> MachineFALSE
  6.       SEQ
  7.         RIndexWord(WptrReg[Pri], TLink.s, Oreg[Pri])
  8.         IF
  9.           Oreg[Pri] = TimeNotSet.p
  10.             SEQ
  11.               WIndexWord(WptrReg[Pri], TLink.s, TimeSet.p)
  12.               WIndexWord(WptrReg[Pri], Time.s, Breg[Pri])
  13.           Oreg[Pri] = TimeSet.p
  14.             SEQ
  15.               RIndexWord(WptrReg[Pri], Time.s, Oreg[Pri])
  16.               IF
  17.                 Oreg[Pri] AFTER Breg[Pri]
  18.                   WIndexWord(WptrReg[Pri], Time.s, Breg[Pri])
  19.                 TRUE
  20.                   SKIP
  21.     Breg[Pri] := Creg[Pri]
- purpose: to enable a timer input disable timer
- usage: On entry: Areg = Code offset, Breg = Boolean guard, Creg = Time
  - On exit: Areg = MachineTRUE if this was selected component
  - Areg = MachineFALSE otherwise
- def:
  1. IF
  2.   Breg[Pri] = MachineFALSE
  3.     Areg[Pri] := MachineFALSE
  4.   Breg[Pri] <> MachineFALSE
  5.     SEQ
  6.       RIndexWord(WptrReg[Pri], TLink.s, Oreg[Pri])
  7.       IF
  8.         Oreg[Pri] = TimeNotSet.p
  9.           Areg[Pri] := MachineFALSE
  10.         Oreg[Pri] = TimeSet.p
  11.           SEQ
  12.             RIndexWord(WptrReg[Pri], Time.s, Oreg[Pri])
  13.             IF
  14.               Oreg[Pri] AFTER Creg[Pri]
  15.                 IsThisSelectedProcess
  16.               TRUE
  17.                 Areg[Pri] := MachineFALSE
  18.         TRUE
  19.           SEQ
  20.             Areg[Pri] := MachineFALSE
  21.             DeleteFromTimerList
- purpose: to disable an enabled timer input to select one of a number of alternative timer inputs alternative end
- def: SEQ
  1. RIndexWord(WptrReg[Pri], 0, Oreg[Pri])
  2. AtByte(IptrReg[Pri], Oreg[Pri], IptrReg[Pri])
- purpose: to start execution of the selected component of an alternative process It will be understood that the microinstruction ROM 13 contains microinstructions corresponding to all the above listed functions and operations whereby the processor is caused to carry out any of the above actions as a result of microinstructions derived from the ROM 13.

Scheduling

The processor shares its time between a number of concurrent processes executing at the two different priority levels 0 and 1. A priority 0 process will always execute in preference to a priority 1 process if both are able to execute. At any time only one of the processes is actually being executed and this process which is the current process has its workspace pointer (WPTR) in the WPTR REG 51 and an instruction pointer (IPTR) in the IPTR REG 50 indicates the next instruction to be executed from the sequence of instructions in the program relating to that particular process. Any process which is not the current process and is not awaiting execution is descheduled. When a process is scheduled it either becomes the current process or is added to a list or queue of processes awaiting execution. Such a scheduled list is formed as a linked list with each process on the list having a pointer in the link location 66 of its workspace to the workspace of the next process on that list. The instruction pointer (IPTR) of any process on the list is stored in the IPTR location 65 of its workspace as shown in FIG. 4.

Figure 5:
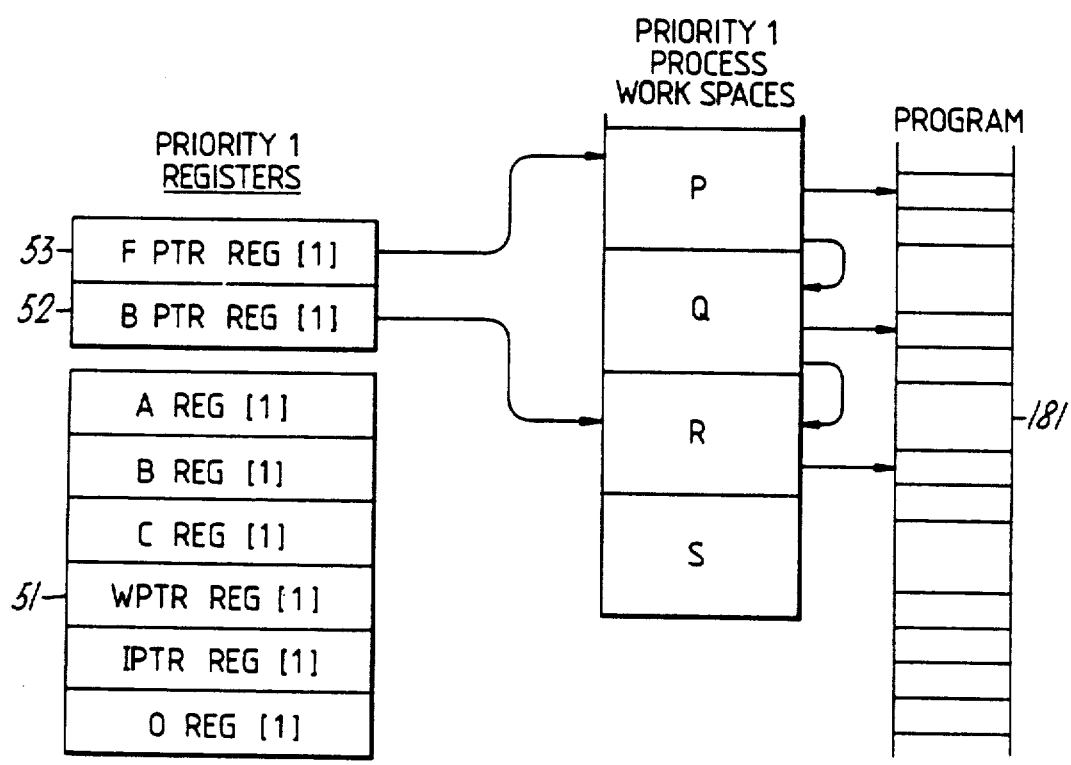
FIG. 5 is similar to FIG. 4 but illustrates a scheduled list of low priority processes while a high priority process is being executed.

In the present case, the processor may maintain two lists of scheduled processes which are waiting to be executed, one for each priority level. In addition it may maintain two timer lists of descheduled processes awaiting specified times before being scheduled, one timer list being provided for each priority. FIG. 4 indicates the high priority 0 scheduled list whereas FIG. 5 shows a low priority 1 scheduled list at a time when a priority 0 process is the current process as shown in FIG. 4. As the current process in this case is a high priority 0 process, the register bank selector 41 has selected the registers in bank 39 for use by the processor. Consequently WPTR REG [0] holds a pointer to the 0 location of the workspace 60 of the current process L as indicated in FIG. 4. The IPTR REG [0] contains a pointer to the next instruction in the program sequence 181 which is stored in memory. The registers 54, 55, 56 and 57 indicated in FIG. 4 contain other values to be used during execution of the current process L. The scheduled list of priority 0 processes which are awaiting execution is indicated in FIG. 4 by the three processes M, N and 0 whose workspaces are indicated diagrammatically at 61, 62 and 63. Each of these workspaces is generally similar to that indicated for process L. The FPTR REG [0] marked 53 contains the pointer to the workspace of process M which is the process at the front of this list. The workspace of process M contains in its IPTR location 65 a pointer to the next instruction in the program sequence which is to be executed when process M becomes the current process. The link location 66 of process M contains a pointer to the workspace of process N which is the next process on the list. The last process on the list indicated is process 0 which has its workspace indicated at 63. The BPTR REG [0] marked 52 contains a pointer to the workspace of this last process 0. The workspace 63 of this process 0 is pointed to by the contents of the link location 66 of the previous process N but in this case the link location 66 of process 0 does not contain any pointer as this is the last process on the list.

When a further process is added to the list a pointer to the workspace of that further process is placed in the BPTR REG 52 and the link location 66 of the process 0 then contains a pointer to the workspace of the further process which is added to the list.

The priority 1 scheduled list is generally similar and this is indicated in FIG. 5. In this case the list of priority 1 processes which have been scheduled and are awaiting execution consists of the processes P, Q and R. A further priority 1 process marked S is shown but this is currently descheduled and does not form part of the linked list. The FPTR REG [1] contains a pointer to the workspace of process P which forms the first process on the list awaiting execution. The BPTR REG [1] contains a pointer to the workspace of process R which forms the last process on the scheduled list. Each of the processes P, Q and R has an IPTR in its IPTR location pointing to the program stage from which the next instruction is to be taken when that process becomes the current process. The link location of each process apart from the last process on the scheduled list contains a pointer to the workspace of the next process on the list.

A process may be taken from the top of a list for execution by use of the procedure "dequeue" which has been defined already.

A current process may be descheduled by the procedure "start next process" which has been defined already.

The manner of operating the two scheduled process lists illustrated in FIGS. 4 and 5 has already been described in the above mentioned patent applications and will not be repeated.

The present embodiment does however provide a time slicing facility such that if the current process is a low priority process it may be stopped after a period of time called a "time slice" and rescheduled at the end of the queue illustrated in FIG. 5 so as to allow the opportunity for other processes on the scheduled list to be executed. When a low priority process is taken from the top of a scheduled list of the type shown in FIG. 5, the processor executes the procedure "dequeue" and as can be seen from lines 11 and 12 of the definition of that procedure, if the process is a priority 1 process (which will be the case for a low priority process) then according to line 12, the TIME SLICE REG 80 is loaded with a value which is the sum of the present time indicated by the CLOCK REG 81 together with the time required "length of time slice". The length of a time slice may be chosen to suit any appropriate time interval and in the present case it is taken to be the time needed to execute 1000 instructions. This may of course be varied as necessary. This time slice is stored in the constants box 40. When the low priority process executes a "jump" function or a "loop end" operation, the processor carries out the procedure "time slice" as can be seen from the end of the definition of both the jump function and the loop end operation. In accordance with the above definition of the procedure "time slice" the processor checks that if the priority of the current process is 1 and the time indicated by the CLOCK REG is equal to or after the time indicated by the TIME SLICE REG 80 then the sequence is carried out in which the workspace pointer and priority of the current process is loaded into the PROC DESC REG 46 and the procedure "run" is carried out so that the process is rescheduled by adding it to the end of the priority 1 scheduled list. The procedure also sets the SNPFlag 58 to the value 1 so that the processor ceases executing the current process and starts to execute a further process from the top of the priority 1 scheduled list unless there is any process or request of higher priority requiring action by the processor.

Figure 6:
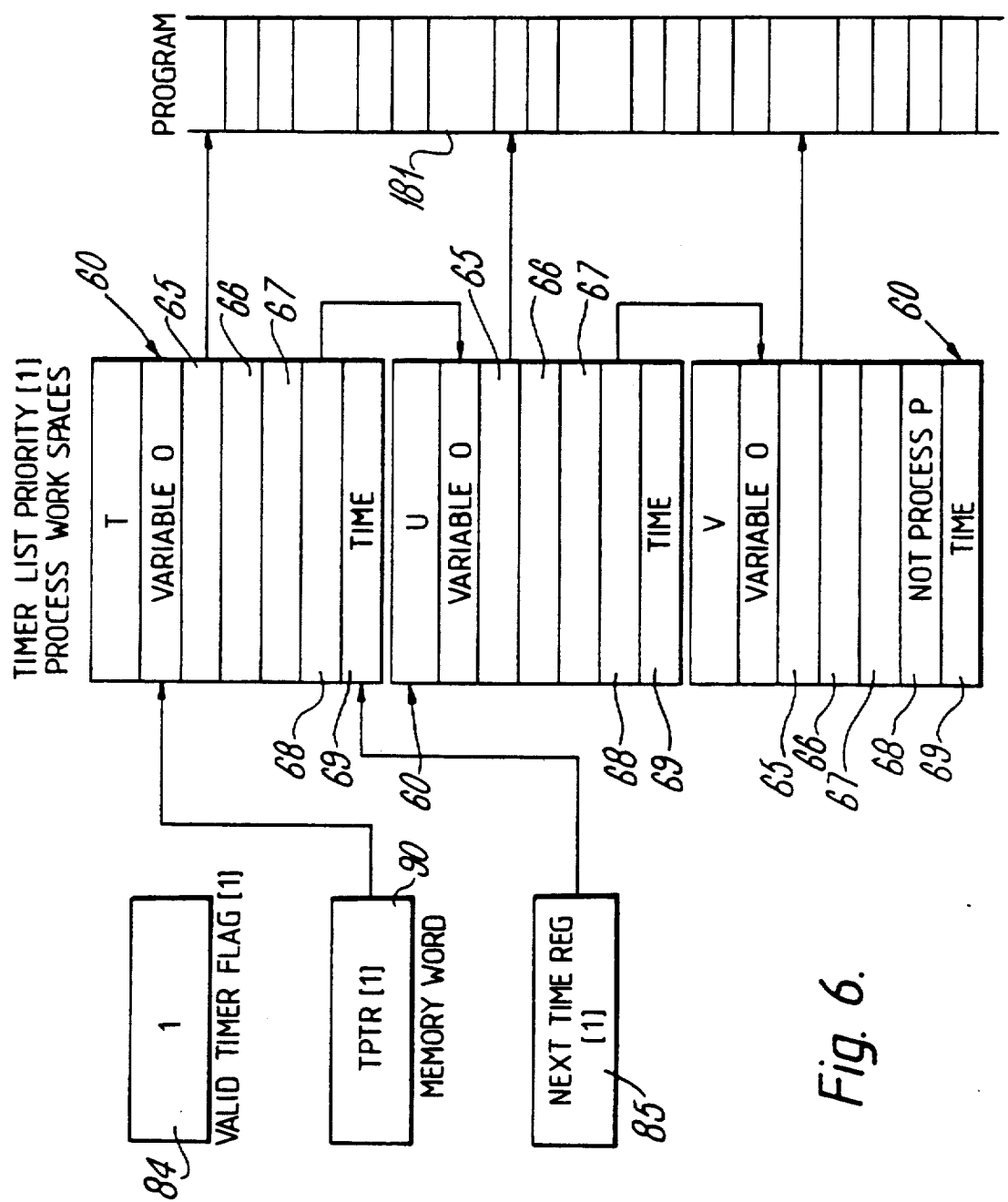
FIG. 6 illustrates a timer list of low priority processes awaiting predetermined times before being rescheduled.
Figure 7:
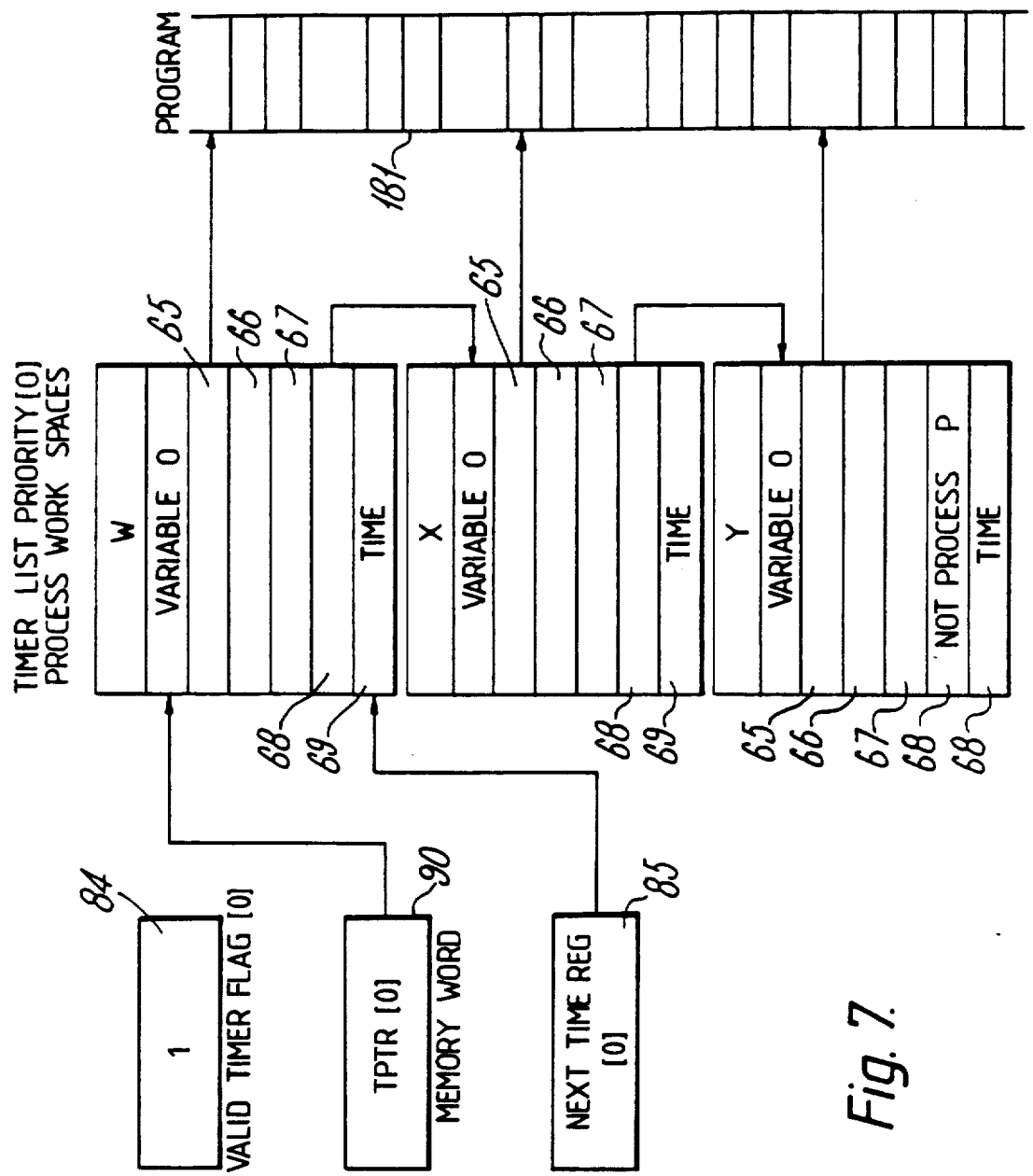
FIG. 7 illustrates a timer list of high priority processes awaiting predetermined times before being rescheduled.

The present embodiment also makes provision for timer lists of the type shown in FIGS. 6 and 7. FIG. 6 illustrates a linked timer list of low priority 1 processes whereas FIG. 7 shows a similar linked list of high priority 0 processes. The low priority processes have been marked in FIG. 6 with the letters T, U and V whereas the high priority processes of FIG. 7 have been given the letters W, X and Y. The two lists are generally similar and for this reason only the list of FIG. 6 will be described in detail. The workspace 60 for each of the 10 processes in the list is indicated in FIG. 6. The front of the timer list is maintained by a single word memory location 90 which holds a pointer value called TPTR. When there are no processes on a timer list of particular priority, the TPTR for that priority is set to the special value "NotProcess.p". Otherwise the TPTR held in the memory location 90 points to the "variable 0" location (also called 0 location) of the workspace 60 of the first process on the timer list. This is illustrated in FIG. 6. The processes in the timer list are all linked in a time ordered manner. Each process workspace contains a value in the time location 69 indicating the time at which the process may be scheduled. The TLink location 68 of each process workspace includes a pointer to the 0 location of the workspace of the next process on the timer list. Location 65 of each process workspace on the list stores a pointer to the next instruction in the program sequence 181 for use when the process is scheduled and becomes the current process. The VALID TIME FLAG 84 is set to the value 1 when there are processes on the timer list and has the value 0 if there are no processes on the timer list. The NEXT TIME REG 85 contains the time taken from location 69 of the process at the front of the timer list. In this way the register 85 contains an indication of the earliest time at which any of the processes on the associated timer list should be scheduled. No register is provided for the timer list to indicate the back of the list. The workspace of the last process on the timer list has the special value "NotProcessp" in the TLINK location 68 of its workspace. The front of the list is indicated by use of the memory location 90 rather than a register. In this way the front of the list is identified by use of a memory location in the same way as all intermediate entries on the list are identified and this simplifies the actions necessary to insert or delete further processes onto the timer list in a sequentially time ordered manner. It will be appreciated that it may become necessary to insert a process before the existing first process on the timer list or it may be necessary to insert it partway through the list depending on the time at which the process to be inserted is to be scheduled.

As can be seen from the previous description of the timer logic shown in FIG. 3, if either of the VALID TIME FLAGS 84 are set to the value 1 indicating that there is a process on the appropriate priority timer list, then the timer logic shown in FIG. 3 compares the times shown in the NEXT TIME REG 85 (indicating the first time for scheduling any of the processes on the list) with the time indicated by the CLOCK REG 81 and if the time for scheduling that first process has arrived, the timer logic provides an appropriate request signal to the condition multiplexor 36. The processor responds to such request signals by removing the first process from the appropriate timer list and updating the appropriate VALID TIME FLAG, NEXT TIME REG and TPTR location 90. This then reflects the new state of the timer list. The value "TimeSet.p" is written into the TLINK location 68 for the process workspace in order to indicate that the process is no longer on the timer list. Provided that the process is not already the current process or already on a scheduled list, it will become added to a scheduled list of the type shown in FIG. 4 or FIG. 5 or become the current process is there is no scheduled list. The actions of the processor in removing a process from the top of a timer list are set out in the above definition of "HandleTimerRequest".

Timer Input Instruction

A process may perform an instruction including "TimerInput" by loading the time after which the process should be rescheduled into the AREG 54 and then executing the operation "TimerInput". Firstly the processor checks whether the current time indicated by the CLOCK REG is after the time indicated by the AREG and if so no action occurs so that the process remains scheduled. If however this condition is not met the sequence specified in the definition of "TimerInput" occurs in that the special value "Waiting.p" is written into the STATE LOCATION 67 of the process workspace. The time at which the process should be rescheduled is to be after that shown in the AREG and consequently the time indicated in the AREG is incremented by 1 to indicate the time at which the process should be rescheduled. The processor carries out the procedure "InsertInTimerList" which writes into the time location 69 of the process workspace the time at which the process should be rescheduled and it causes the process to be fitted into the appropriate timer list at a position in that list such that the processes follow a time ordered sequence. It also sets the SNPFlag to a value 1 so that the processor starts executing another process. The process which executed the "TimerInput" instruction will be rescheduled when an appropriate amount of time has passed.

Alternative Timer Input Instructions

In the above mentioned copending patent applications, alternative processes are described. Such alternative processes select one of the number of alternative components for execution. Each component of the alternative consists of an input or a skip followed by a corresponding process. The present example is able to execute a timer alternative process which selects one of a number of alternative components for execution. Each component of the timer alternative may consist of a message channel input (from either an internal channel or an external channel), a skip or a timer input followed by a corresponding process. A message channel input component may be selected if the channel is ready and a skip component may always be selected as described in the above referred to copending patent applications. A timer input component may be selected when the value in the CLOCK REG is AFTER the time specified in the timer input. The present example executes alternative processes which are not dependent on a timer input in precisely the same manner as has already been described in the above mentioned copending patent applications and that description will not be repeated in this specification. When a current process has a number of alternative components, each component is examined to determine if one or more of them can be selected. If no component can be selected, the process is descheduled until one of them can be selected. The process will then be rescheduled, the components reexamined and one of them selected. The examination of message channel input components and skip components is performed as described in the above mentioned copending patent applications. When all components have been examined the state location 67 of the process workspace contains one of the two special values "Enabling.p" or "Ready.p". If and only if the state location 67 contains "Ready.p" can one of these component processes be selected. During the examination of timer input components, the TLink and Time Locations 68 and 69 respectively are used for special purposes. The TLink location 68 takes one of the two special values "TimeSet.p" or "TimeNotSet.p". It is initialised to "TimeNotSet.p" indicating that no timer input has yet been examined and changes to "TimeSet.p" when the first timer input is examined. When the first timer input is examined, the time location 69 is initialised to the time specified. Subsequently when each timer input is examined, the time location is updated to the time specified if that time is earlier than the time recorded in the time location 69. Consequently when all components have been examined, the time location 69 holds the earliest time specified by any timer input. The alternative process can select a timer input component if and only if the TLink location 68 contains the value "TimeSet.p" and the value of CLOCK REG is AFTER the time in the time location 69.

When all the components have been examined, the Timer Alternative process determines if any component can be selected using the State, TLink and Time locations 67, 68 and 69. If no component can be selected the process is descheduled and if any timer input component has been examined, the process is placed on the appropriate timer list. When there is at least one component which can be selected each component is reexamined and the first selectable component is selected. As described in the above mentioned copending patent applications, the 0 location of the process workspace 60 is used to record which if any component has been selected. The reexamination of channel input components and skip components is performed as described in the above mentioned copending patent applications. The reexamination of the timer input components is as follows using the TLink and Time Locations 68 and 69. If the Timer Alternative process is not on the timer list when the first timer input component is reexamined then either the process had been placed on the timer list and had subsequently been removed or the process had not been placed on the timer list at all. In the former case the Time Location 69 contains the time at which the earlier timer input component became selectable. In the latter case the Time Location 69 contains the value of "CLOCK REG" immediately after examination of the component processes. The Time Location retains the same value for all reexaminations of the timer input components. A timer input component will be selectable if and only if the content of the time location 69 is AFTER the specified time. If the Timer Alternative process is still on the timer list when the first timer input component is reexamined, there is no selectable timer input component but there must be a selectable channel input component. In this case the first reexamination of a timer input component removes the process from the timer list and sets the TLink location 68 to the value "TimeNotSet.p" preventing the selection of any timer input component. In this case no use is made of the Time Location 69.

The instructions which implement timer alternative processes are "timer alternative start" followed by "enable timer" for each of the timer components. The processor will also execute "enable channel" for each and every message channel if they are incorporated in the alternative construction. This is followed by "timer alternative wait" and then "disable timer" for each of the timer inputs and "disable channel" for any channel inputs. This is followed by the operation "Alternative End".

The first instruction executed by a timer alternative process is the "timer alternative start" operation and as can be seen from the definition of that operation, in accordance with line 2 the special value "enabling p" is written into the state location 67 for the process and in accordance with line 3, the special value "TimeNotSet.p" is written into the TLink location 68 for the process workspace.

Any channel input components and skip components are examined by "enable channel" and "enable skip" operations as described in the above mentioned copending patent applications. Any timer input components are examined by loading a guard value into the AREG and the specified time for the timer component into the BREG and then executing an "enable timer" operation. In accordance with the definition of that operation, lines 2 and 3 check whether the guard value in the AREG is false. If it is false the timer input component is to be ignored and the instruction has no other effect. Provided the guard value is not false in accordance with line 5 of the definition, the processor carries out the sequence beginning at line 7 of the definition. This loads into the OREG the value taken from the TLink location 68 and line 8 effects an examination to test whether the value is "TimeNotSet.p" in accordance with line 9 or "TimeSet.p" in accordance with line 13. If it is found that the value is "TimeNotSet.p" then the value "TimeSet.p" is written into the TLink location in accordance with line 11 and the time indicated in the BREG is written into the time location 69 for the process workspace as required by line 12 of the definition. This will occur for the first timer input component examined by the process. For subsequent timer inputs which are examined the condition of line 13 may be met in which case the sequence following line 14 occurs. Line 15 requires that the time value recorded in the time location 69 for the process is loaded into the OREG 57 and the value of this time is tested to see whether it meets the condition of line 17 of the definition. If that time is AFTER the time indicated in the BREG then the time in the BREG is written into the time location 69 for the process. Lines 19 and 20 indicate that if the time indicated in the OREG was not AFTER the time indicated in the BREG no action is taken. Finally the BREG is loaded with the value from the CREG as required by line 21 of the definition. In this way the process examines each of the possible timer inputs and the time location 69 of the process is updated so that after the examination it contains the time of the earliest timer component. It will therefore be seen that the succession of "enable timer" operations for each of the timer components effectively determines the earliest time of any of the components and progressively updates the time location 69 with the earliest time of any of the examined components.

The process then executes the operation "timer alternative wait". In accordance with line 2 of the definition this initialises the 0 location of the process workspace to the value −1 and then tests to determine if any component of the alternative process is already selectable. In accordance with lines 3 and 4 of the definition it reads into the BREG the value from the TLink location 68 and reads into the AREG the value from the Time location 69. Lines 5 and 6 require that if the process had the value "TimeSet.p" and the CLOCK REG shows a time AFTER the time indicated in the time location 69 of the process then the sequence defined in lines 8 and 9 occurs. The special value "Ready.p" is written into the state location 67 for the process and the current time indicated by the CLOCK REG is written into the time location 69 for the process. The process is not descheduled and may move onto its next instruction. If however the condition of line 6 of the definition was not true then the process moves to line 12 of the definition. It tests the contents of the state location 67 for the process by loading this into the CREG and line 14 tests whether this contains the value"Ready.p". If so then in accordance with line 16 the current time indicated by the CLOCK REG is written into the time location 69 for the process and the process is not descheduled. It is ready due to another of the alternative inputs and the process may move on to the next instruction. However, if according to line 16 of the definition the special value "enabling.p" had been found from the state location of the process this would indicate that none of the alternative components is yet ready and the sequence beginning at line 17 occurs. The special value "waiting.p" is written into the state location 67 for the process and lines 19 and 20 test if the process is awaiting a timer component. If according to line 20 the process has the value "TimeSet.p" then the content of the AREG is incremented by 1 in order to indicate the time when the process should be scheduled and according to line 23 the procedure "Insert In Timer List" is carried out. This will have the effect of putting the process onto the appropriate priority timer list so that the process is descheduled but contains an indication of the time when it should be rescheduled. In accordance with line 24 of the definition, the BREG may have the value "TimeNotSet.p" if the process is not awaiting any timer components and this will arise where the process is still awaiting a channel input rather than a timer input. In this situation the sequence following line 25 occurs and the instruction pointer for the process is stored in the IPTR location 65 of the process workspace and the SNPFlag is set to the value 1 so that the process is descheduled. It will therefore be seen that in the definition lines 6 to 9 test whether the process is ready because of a timer input. Lines 13 and 14 test if the process is ready due to a non-timer input e.g. a channel input. Line 16 onwards is applicable where the proces is not found ready.

The next instruction carried out by the process if it is not descheduled or when it is subsequently rescheduled, will be to effect the operation "disable timer" for each of the timer components, "disable skip" for any skip components and "disable channel" for any channel components. The channel input components and skip components are reexamined by the "disable channel" and "disable skip" operations as described in the above mentioned copending patent applications. The timer alternative process reexamines the timer input components in accordance with the definition of the operation "disable timer". Initially the AREG is loaded with a code offset to indicate the offset necessary in the program sequence in order to locate subsequent program instructions should that alternative component be selected by the process. A guard value is loaded into the BREG and the CREG is loaded with the time at which the process is to be scheduled. Line 2 of the definition checks whether the guard value is false and if so then this component cannot be selected and the AREG is loaded with the value MachineFALSE. Provided the guard was not false the process examines the content of the TLink location 68 for the process. There are three cases to consider. Firstly the TLink location may contain the value "TimeSet.p" in accordance with line 10 of the definition in this case the component is selectable if the time in the time location 69 is AFTER the specified time in the CREG. This is the condition in line 14 of the definition and if met then the process carries out the procedure "IsThisSelectedProcess". In accordance with lines 5 and 6 of the definition of that procedure, it checks whether or not the 0 location of the process workspace contains the value $-1$. If it does then this component is selected and in accordance with line 8 of the definition the 0 location of the workspace is loaded with the code offset from the AREG. If the 0 location of the workspace did not have the value $-1$ in accordance with line 10 of the procedure definition then a component process has already been selected and the present one cannot be selected.

If the "disable timer" operation finds that the TLink location 68 of the process contains a value other than "TimeSet.p" or "TimeNotSet.p" this corresponds to the situation in line 18 of the definition of "disable timer". This will arise when the process is still on a timer list such that the TLink location 68 includes a pointer to a further process on the list. The timer component is therefore not selectable as the process is still waiting on a timer list and the process is removed from the timer list by the procedure "delete from timer list". This causes the value "TimeNotSet.p" to be written into the TLink location 68 for the process.

The "disable timer" operation may find that the TLink location contains the value "TimeNotSet.p" in accordance with line 8 of the definition. In this case the TLink location 68 was set to this value by a previous "disable timer" operation which was executed while the process was on a timer list and so this component is not selectable. Consequently the AREG is set to the value MachineFALSE in accordance with line 9 of the definition.

When all of the alternative components have been reexamined, the process carries out the operation "Alternative End" and in accordance with that definition, it first loads into the OREG the code offset which has been stored in the 0 location of the process workspace and then adjusts the pointer value in the IPTR REG by the offset indicated in the OREG. This causes the process to select the next instruction in a program sequence with an offset appropriate to the alternative process selected.

Various example processes will now be described.

EXAMPLE 1

Firstly consider a priority 1 process executing a "timer input" instruction in a situation where the process is not descheduled. For example, the AREG may be loaded with a value for example 14 indicating that the process wishes to continue when the clock register contains a value AFTER 14. If the instruction is executed at a time when the clock register contains the value 20, the processor will in accordance with the first two lines of the definition of "timer input" check whether the value in the clock register is after that indicated in the AREG. In this example that condition will apply and so the process will continue without descheduling the process.

EXAMPLE 2

Figure 9A:
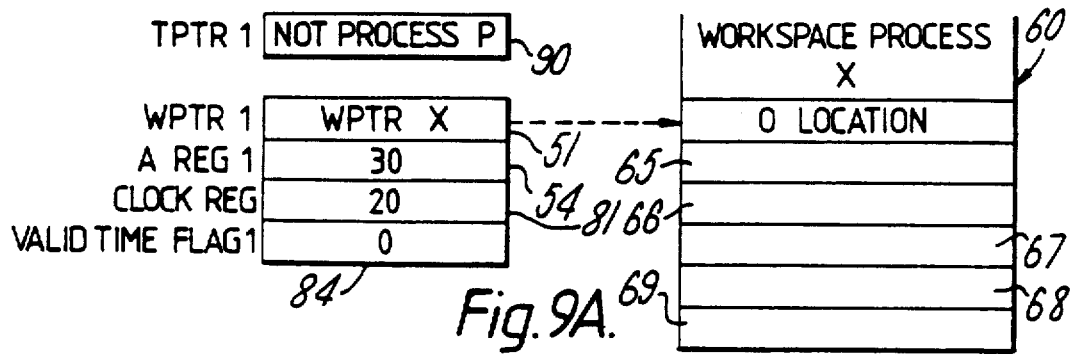
FIGS. 9A to 9D illustrate a sequence of operations for a process carrying out a "timer input" operation.
Figure 9B:
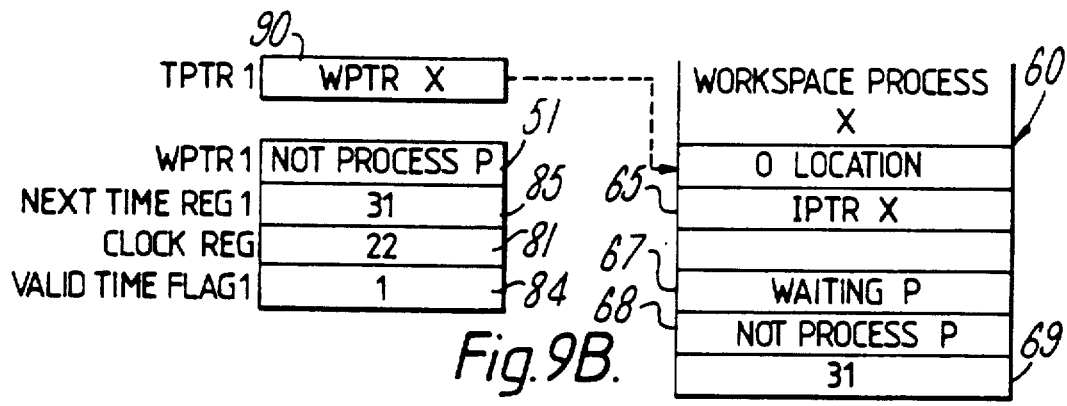

This illustrates the operation of "timer input" by a process which is descheduled and reference is made to FIGS. 9A to 9D. These indicate the changes in various word locations for the workspace 60 of process X and the contents of various register. FIG. 9A shows the position immediately before execution of the "timer input" instructions. The AREG 54 contains the value 30 indicating that the process wishes to be scheduled only when the time in the CLOCK REG 81 is AFTER 30. The CLOCK REG currently contains the time value 20 and the valid time flag 84 is set to 0 indicating that there are no processes on the priority 1 timer list. When the "timer input" operation is executed the contents of the clock register are compared with the contents of the AREG. As the value in the clock register is not AFTER the value in the AREG the process must be descheduled. As is set out from line 5 onwards of the definition of "timer input" the special value "waiting.p" is written into the state location 67 of the process X and the value in the AREG is incremented so that it contains the time at which the process should be scheduled. The process is then inserted into the timer list and the position is as shown in FIG. 9B. The CLOCK REG has now incremented to 22. The valid time flag 84 is now set to the value 1 indicating that there is at least one process on the timer list. The NEXT TIME REG 85 contains the value 31 which is the time at which the first process on the timer list should be scheduled and the TPTR location 90 contains the workspace pointer of process X being the first (and only) process on the timer list. The workspace of process X contains its instruction pointer (IPTR) in location 65, the special value "waiting.p" in location 67, special value "not process.p" in location 68 indicating that this is the last process on the timer list and the value 31 in location 69 indicating the time at which the process can be rescheduled.

Figure 9C:
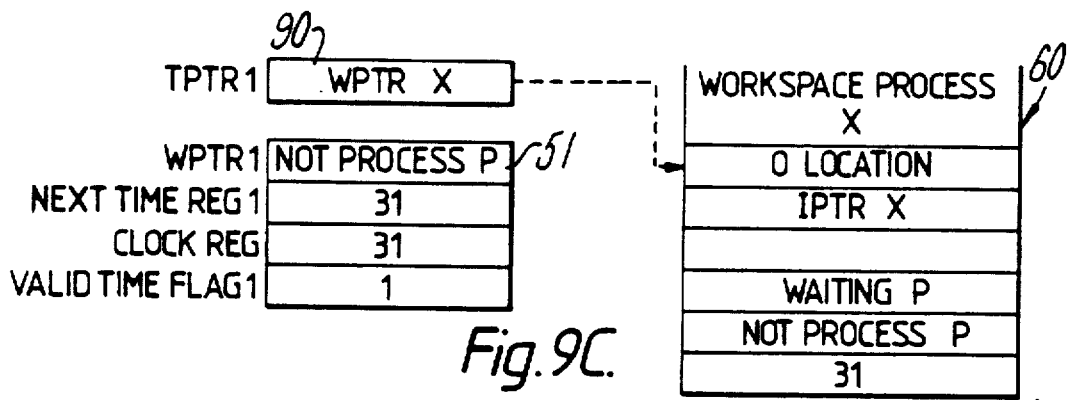
Figure 9D:
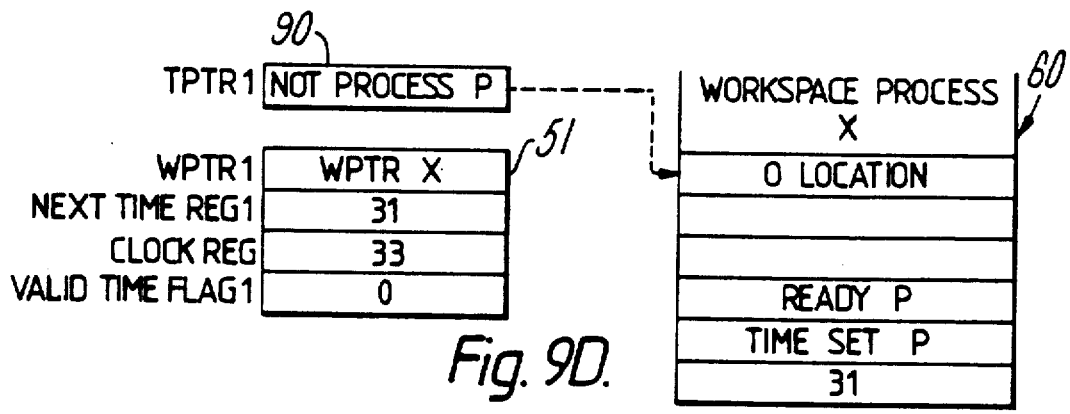

When sufficient time has passed and the clock register has incremented to the value 31 the position is as shown in FIG. 9C. As the value of the CLOCK REG now equals the value of the NEXT TIME REG and the valid time flag is set to the value 1, the timer logic will generate a time request to the processor. This causes the processor to load the PROCPRI register with the value 1 and perform the "HandleTimeRequest" procedure. This will cause process X to be scheduled and the valid time flag to be cleared and the TPTR location 90 to be set to "not process.p" and this is the position shown in FIG. 9D.

EXAMPLE 3

Figure 10A:
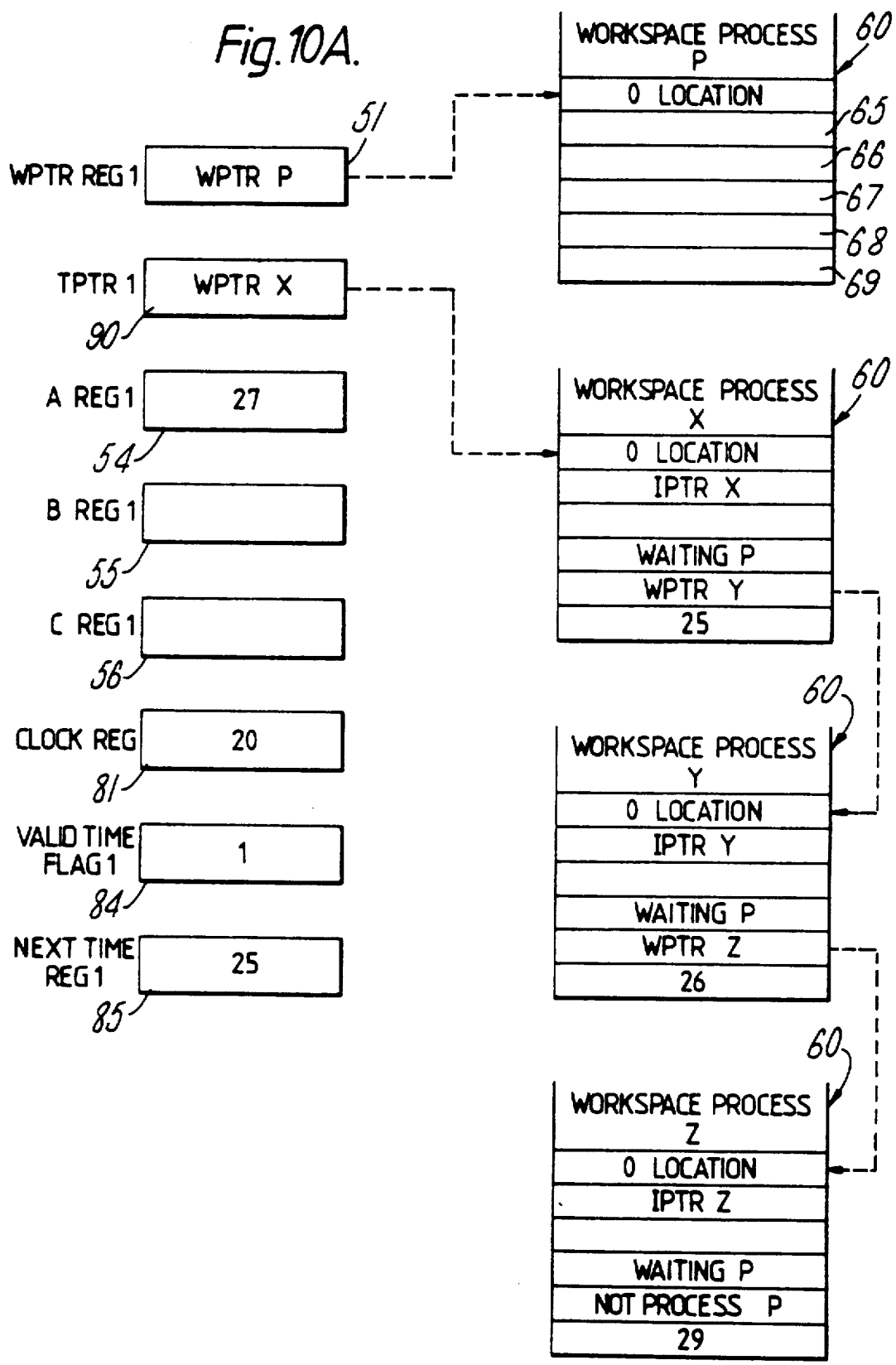
Figure 10B:
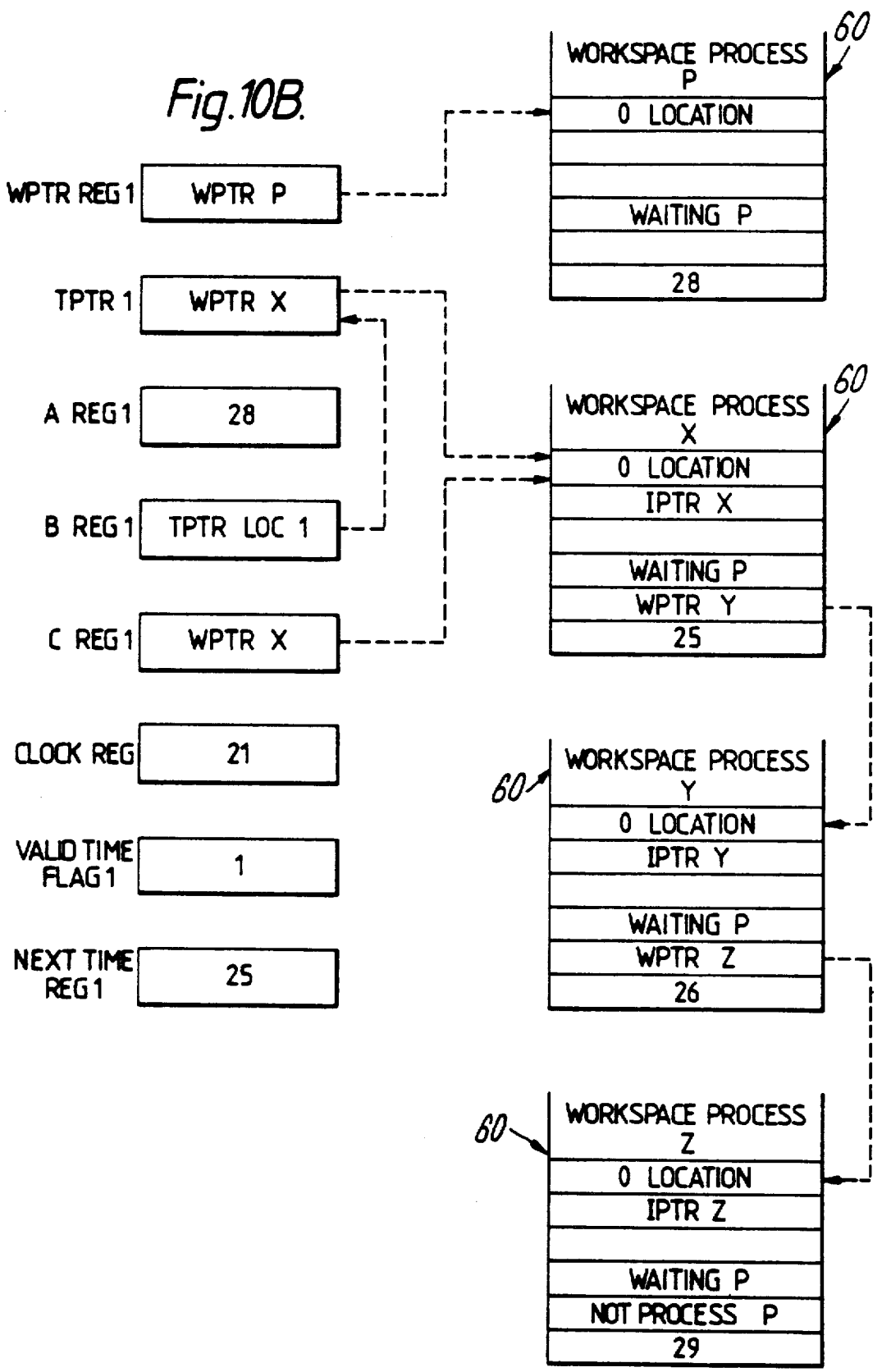

This example illustrates how the insert flag 82 is used to cause a process to be inserted into the timer list at the correct position in a time ordered sequence. A process P performs a timer input operation which causes it to be descheduled. It is assumed that process P is a priority 1 process and is the only process executing. It is further assumed that there are three other processes waiting on the priority 1 timer list, these are process X waiting for time 25, process Y waiting for time 26 and process Z waiting for time 29. FIG. 10A illustrates the position just before executing the timer input instruction. Process P is executing and the AREG contains the time 27. The CLOCK REG contains the time 20. The valid time flag is set to the value 1 indicating that the timer list is in use and the NEXT TIME REG contains the value 25 indicating that the time associated with the earliest process on the timer list is 25. It can be seen that there are three processes on the timer list. The TPTR location 90 contains a pointer to the first of these which is process X. The TLink location 68 of process X contains a pointer to the second process Y which in turn contains a pointer to the third process Z. The TLink location 68 of process Z contains a special value "Not Process.p" indicating that process Z is the last process on the timer list. It can be seen that the timer list is ordered with the earlier process first and the latest process last. When process P executes the timer input instruction, the CLOCK REG and the AREG are compared and as the CLOCK REG is not yet AFTER the AREG a special value "waiting.p" is written into the state location 67 of process P, the AREG is incremented by 1 and the procedure "insert in timer list" is carried out. This causes the value in the AREG to be written into the time location 69 of the workspace of process P, the insert flag is set to the value 1, the BREG is set to point at the TPTR location 90 and the CREG is set to the contents of the TPTR location 90. The timer input instruction then terminates and the state is as shown in FIG. 10B.

Figure 10C:
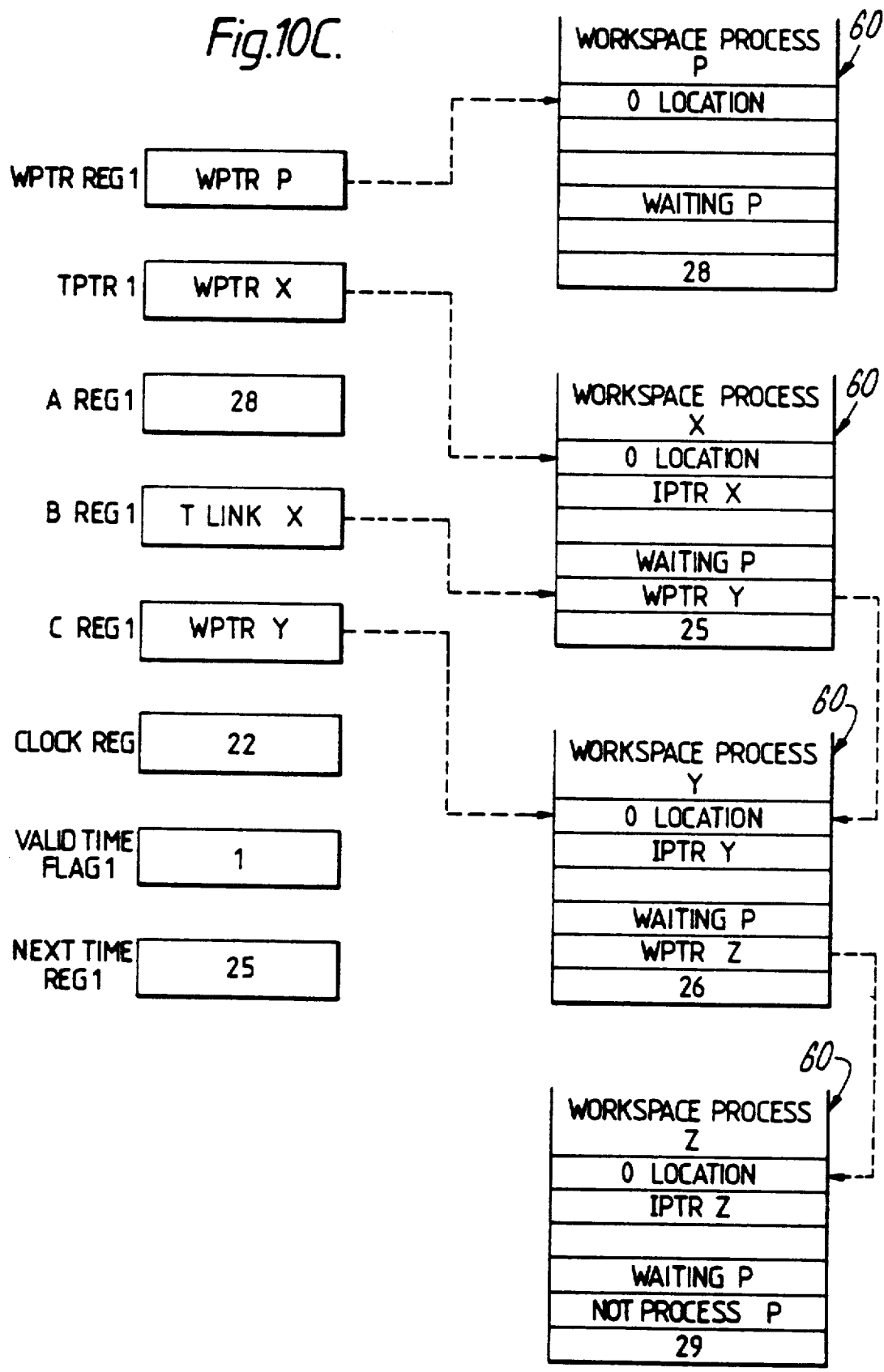
Figure 10D:
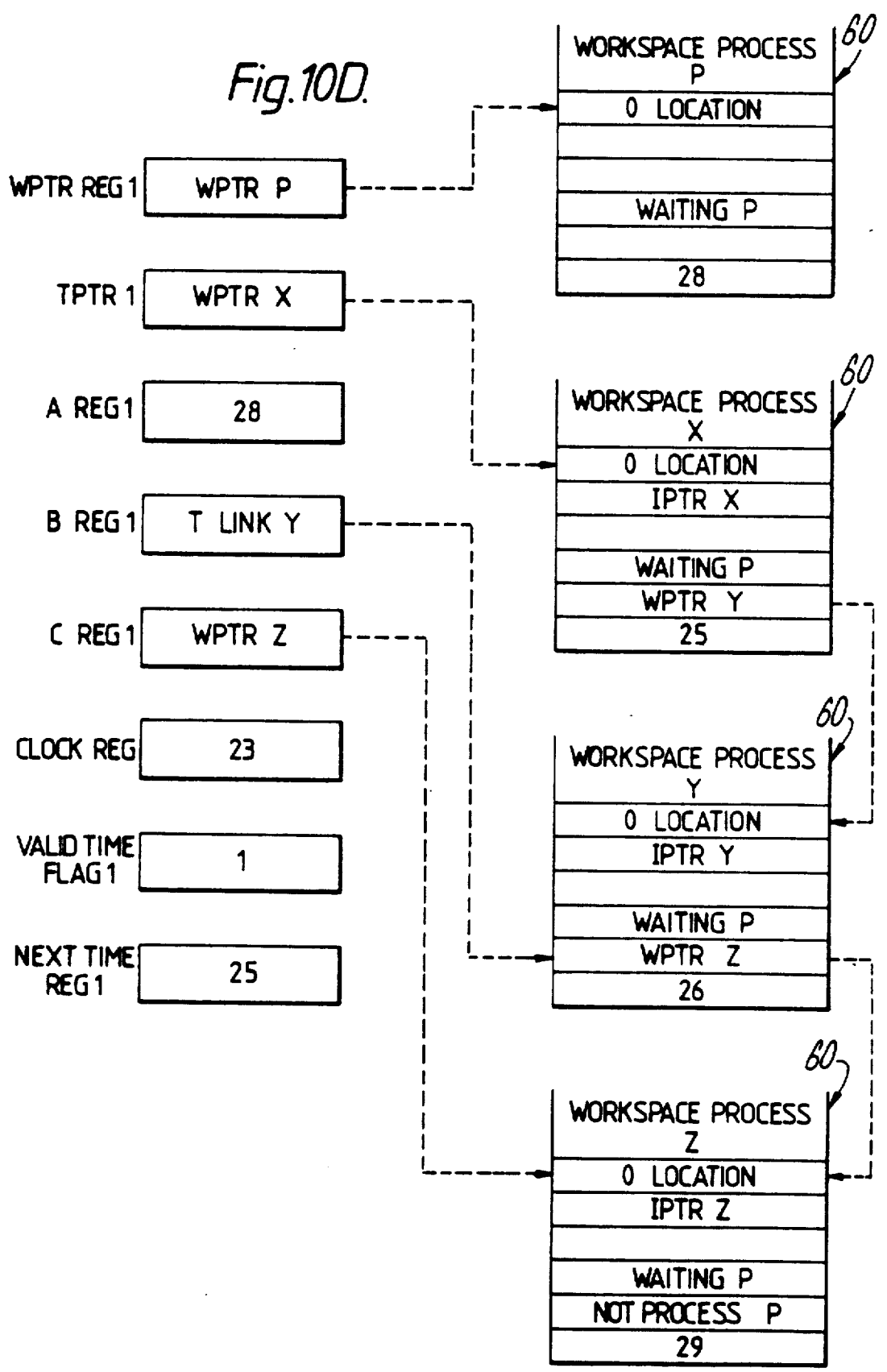

As the insert flag is set to the value 1 the next action that is performed by the processor is the procedure "insert step". As can be seen from the definition of this procedure this causes the TREG 49 to be loaded with the time associated with process X (that is 25) and will compare that with the time associated with process P (that is 28). Since 28 is AFTER 25 the processor has not yet found the correct place to insert process P into the timer list and the "insert step" procedure causes the BREG to be set to a pointer to the TLink location 68 of process X and the CREG is set to the contents of that location. The procedure then terminates leaving the insert flag set. The resulting situation is shown in FIG. 10C. The next action of the process will be to perform the procedure "insert step" again. This will be executed in a similar manner to that previously described and will result in the situation shown in FIG. 10D.

Once again the next action of the processor will be to execute the procedure "insert step". However on this occasion, the time associated with process Z (that is 29) is AFTER the time associated with process P (that is 28) and so the processor clears the insert flag and inserts process P into the timer list between process Y and process Z by writing the workspace pointer of process P into the TLink location 68 of process Y and writing the workspace pointer of process Z into the TLink location 68 of process P. The processor then resets the NEXT TIME REG 85 to the time associated with the first process on the timer list and sets the valid time flag to the value 1. Finally the processor writes the instruction pointer of process P into the IPTR location 65 of process P and sets the SNPFlag 58 to the value 1 to cause process P to be descheduled as the next action of the processor. The resulting situation is shown in FIG. 10E.

EXAMPLE 4

Figure 11A:
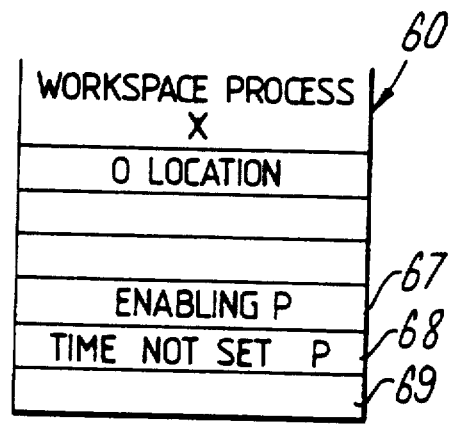
FIGS. 11A to 11C illustrate a sequence of operations for a Time Alternative process and in particular illustrates how the process determines the earlier of the alternative times.
Figure 11B:
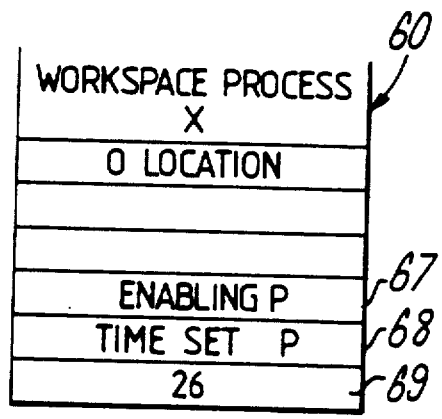
Figure 11C:
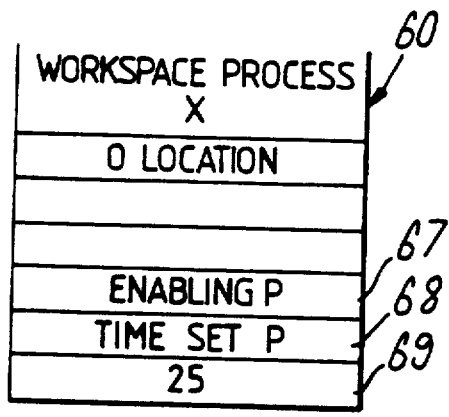

This illustrates a timer alternative process X with two timer input components. It is assumed that process X is the only runnable process, the process X has priority 1 and the time specified in the first timer input component is 26 and the second timer input component is 25. This is illustrated in FIGS. 11A to 11C. These show successive states for the workspace locations 67 to 69 of the process workspace 60. FIG. 11A shows the position immediately after executing the "timer alternative start" instruction. The state location 67 contains the special value "enabling.p" and the TLink location 68 contains the special value "TimeNotSet.p". Just before the first "enable timer" instruction is executed the AREG will contain the value MachineTRUE and the BREG will contain the time associated with this timer input which is 26. When the enable timer instruction is executed the processor reads the TLink location 68 and finds that it contains the value "TimeNotSet.p" indicating that no timer input component has previously been examined. The processor therefore sets the TLink location 68 to the special value "TimeSet.p" and the time location 69 to the value 26. This is the position shown in FIG. 11B. Immediately before the second "enable timer" instruction is executed the AREG will contain the value MachineTRUE and the BREG will contain the value 25 being the time associated with the second timer input component. When the enable timer instruction is executed the process reads the TLink location 68 and finds that it contains the value "TimeSet.p" indicating that the time location contains the earliest time associated with any previous timer input component. The processor therefore reads the time location 69 and determines that the time specified for this component which is 25, is earlier than the time read from the time location which contains the value 26. The processor therefore writes the new value 25 into the time location and the position is as shown in FIG. 11C.

EXAMPLE 5

This example which is shown in FIGS. 12A to 12C illustrates a timer alternative process P with two timer input components where the process P is not descheduled. It is assumed that process P is the only runnable process, that it is a priority 1 process and that the time specified in the first timer input component is 26 and the time of the second timer input component is 25. Execution of the "timer alternative start" instruction and the examination of the timer input components is as previously described in Example 4 and the situation immediately before executing the "timer alternative wait" instruction is as shown in FIG. 11C. The first action of the "timer alternative wait" is to write the value −1 into the 0 location of the workspace 60 of the process P. This is the location used to select a component from a plurality of alternatives. The processor next determines that process P can continue without descheduling as the time in the CLOCK REG is after the time in the time location 69. The processor therefore writes the special value "Ready.p" into the state location 67 and the value of the clock register is written into the time location 69. This results in the position shown in FIG. 12A although in that figure the clock register has now advanced to the value 31. The position just before the first "disable timer" instruction is illustrated in FIG. 12B. The AREG contains the offset from the "Alternative End" instruction to the sequence of instructions in the program associated with the first timer input component, the BREG contains the value MachineTRUE and the CREG contains the time associated with this timer component which is 26. The process then executes the "disable timer" instruction which reads the TLink location 68 and determines that it contains the value "TimeSet.p". Consequently it reads the value 30 from the time location and as 30 is AFTER 26 this timer input component is selectable. The processor then performs the procedure "IsThisSelectedProcess" which will select this component as the 0 location of the process workspace still contains the value −1. The resulting situation is shown in FIG. 12C. The second timer input component cannot now be selected and when the Alternative End instruction is executed the workspace for process P will still be as illustrated in FIG. 12C.

EXAMPLE 6

Figure 13D:
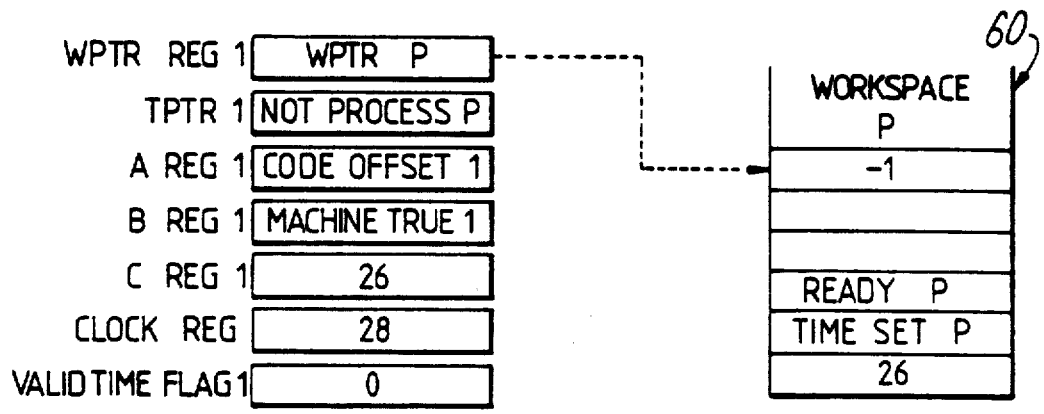
Figure 13E:
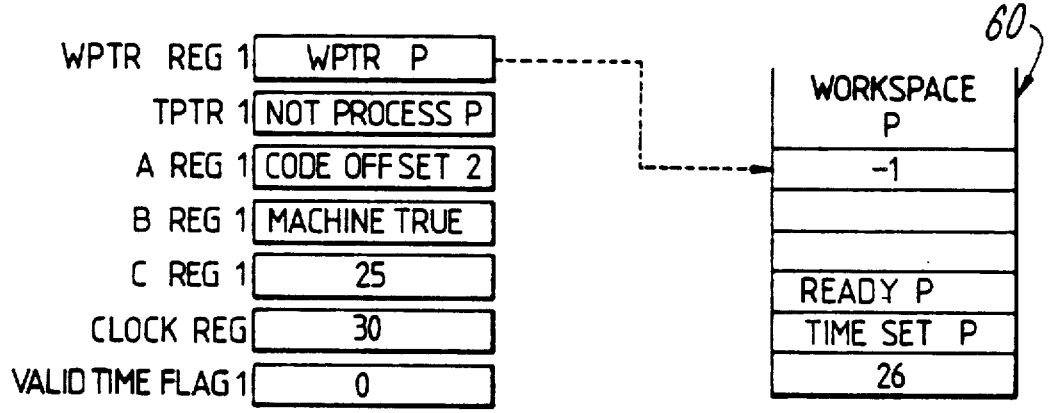
Figure 13F:
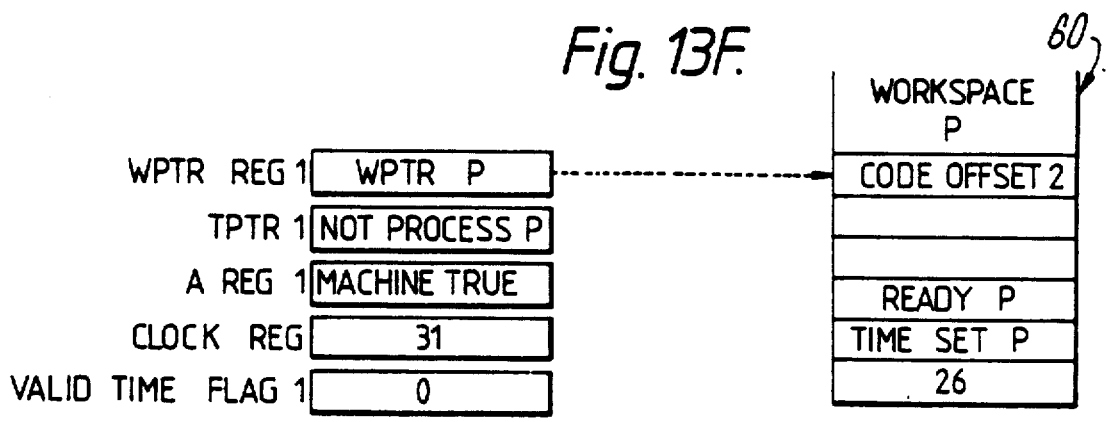

This example illustrated in FIGS. 13A to 13F shows a timer alternative process P with two timer input components where the process P is descheduled. It is assumed that process P is the only runnable process, that the process has priority 1, the time specified in the first timer input component is 26, the time specified in the second timer input is 25 and there are no processes on the timer list. The execution of the "timer alternative start" instruction and the examination of the timer input components is as previously described in Example 4 and the position immediately before executing "timer alternative wait" instruction is as previously shown in FIG. 11C. The first action of the "timer alternative wait" instruction is to write the value −1 into the zero location of the workspace of process P. The processor compares the value in the time location 69 with the value of the clock register and, finding that the process cannot proceed due to a timer input, checks the state location 67 of the process. As this contains "enabling.p" the process is placed on the timer list and descheduled. This is the position shown in FIG. 13A. The valid time flag is set to the value 1 indicating that the timer list is not empty. The NEXT TIME REG contains the value 26 which is the time at which process P will become ready to execute. The TPTR location 90 contains a pointer to the workspace of the process P and the TLink location 68 of process P contains the special value "not process.p" indicating that it is the last process on the list. When sufficient time has passed the timer will make a "timer request" signal to the processor as described in Example 2. The situation when the signal is made is as shown in FIG. 13B. When the process has been rescheduled the position is as shown in FIG. 13C. The situation immediately before executing the first "disable timer" instruction is as shown in FIG. 13D. When the timer instruction is executed the TLink location 68 is read and found to contain "TimeSet.p". The processor then compares the time associated with this time component which is 26 with the time indicated in the time location 69 this time also being 26. As 26 is not AFTER 26 this component is not selectable. The processor therefore loads the value MachineFALSE into the AREG and the instruction terminates. The situation immediately before process P executes the second "disable timer" instruction is as illustrated in FIG. 13E. The execution of this instruction will cause this component to be selected resulting in the situation as shown in FIG. 13F.

EXAMPLE 7

Figure 14A:
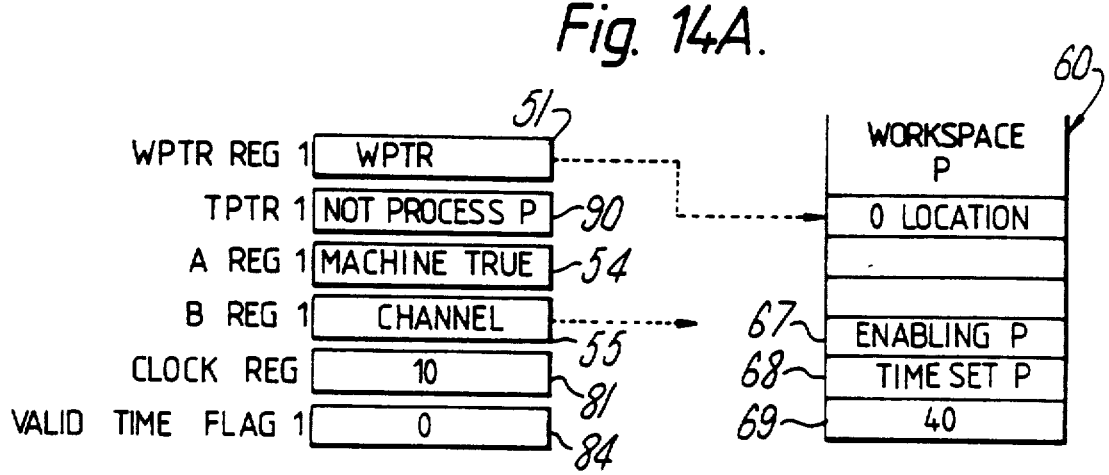
FIGS. 14A to 14D illustrate a sequence of operations for a process selecting between the alternative of an input from a message channel or the occurrence of a particular time, the message channel being ready to communicate at the time the process starts the selection.
Figure 14B:
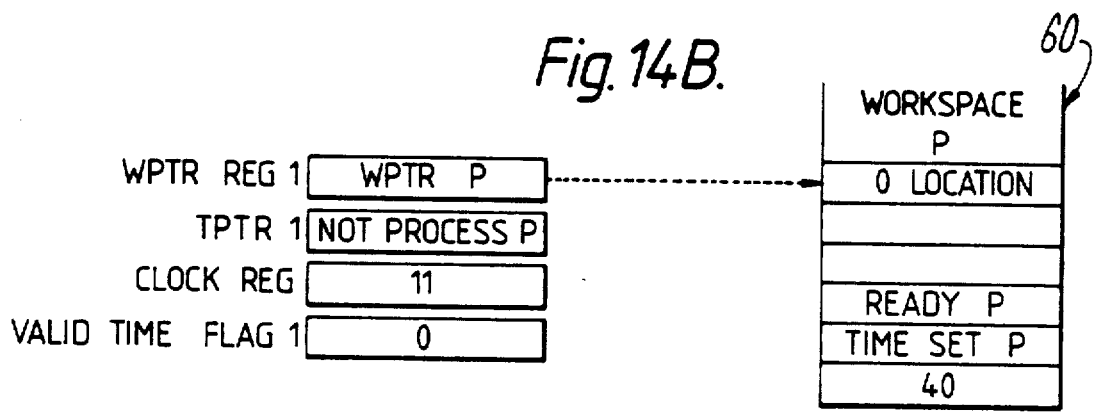
Figure 14C:
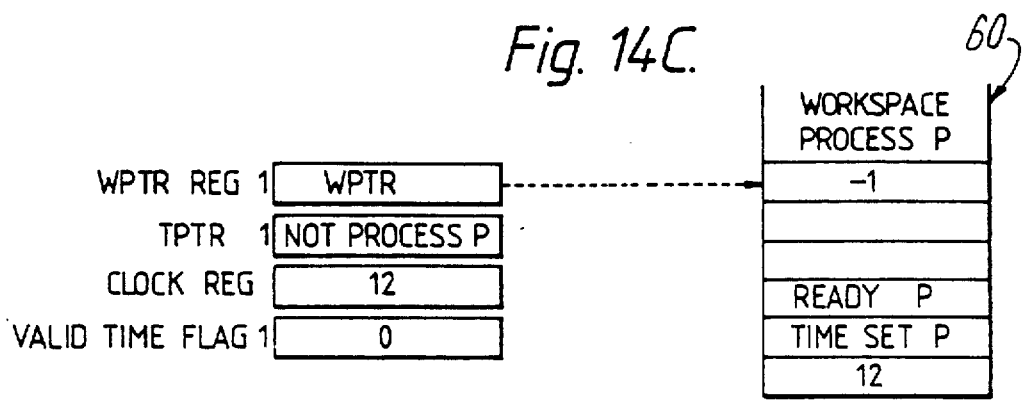
Figure 14D:
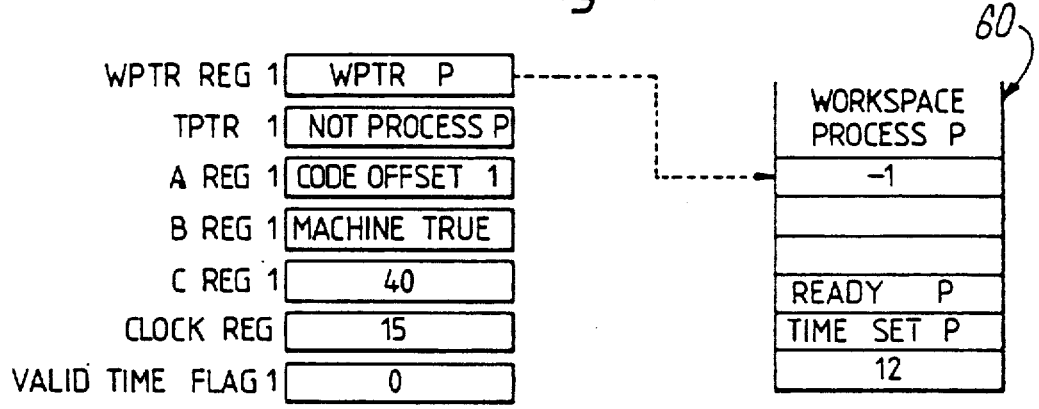

This illustrates a timer alternative process P with one timer input component and one message channel input component. It is assumed that process P is the only runnable process, that it has priority 1, and a specified time of 40. There are no processes on the timer list and the channel referred to by the channel input component is initially "Ready" and the timer input component is not selectable. This example is illustrated in FIGS. 14A to 14D. The process P executes a "timer alternative start" instruction, loads its registers appropriately and executes an "enable timer" instruction. The process then loads the registers in preparation for a "enable channel" instruction. This results in the situation shown in FIG. 14A. As the channel is "Ready" the situation after execution of the "enable channel" instruction is as shown in FIG. 14B. The process then executes a "timer alternative wait" instruction. The time in the CLOCK REG has the value 11 which is not AFTER the time 40 indicated in the time location 69 for the process P. Therefore the processor checks the state location 67 which contains the value "Ready.p" and consequently writes into the time location 69 the time value in the clock register. The situation on completion of the "timer alternative wait" instruction is as shown in FIG. 14C. The situation immediately before the "disable timer" instruction is executed is as shown in FIG. 14D. The timer input component will not be selected because the time value 12 in the time location 69 is not AFTER the time associated with the component. The process will then execute a "disable channel" instruction which will select the channel input component.

It will be seen from the above example that when "disable timer" instructions are carried out the time which is stored in the time location 69 of the process is a standard time which remains constant for all timer inputs on which the disable timer instruction is effected. This avoids different timer inputs being compared with a changing time due to the passage of time as successive "disable timer" instructions are effected.

EXAMPLE 8

Figure 15A:
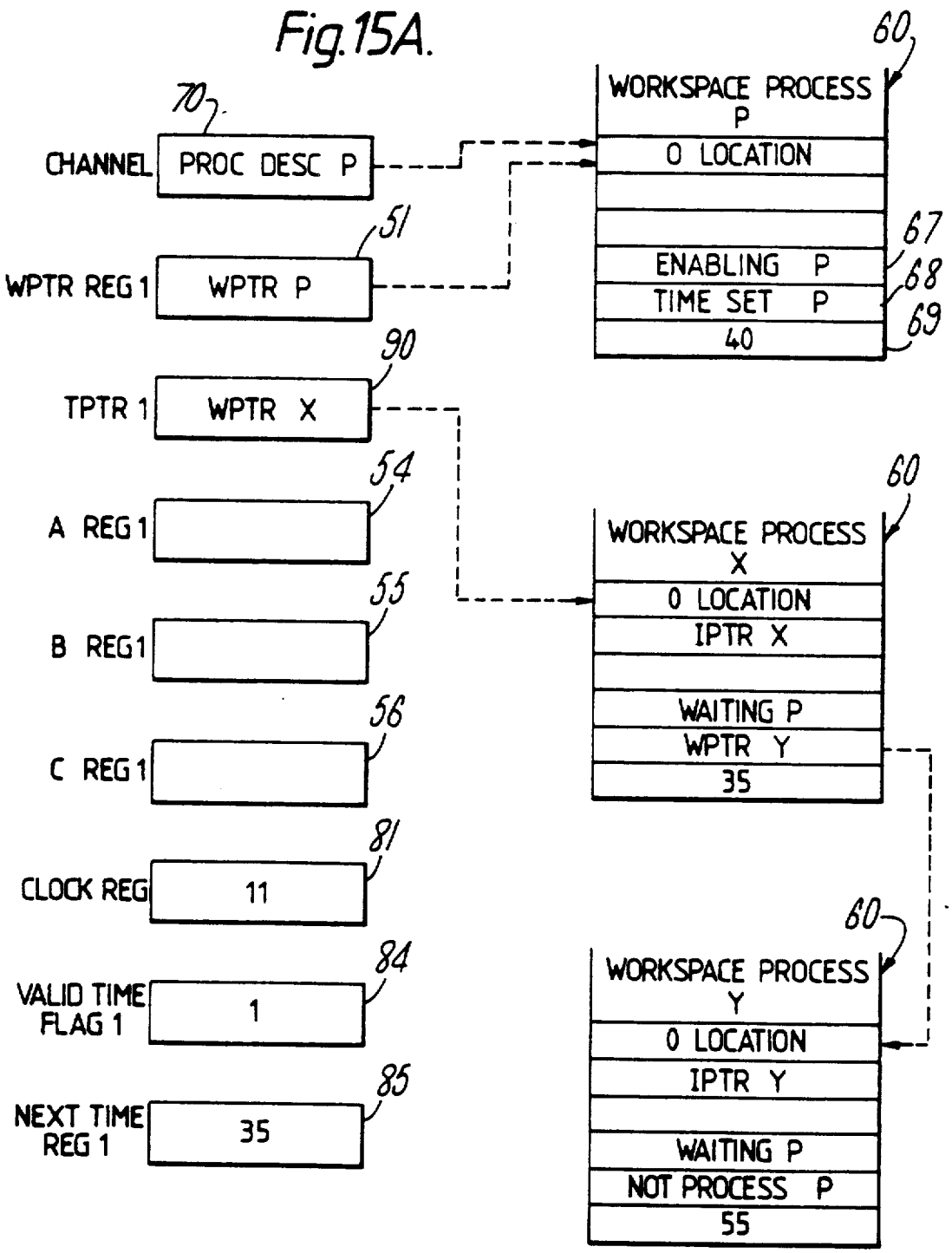
Figure 15B:
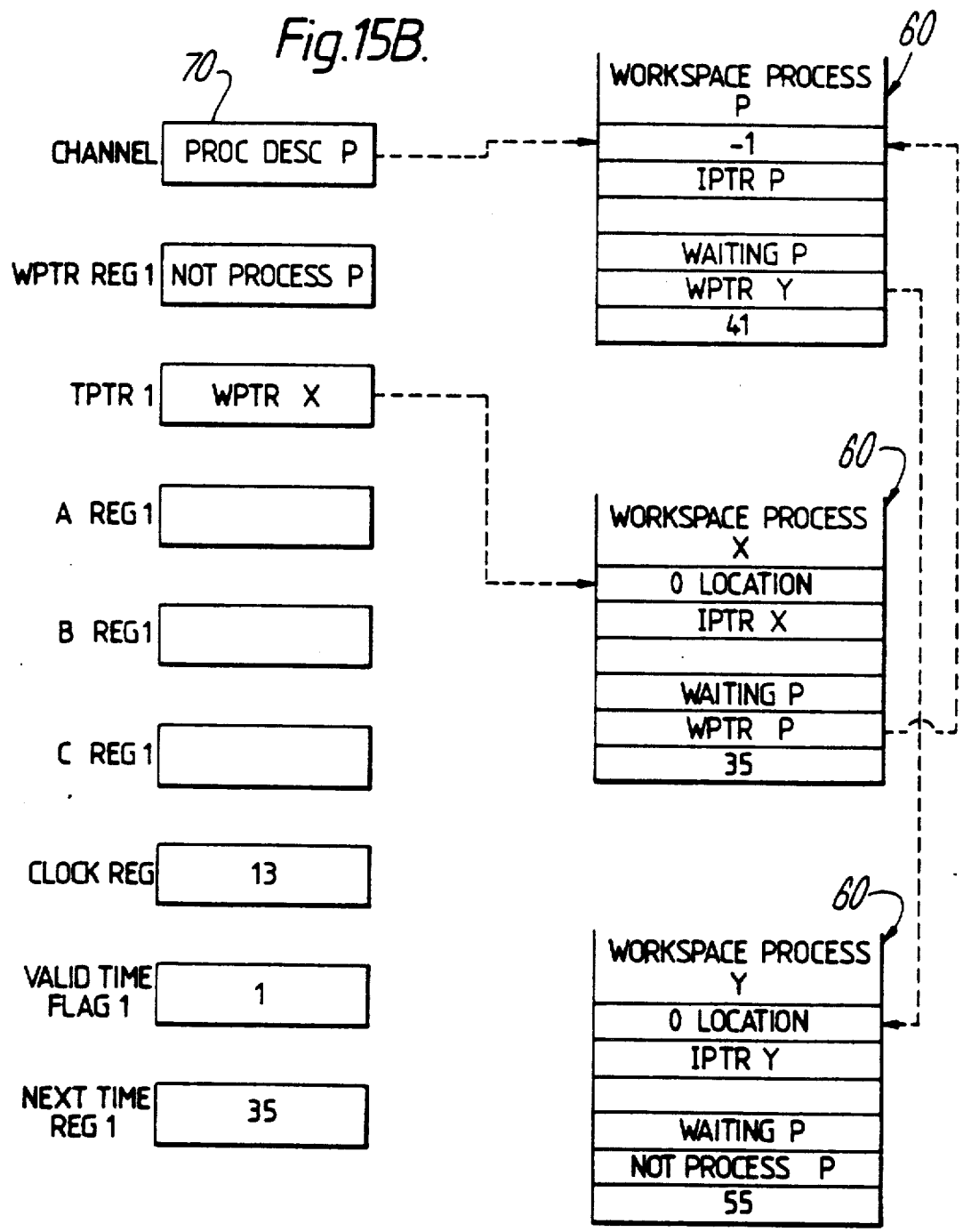
Figure 15C:
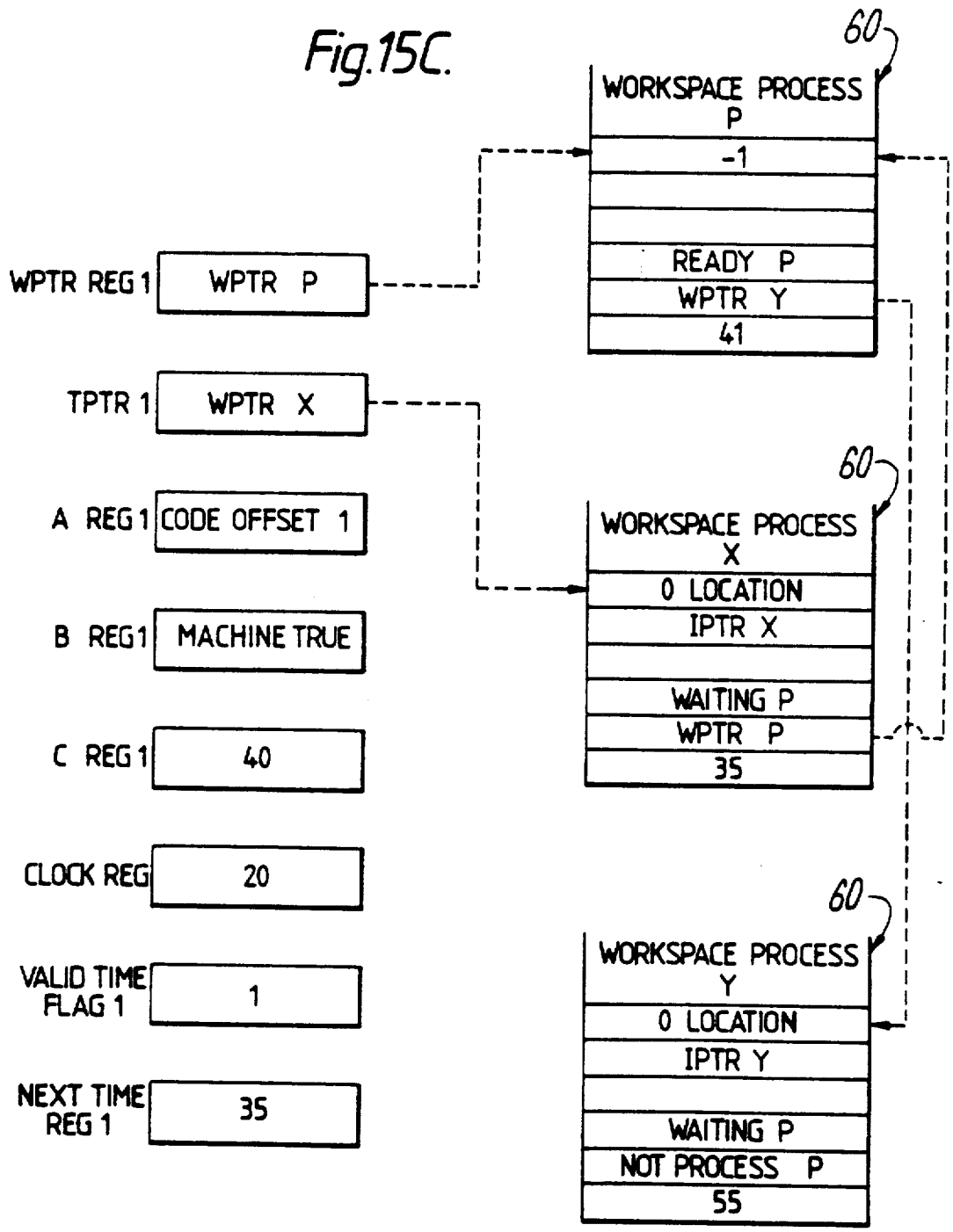
Figure 15E:
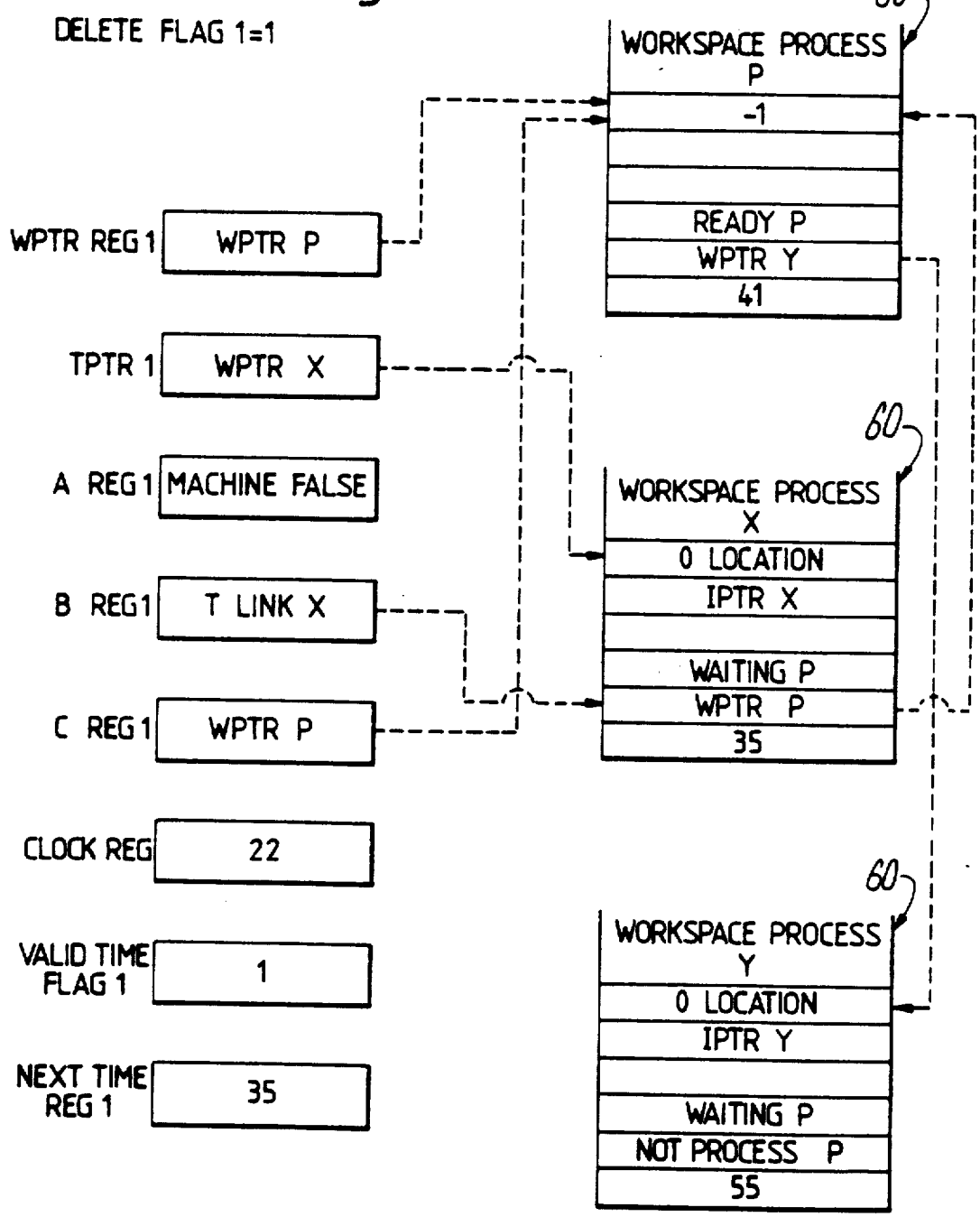
Figure 15F:
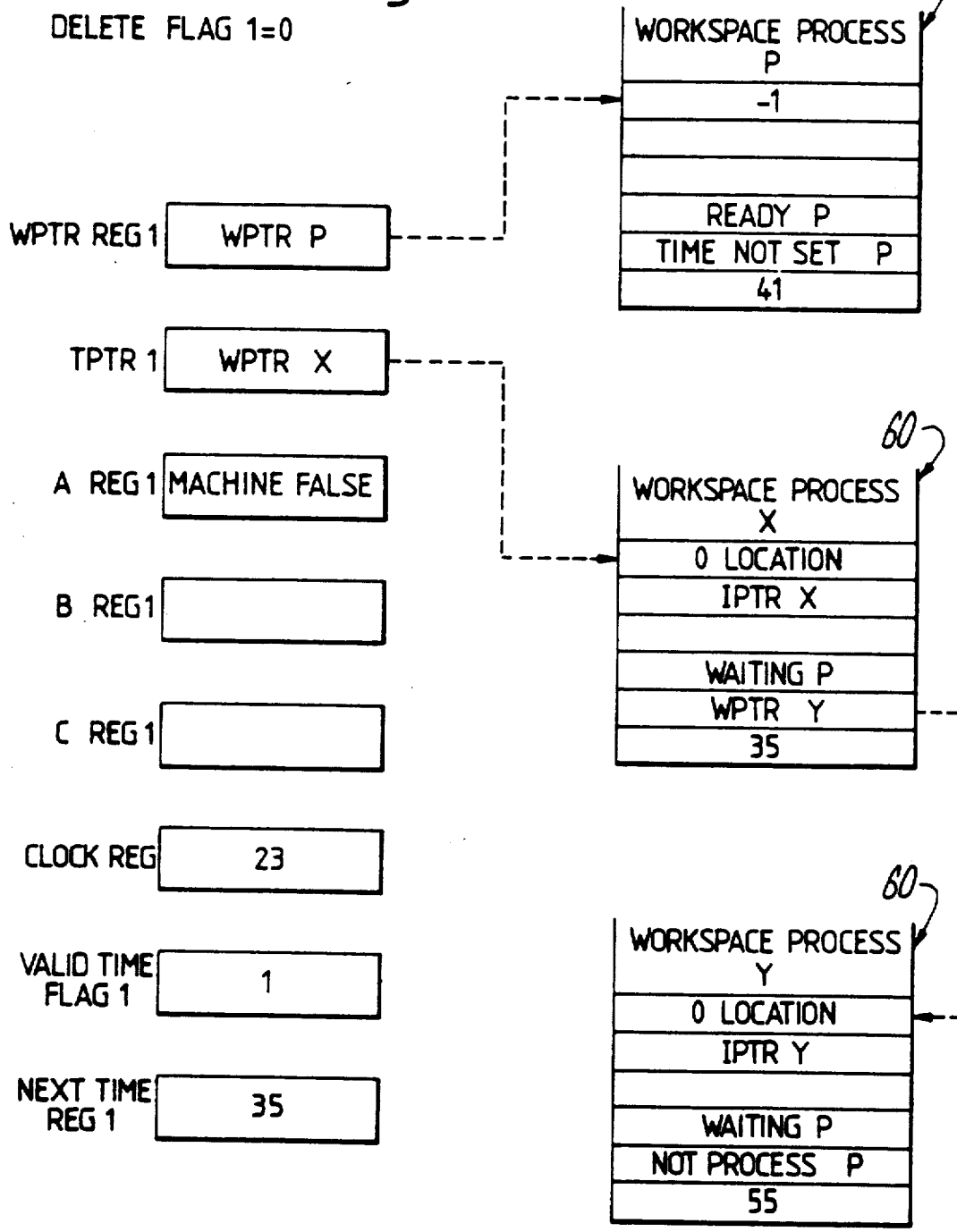

This illustrates a process P which is a Timer Alternative process having one timer input component specifying a time of 40 and one channel input component through a channel 70. It is assumed for this example that there are initially two processes on a timer list these two processes specifying times of 34 and 54. The message channel is intially not "ready" but becomes "ready" before the first process on the timer list becomes ready. In order to carry out the timer alternative process, the processor first executes a "timer alternative start" instruction, an "enable timer" operation for the one timer input component and an "enable channel" operation on the channel 70. The position is then as shown in FIG. 15A. The process P is not yet descheduled, the "state" location 67 has been initialised to "enabling.p" to indicate that the process is carrying out an alternative input. The TLink location 68 has been set to the value "Time-Set.p" indicating that a timer input has been examined. The "Time" location 69 has been set to the earliest time of any timer input examined which in this case is 40 being the only timer input examined. The timer list has two descheduled processes X and Y with scheduling times of 35 and 55 respectively. The processor then executes a "timer alternative wait" instruction for process P. This will find from the "state" location 67 of process P that there was no channel input which was "ready" and as the CLOCK REG contains the time 11 in FIG. 15A, the time has not yet arrived for the process P to proceed with the timer input and consequently process P is inserted into the timer list and is descheduled. This results in the position shown in FIG. 15B. The linked timer list now has all three processes X, P and Y in a time ordered sequence. At some later time the channel 70 becomes "ready" due to an outputting process attempting to output through that channel. As the channel contains the process descriptor of process P, process P becomes scheduled and loads its registers prior to executing a "disable timer" instruction resulting in the situation shown in FIG. 15C. The process then executes a "disable timer" operation and this reads the "TLink location" 68 for process P and determines that the process is still on a timer list as it contains the workspace pointer to the next process on the timer list. As process P is still on the list the time for that timer input component has not arrived and consequently the timer component is not selectable. The AREG is therefore set to MachineFALSE and the procedure "delete from timer list" is performed. This sets the DELETE FLAG to the value 1 loads, the BREG with a pointer to the TPTR location 90 and loads the CREG with the contents of the TPTR location 90. The instruction then terminates leaving the position as shown in FIG. 15D. As the DELETE FLAG is set to the value 1 the next action of the processor is to perform the procedure "delete step". As the TPTR location contains the workspace pointer of process X, it will be the workspace pointer of process X which is first loaded into the CREG and consequently in carrying out the procedure "delete step" the condition of line 2 of the definition of "delete step" will apply in that the CREG does not contain the workspace pointer of process P. Therefore, in accordance with lines 5 and 6 of the definition of "delete step", the process will step on to the next process in the timer list by loading the BREG with a pointer to the TLink location of process X and loading the CREG with the contents of the location pointed to by the BREG, that is a pointer to the workspace of process P. This is the situation shown in FIG. 15E. The procedure "delete stop" then terminates and as the DELETE FLAG is still set, the next action of the processor is to perform the procedure "delete stop" again. It will now be found that the condition of line 7 of the procedure "delete step" applies in that the CREG will now contain the workspace pointer of the current process which is process P. This indicates that the process to be deleted from the list has now been found and in accordance with line 9 of the definition of "delete step" the DELETE FLAG is cleared to 0. This prevents further deletion steps through the timer list. In accordance with lines 10 and 11 of the definition of "delete step", process P is removed from the timer list by loading into the CREG the value currently held in the TLink location 68 for process P (that is a pointer to the workspace pointer of process Y) and then writing the value from the CREG into the location indicated by the BREG which is the TLink location for process . X. In other words the contents of the TLink location of process X are changed to replace the pointer to the workspace of process P by a pointer to the workspace of process Y. The processor then checks whether there are any processes left on the timer queue by following line 13 of the "delete step" procedure in which the BREG is loaded with the contents of the TPTR location. If in accordance with line 15 of the definition, this has the value "not process.P" then there are no processes left on the list. The valid time flag is then set to zero in accordance with line 17. If, on the other hand, a value other than "not process.P" was found in accordance with line 18 of the definition then there is a further process on the timer list and the NEXT TIME REG is updated by taking the time from the Time location 69 of the process indicated by the BREG in accordance with line 20 of the definition. Finally after deleting the process P from the timer list the value "TimeNotSet.p" is written into the TLink location 68 of process P in accordance with line 21 of the definition of the procedure "delete step". This results in the position shown in FIG. 15F. The process P is no longer on a timer list but is still the current scheduled process. It therefore executes the next instruction which will be "disable channel". This will find the value −1 in the 0 location of the workspace of process P and consequently channel 70 will be selected for the input to the process. The appropriate code offset will be loaded into the 0 location of the workspace for process P so that on completing the next instruction "Alternative End" the code offset will be added to the instruction pointer for process P so that the process moves to the correct part of the program in accordance with the selection of the channel input.

Example Program for Process carrying out an Alternative Input from a Message Channel or Timer This example program is arranged to calculate the number of revolutions made per second by a flywheel. The process is arranged to communicate through two channels one called "rotation" and the other called "rps" which represents revolutions per second. The process is arranged to input from the channel "rotation" whenever the flywheel completes a revolution. The process may also receive a timer input so that the process may respond to the occurrence of a predetermined time. In this example the predetermined time is the successive passage of one second intervals. The process is arranged to output each second through the channel "rps" the number of revolutions which have occurred during that second. In the program the following additional notation is used:

The current value of the processor's clock is represented NOW. The occam process
    variable := NOW
assigns the current value of the processor's clock to the variable. A "timer" input is represented as
    WAIT NOW AFTER t
This input specifies that the process may not proceed until the processor clock holds a time AFTER the time t.

The program for this process is as follows:

```
1.   VAR EndOfInterval, Rotations :
2.   SEQ
3.     Rotations := 0
4.     EndOfInterval := NOW
5.     EndOfInterval := EndOfInterval + 10000
6.     WHILE TRUE
7.       ALT
8.         Rotation ? ANY
9.           Rotations := Rotations + 1
10.        WAIT NOW AFTER EndOfInterval
11.          SEQ
12.            rsp ! Rotations
13.            Rotations := 0
14.            EndOfInterval := EndOfInterval + 10000
```

Line 1 of the program specifies that the process uses two variables one of which is called "Rotations" which is used to count the number of rotations occurring in a one second interval and the other variable "EndOfInterval" is used to record the value of the processor's clock which will indicate the termination of the current one second interval. Line 2 specifies that a sequence is to be followed as set out in lines 3 to 6. In line 3 the count of number of rotations is set to 0. In line 4 the current value of the processor's clock is read so that line 5 can calculate the value of the processor's clock for the end of the one second interval. The value 10000 used in line 5 is the number of times the processor's clock increments in one second. Line 6 indicates that the alternative process which follows between lines 7 and 14 is to be repeated continuously. Line 7 identifies the process as a timer alternative process. Lines 8 and 10 set out the two alternative inputs. Line 8 may input a signal from the channel "Rotation" if the flywheel has completed a rotation. If this input is selected then the corresponding process on line 9 is executed which increments the number of rotations counted in the current one second interval. The timer input on line 10 can be selected when the current one second interval has been completed. If this timer input to the process is selected then the corresponding process on lines 12, 13 and 14 will be executed. Line 12 provides an output through the channel "rsp" indicating the count of the number of rotations which have occurred in the one interval. Line 13 resets the rotation counter to 0 and line 14 calculates the time of the end of the next one second period.

The instruction sequence for implementing this program is as follows:

| Instruction Sequence | | | Function code | Data | Program in occam language VAR EndOfInterval, Rotations: SEQ |
|---|---|---|---|---|---|
| 1.  | ldc | 0 | 7 | 0 | Rotations:= 0 |
| 2.  | stl | 4 | 1 | 4 | |
| 3.  | pfix | 1 | 14 | 1 | EndOfInterval := NOW |
| 4.  | opr | ldtimer | 13 | 15 | |
| 5.  | stl | 3 | 1 | 3 | |
| 6.  | ldl | 3 | 0 | 3 | EndOfInterval := EndOfInterval |
| 7.  | pfix | 2 | 14 | 2 | + 10000 |
| 8.  | pfix | 7 | 14 | 7 | |
| 9.  | pfix | 1 | 14 | 1 | |
| 10. | adc | 10000 | 8 | 0 | |
| 11. | stl | 3 | 1 | 3 | |
| 12. L1: | | | | | WHILETRUE |
| 13. | pfix | 2 | 14 | 2 | ALT |
| 14. | opr | talt | 13 | 1 | |
| 15. | ldlp | 1 | 2 | 1 | Rotation ? ANY |
| 16. | ldc | 1 | 7 | 1 | |
| 16a. | pfix | 1 | 14 | 1 | |
| 17. | opr | enbc | 13 | 13 | |
| 18. | ldl | 3 | 0 | 3 | WAIT NOW AFTER EndOfInterval |
| 19. | ldc | 1 | 7 | 1 | |

-continued

| Instruction Sequence | | | Function code | Data | Program in occam language VAR EndOfInterval, Rotations: SEQ |
|---|---|---|---|---|---|
| 20. | pfix | 2 | 14 | 2 | |
| 21. | opr | enbt | 13 | 3 | |
| 22. | pfix | 2 | 14 | 2 | |
| 23. | opr | taltwt | 13 | 2 | |
| 24. | ldlp | 1 | 2 | 1 | Rotation ? ANY |
| 25. | ldc | 1 | 7 | 1 | |
| 26. | ldc | (L2-L2) | 7 | 0 | |
| 26a. | pfix | 1 | 14 | 1 | |
| 27. | opr | disc | 13 | 14 | |
| 28. | ldl | 3 | 0 | 3 | WAIT NOT AFTER EndOfInterval |
| 29. | ldc | 1 | 7 | 1 | |
| 30. | ldc | (L3-L2) | 7 | 10 | |
| 31. | pfix | 2 | 14 | 2 | |
| 32. | opr | dist | 13 | 4 | |
| 32a. | pfix | 1 | 14 | 1 | |
| 33. | opr | altend | 13 | 10 | |
| 34. L2: | | | | | |
| 35. | ldlp | 0 | 2 | 0 | Rotation ? ANY |
| 36. | ldlp | 1 | 2 | 1 | |
| 37. | ldc | 1 | 7 | 1 | |
| 38. | opr | bcnt | 13 | 7 | |
| 38a. | pfix | 1 | 14 | 1 | |
| 39. | opr | in | 13 | 6 | |
| 40. | ldl | 4 | 0 | 4 | Rotations := Rotations + 1 |
| 41. | adc | 1 | 8 | 1 | |
| 42. | stl | 4 | 1 | 4 | |
| 43. | j | L4 | 9 | 14 | |
| 44. L3: | | | | | |
| | | | | | WAIT NOW AFTER EndOfInterval SEQ |
| 45. | ldlp | 4 | 2 | 4 | rsp ! Rotations |
| 46. | ldlp | 2 | 2 | 2 | |
| 47. | ldc | 1 | 7 | 1 | |
| 48. | opr | bcnt | 13 | 7 | |
| 49. | pfix | 1 | 14 | 1 | |
| 50. | opr | out | 13 | 7 | |
| 51. | ldc | 0 | 7 | 0 | Rotations := 0 |
| 52. | stl | 4 | 1 | 4 | |
| 53. | ldl | 3 | 0 | 3 | EndOfIntervals := |
| 54. | pfix | 2 | 14 | 2 | EndOfInterval + 10000 |
| 55. | pfix | 7 | 14 | 7 | |
| 56. | pfix | 1 | 14 | 1 | |
| 57. | adc | 10000 | 8 | 0 | |
| 58. | stl | 3 | 1 | 3 | |
| 59. L4: | | | | | |
| 60. | nfix | 3 | 15 | 3 | |
| 61. | j L1 | (-50) | 9 | 14 | |

As shown in this instruction sequence lines 1 and 2 initialise the count of the number of rotations to 0. Lines 3 and 4 use a pfix function in order to operate load timer to read the processor clock. Lines 6 to 11 use successive pfix functions and an add constant function to calculate the value of the processor's clock at the end of a one second interval. The time alternative input begins at line 13, lines 13 and 14 use the pfix function in order to operate "timer alternative start". Line 15 loads a pointer to the channel "Rotation" and lines 16a and 17 use the pfix function to operate "enable channel". Line 18 loasds the value of the variable "EndOfInterval". Line 19 loads the guard value and lines 20 and 21 use a pfix function to operate "enable timer". Lines 22 and 23 carry out "timer alternative wait". Lines 24 to 27 reexamine the channel input. Line 24 identifies the channel "Rotation". Line 25 loads the guard value Machine-TRUE. Line 26 loads the instruction offset which will be necessary if the channel input is selected. Lines 26a and 27 carry out the operation "disable channel". Lines 28 to 32 reexamine the timer input. Line 28 loads the variable "EndOfInterval". Line 29 loads a guard value, line 30 loads the instruction offset which will be necessary if the process selects the timer input and lines 31 and 32 carry out "disable timer". Lines 32a and 33 carry out "Alternative End". Line 35 is the first instruction which will be executed if the channel input is selected. Line 45 is the first instruction which will be executed if the timer input is selected.

The invention is not limited to the details of the foregoing examples.

We claim:

1. A microcomputer comprising memory and a processor configured to execute a plurality of concurrent processes by said processor in accordance with a plurality of program steps, at least some of said processes being time dependent, the microcomputer including a scheduling system comprising:
   (i) an addressable storage element for indicating a process which is being executed by said processor, said process being referred to as the current process;
   (ii) a timer list coupled to said storage element for identifying one or more processes which form a time-ordered collection awaiting execution by said processor after respective scheduling times for the processes in said collection;

(iii) a set of storage locations associated with said timer list for indicating scheduling times when the processes in said collection become ready for execution;

(iv) a control system coupled to said timer list and to said processor to cause said processor to add a further process to said collection at a time-ordered position between a preceding process having an earlier scheduling time and a following process having a later scheduling time;

(v) a next process indicator to indicate the next process in said time-ordered collection for execution by said processor, including timing logic responsive to said next process indicator to make said next process the current process for execution after its scheduling time occurs.

(vi) a program stage indicator for each concurrent process; said processor including timing logic responsive to said next process indicator to make said next process the current process for execution after its scheduling time occurs; and message transmission means for effecting synchronized message transmission between concurrent processes, said message transmission means comprising a plurality of communication channels, a storage apparatus for storing a status indicator to indicate the status of data communication through each channel, and synchronizing means responsive to said status indicator to stop executing a current process or add a process to a collection awaiting execution so that communication between two communicating processes is completed when the two processes are at corresponding program steps.

2. A microcomputer comprising memory, a timer and a processor coupled to read from and write into said memory, said processor being configured to execute a plurality of concurrent processes in accordance with a plurality of program steps, at least some of said processes being time dependent said time dependent process including a time-related instruction including a time value relative to said timer:

(a) the microcomputer including a scheduling system comprising (i) a time-ordered linked list of processes awaiting execution by the processor after a scheduling time for each process in said list, (ii) a set of storage locations associated with said linked list for indicating a scheduling time when the processes in said list becomes ready for execution, and (iii) an addressable storage element for indicating the process which is currently being executed by the processor, said process being referred to as the current process, (iv) a control system coupled to said time-ordered linked list for adding a further process thereto at a time-ordered position between a preceding process having an earlier scheduling time and a following process having a later scheduling time, (v) a next process indicator to indicate the next process on said time-ordered list, and (vi) a program stage indicator for each concurrent process; and (b) said memory providing for each process a respective workspace having a plurality of addressable locations, each of said work spaces for a process on said time-ordered list including (i) first memory locations for recording variables associated with the corresponding process, (ii) a second memory location for said program stage indicator for the corresponding process, (iii) a third memory location for indicating the next process on said time-ordered linked list;

whereby when said processor executes a time-related instruction, said processor compares said time-related instruction to the time indicated by said timer, and, in response to said time-related instruction having arrived in said timer, continuing execution of said current process; in response to said time value in said time related instruction having not yet arrived, stopping execution of said current process and causing said control to add said current process to said collection.

3. A microcomputer comprising memory and a processor coupled to read from and write into said memory, said processor being configured to execute a plurality of concurrent processes in accordance with a plurality of program steps, at least some of said processes being time dependent:

(a) the microcomputer including a scheduling system comprising (i) a time ordered linked list of processor after a scheduling time for each process in said list, (ii) a set of storage locations associated with said linked list for indicating a scheduling time when the processes in said list becomes ready for execution, and (iii) an addressable storage element for indicating the process which is currently being executed by the processor, said process being referred to as the current process, (iv) a control system coupled to said time-ordered linked list for adding a further process thereto at a time-ordered position between a preceding process having an earlier scheduling time and a following process having a later scheduling time, (v) a next process indicator to indicate the next process on said time-ordered list, and (vi) a program stage indicator for each of said concurrent processes;

(b) said memory providing for each process a respective workspace having a plurality of addressable locations, each of said work space for a process on said time-ordered lists including (i) first memory locations for recording variables associated with the corresponding process, (ii) a second memory location for said program stage indicator for the corresponding process, (iii) a third memory location for indicating the next process on said time ordered linked list; and (c) the microcomputer further including message transmission means for effecting synchronized message transmission between concurrent processes, said message transmission means comprising a plurality of communication channels, a status indicator for indicating the status of data communication through each channel, and synchronizing means responsive to the status indicator to a current process or add a process to a collection awaiting execution so that communication between two communicating processes is completed when the two processes are at corresponding program steps.

4. A network of directly interconnected microcomputers each comprising a timer and a single integrated circuit microcomputer comprising memory and a processor arranged to execute a plurality of concurrent processes in accordance with a plurality of program steps, said program steps comprising a plurality of instructions for sequential execution by the processor, some of said plurality of instructions being time related, said time related instructions including a time value relative to said timer, each said microcomputer including a scheduling system comprising:
(i) an addressable storage element for indicating the process which is being executed by the processor, said process being referred to as the current process;
(ii) a timer list for identifying one or more processes which form a time-ordered collection awaiting execution by the processor after respective scheduling times for each process in said collection;
(iii) a set of storage locations associated with said timer list for storing data to indicate respective scheduling times when the processes in said collection becomes ready for execution;
(iv) a control system coupled to said timer list for adding a further process to said collection at a time-ordered position between a preceding process having an earlier scheduling time and a following process having a later scheduling time;
(v) a next process indicator to indicate the next process in said time-ordered collection for execution by the processor; and
(vi) a program stage indicator for each concurrent process;
said processor further including a logic circuit responsive to said next process indicator to make the next process in said collection the current process for execution after its scheduling time occurs; whereby when said processor executes a time-related instruction, said processor compares said time-related instruction to the time indicated by said timer, and, in response to said time-related instruction having arrived in said timer, continuing execution of said current process; in response to said time value in said time related instruction having not yet arrived, stopping execution of the current process and causing said control to add said current process to said collection.

5. A network of directly interconnected microcomputers each comprising a single integrated circuit microcomputer comprising memory and a processor arranged to execute a plurality of concurrent processes in accordance with a plurality of program steps, said program steps comprising a plurality of instructions for sequential execution by the processor, each said microcomputer including a scheduling system comprising:
(i) an addressable storage element for indicating the process which is being executed by the processor, said process being referred to as the current process;
(ii) a timer list for identifying one or more processes which form a time-ordered collection awaiting execution by the processor after respective scheduling times for each process in said collection;
(iii) a set of storage locations associated with said timer list for storing data to indicate respective scheduling times when the processes in said collection becomes ready for execution;
(iv) a control system coupled to said timer list for adding a further process to said collection at a time-ordered position between a preceding process having an earlier scheduling time and a following process having a later scheduling time;
(v) a next process indicator to indicate the next process in said time-ordered collection for execution by the processor; and
(vi) a program stage indicator for each concurrent process, said processor further including a logic circuit responsive to said next process indicator to make the next process in said collection the current process for execution after its scheduling time occurs; and
said microcomputer further including message transmission means for effecting synchronized message transmission between concurrent processes, said message transmission means comprising a plurality of communication channels, a storage apparatus for storing a status indicator for indicating the status of data communication through each channel, and synchronizing means responsive to said status indicator to stop a current process or add a process to a collection awaiting execution so that communication between two communicating processes is completed when the two processes are at corresponding program steps.

6. A method of operating concurrent processes, at least some of which are time dependent processes, in a computer system wherein each concurrent process executes a program having a plurality of instructions, comprising the steps of:
forming a first pointer for each process to identify the process;
forming a second pointer for each process to indicate a program stage for the process;
scheduling a plurality of processes for execution by one processor including
providing an indication of a process which is being executed by said one processor, said process being referred to as the current process;
identifying a time-ordered collection of processes each having a respective scheduling time when the process may be executed by said one processor; and
providing an indication of said scheduling time for each process in the time-ordered collection, the process in said collection having the earliest scheduling time being indicated as the next process;
wherein execution of said current process comprises executing a sequence of instructions including a time related instruction indicating a scheduling time before which the current process is not to continue execution and responding to execution of said time related instruction by (a) determining whether said scheduling time has yet arrived, (b) in response to determining that the scheduling time has arrived, then continuing execution of the said process, and (c) in response to determining that the scheduling time has not yet arrived, (i) storing said second pointer for the process, (ii) stopping execution of the said current process, (iii) causing the said one processor which executed said time related instruction to add the stopped process to said time-ordered collection at a position in the time-ordered collection such that its scheduling time forms an ordered sequence of scheduling times in the collection, and (iv) setting the indication of the current process to indicate a further scheduled process;
at a time after the scheduling time of said next process, responding to execution of an instruction stopping the current process by setting the indication of the current process to indicate the said next process and executing said next process at a program stage indicated by the second pointer for the said next process; and
transmitting messages between concurrent processes through a plurality of addressable communication channels to permit data communication between processes, wherein each process executes a sequence of instructions in a program including communication instructions arranged to complete message transmission between two processes when both are at corresponding program stages.

7. A method according to claim 6 comprising operating concurrent processes in a computer system comprising a network of interconnected integrated circuit devices and wherein said step of transmitting messages between concurrent processes is effected by addressing communication channels of a first type to permit data communication between two processes both on the same integrated circuit device and addressing channels of a second type to permit data communication between processes wherein one process is on one said integrated circuit device and the other process is on another integrated circuit device.

8. A method of operating concurrent processes, at least some of which are time dependent processes, in a computer system wherein each concurrent process executes a program having a plurality of instructions, comprising the steps of:

forming a first pointer for each process to identify the process;

forming a second pointer for each process to indicate a program stage for the process;

scheduling a plurality of processes for execution by one processor including providing an indication of a process which is being executed by said one processor, said process being referred to as the current process;

identifying a time-ordered collection of processes each having a respective scheduling time when the process may be executed by said one processor; and providing an indication of said scheduling time for each process in the time-ordered collection, the process in said collection having the earliest scheduling time being indicated as the next process;

wherein execution of said current process comprises executing a sequence of instructions including a time related instruction indicating a scheduling time before which the current process is not to continue execution and responding to execution of said time related instruction by (a) determining whether said scheduling time has yet arrived, (b) in response to determining that the scheduling time has arrived, continuing execution of the said current process, and (c) in response to determining that the scheduling time has not yet arrived, then (i) storing said second pointer for the said current process, (ii) stopping execution of the said current process, (iii) causing the said one processor which executed said time related instructing to add the stopped process to said time-ordered collection at a position in the time-ordered collection such that its scheduling time forms an ordered sequence of scheduling times in the collection, and (iv) setting the indication of the current process to indicate a further scheduled process;

at a time after the scheduling time of said next process, responding to execution of an instruction stopping the current process by setting the indication of the current process to indicate the said next process and executing said next process at a program stage indicated by the second pointer for the said next process; and executing a process having a plurality of alternative time related components, indicating a time associated with each component, and determining whether the time associated with any of the components has yet occurred.

9. A method according to claim 8 further comprising descheduling the process there defined if the earliest time associated with any of said alternative time related components has not yet occurred and adding said process to said time-ordered collection.

10. A method according to claim 8 further comprising loading into a memory location for the current process a special value indicating the state of the process and indicating that the process is one with alternative components.

11. A method according to claim 10 further comprising loading into said memory location a first special value to indicate that at least one of the alternative components is ready and the process is to remain scheduled, and loading a second special value into said memory location to indicate that the process is descheduled while awaiting arrival of the time associated with one of the alternative components.

12. A method according to claim 8 further comprising loading into a memory location associated with the current process a special value to indicate that none of the alternative components has yet been selected and responding to said special value in order to select one of the alternative process components when the process is scheduled.

13. A method according to claim 8 wherein said process includes a plurality of alternative components at least some of which are time related, and wherein at least one of said alternative components comprises inputting a message through a communication channel, said method including determining whether the earliest time of any time related component has yet occurred and determining whether any communication channel is ready to input a message.

14. A method of operating concurrent processes, at least some of which are time dependent processes, in a computer system wherein each concurrent process executes a program having a plurality of instructions, comprising the steps of:

forming a first pointer for each process to identify the process;

forming a second pointer for each process to indicate a program stage for the process;

scheduling a plurality of processes for execution by one processor including providing an indication of a process which is being executed by said one processor, said process being referred to as the current process;

identifying a time-ordered collection of processes each having a respective scheduling time when the process may be executed by said one processor; and providing an indication of said scheduling time for each process in the time-ordered collection, the process in said collection having the earliest scheduling time being indicated as the next process;

wherein execution of said current process comprises executing a sequence of instructions including a time related instruction indicating a scheduling time before which the current process is not to continue execution and responding to execution of said time related instruction by (a) determining whether said scheduling time has yet arrived, (b) in response to determining that the scheduling time has arrived, continuing execution of the said process and (c) in response to determining that the scheduling time has not yet arrived, (i) storing said second pointer for the said current process, (ii) stopping execution of the said current process, (iii) causing the said one processor which executed said time related instruction to add the stopped process to said time-ordered collection at a position in the time-ordered collection such that its scheduling time forms an ordered sequence of scheduling times in the collection, and (iv) setting the indication of the current process to indicate a further scheduled process, and at a time after the scheduling time of said next process, responding to execution of an instruction stopping the current process by setting the indication of the current process to indicate the said next process and executing said next process at a program stage indicated by the second pointer for the said next process; and specifying a time duration for the execution of a current process, responding to said time duration to stop executing the current process after expiry of the time duration, and rescheduling the process by adding it to a scheduled collection.

15. A microcomputer comprising memory and a processor configured to execute a plurality of concurrent processes by said processor in accordance with a plurality of program steps, at least some of said processes being time dependent, the microcomputer including a scheduling system comprising:

(i) an addressable storage element for indicating a current process which is being executed by said processor, said process being referred to as the current process;

(ii) a timer list coupled to said storage element for identifying one or more processes which form a time-ordered collection awaiting execution by said processor after respective scheduling times for the processes in said collection;

(iii) a set of storage locations associated with said timer list for indicating scheduling times when the processes in said collection become ready for execution;

(iv) a control system coupled to said timer list and to said processor to cause said processor to add a further process to said collection at a time-ordered position between a preceding process having an earlier scheduling time and a following process having a later scheduling time;

(v) a next process indicator to indicate the next process in said time-ordered collection for execution by said processor;

(vi) a program stage indicator for each concurrent process; said processor including timing logic responsive to said next process indicator to make said next process the current process for execution after its scheduling time occurs; and the microcomputer further including one or more communication channels for message transmission between concurrent processes and synchronizing means for synchronizing message transmission through said channels.

16. The microcomputer according to claim 15 wherein said scheduling system further includes means for identifying processes which form a scheduled collection of processes awaiting execution by the processor and control means for adding a process to said scheduled collection, said scheduling system being responsive to said synchronizing means to terminate execution of the current process or to add a process to said scheduled collection thereby to achieve synchronization between concurrent processes.

17. The microcomputer according to claim 15 wherein said communication channels include a communication link which can be connected by a dedicated connection to a similar link on another device, thereby permitting message transmission with synchronization between concurrent processes on different microcomputers.

18. The microcomputer according to claim 15 wherein a process may execute one of a number of alternative components at least one of which is time related and at least one of which involves an input through one of said communication channels, said microcomputer further including means for determining whether the earliest time of any said time related component has yet occurred and whether any of said communication channels is ready yet to input a message.

19. A microcomputer comprising memory and a processor configured to execute a plurality of concurrent processes by said processor in accordance with a plurality of program steps, at least some of said processes being time dependent, the microcomputer including a scheduling system comprising:

(i) an addressable storage element for indicating a process which is being executed by said processor, said process being referred to as the current process;

(ii) a timer list coupled to said storage element for identifying one or more processes which form a time-ordered collection awaiting execution by said processor after respective scheduling times for the processes in said collection;

(iii) a set of storage locations associated with said timer list for indicating scheduling times when the processes in said collection become ready for execution;

(iv) a control system coupled to said timer list and to said processor to cause said processor to add a further process to said collection at a time-ordered position between a preceding process having an earlier scheduling time and a following process having a later scheduling time;

(v) a next process indicator to indicate the next process in said time-ordered collection for execution by said processor;

(vi) a program stage indicator for each concurrent process; said processor including timing logic responsive to said next process indicator to make said next process the current process for execution after its scheduling time occurs, (vii) means for identifying one or more processes which form a scheduled collection of processes awaiting execution by the processor, (viii) second means for adding a further process to said scheduled collection, and (ix) a second next process indicator to indicate the next process in said scheduled collection to be executed by the processor, the processor being responsive to selected instructions to terminate execution of the current process and to respond to said second next process indicator to make the process indicated therein the current process, whereby the processor is operated to share its processing time between a plurality of concurrent processes; wherein a process may execute one of a plurality of alternative time related components, said microcomputer further comprising means to indicate a time associated with each component, means to test the time associated with each component, and means to determine whether the earliest time associated with a component has yet occurred.

20. The microcomputer according to claim 19 wherein said scheduling system further comprises means to cause descheduling of said process if said earliest time has not yet occurred, and to cause said process to be added to said time-ordered collection.

21. The microcomputer according to claim 20 further comprising means for loading into a memory location corresponding to the process at least one special value to indicate the state of the process and to indicate that the process is one with alternative components.

22. The microcomputer according to claim 21 further comprising means for storing in said memory location corresponding to said process a first special value to indicate that at least one of the alternative components is ready and that the process is to remain scheduled, or a second special value to indicate that the process is descheduled while awaiting an alternative component to become ready.

23. The microcomputer according to claim 19 further comprising means for loading into a memory location corresponding to said process a special value to indicate that none of the alternative components has yet been selected, and means responsive to said special value to select one of the alternative process components when the process is rescheduled.

24. A microcomputer comprising memory and a processor configured to execute a plurality of concurrent processes by said processor in accordance with a plurality of program steps, at least some of said processes being time dependent, the microcomputer including a scheduling system comprising:
 (i) an addressable storage element for indicating a process which is being executed by said processor, said process being referred to as the current process;
 (ii) a timer list coupled to said storage element for identifying one of more processes which form a time-ordered collection awaiting execution by said processor after respective scheduling times for the processes in said collection;
 (iii) a set of storage locations associated with said timer list for indicating scheduling times when the processes in said collection become ready for execution;
 (iv) a control system coupled to said timer list and to said processor to cause said processor to add a further process to said collection at a time-ordered position between a preceding process having an earlier scheduling time and a following process having a later scheduling time;
 (v) a next process indicator to indicate the next process in said time-ordered collection for execution by said processor;
 (vi) a program stage indicator for each concurrent process; said processor including timing logic responsive to said next process indicator to make said next process the current process for execution after its scheduling time occurs;
 (vii) means for identifying one or more processes which form a scheduled collection of processes awaiting execution by the processor;
 (viii) second means for adding a further process to said scheduled collection;
 (ix) a second next process indicator to indicate the next process in said scheduled collection to be executed by the processor, the processor being responsive to selected instructions to terminate execution of the current process and to respond to said second next process indicator to make the process indicated therein the current process, whereby the processor is operated to share its processing time between a plurality of concurrent processes;
 (x) means for specifying a time duration for the execution of a process; and
 (xi) means responsive to said time duration to cause the processor to stop executing the current process after expiration of said time duration and to reschedule that current process by adding it to said scheduled collection.

25. A microcomputer comprising a memory and a processor configured to execute a plurality of concurrent processes in accordance with a plurality of program steps, at least some of said processes being time dependent, including:
 a storage device for indicating the process which is currently being executed by the processor, said process being referred to as the current process;
 a workspace for each process, said workspace including a plurality of first memory locations for recording variables associated with the corresponding process, a second memory location for indicating another process scheduled for execution by the processor, said second memory locations thereby collectively including a linked list of scheduled processes awaiting execution, a third memory location for storing a program stage indicator for the corresponding process, a fourth memory location for indicating the next process on a time-oriented list of processes so that said fourth memory locations collectively include a linked list of time-oriented processes awaiting scheduling, said memory further providing fifth memory locations for storing a respective time for each process on said linked list of time-ordered processes;
 a timing device responsive to time data from said fifth memory location;
 a control device responsive to said timing device for adding a process to said linked list of scheduled processes.

26. The microcomputer according to claim 25 wherein said fifth memory locations are distributed in said workspaces for said processes.

27. The microcomputer according to claim 25 further comprising means for indicating the process at the beginning of said time-oriented linked list, and further including storage means for indicating the time data for the process indicated by said first storage means.

28. A method of operating concurrent processes, at least some of which are time dependent processes, in a computer system having a processor wherein each concurrent process executes a program having a plurality of instructions, said processor including a timer comprising the steps of:
 forming a first pointer for each process to identify the process, forming a second pointer for each process to indicate a program stage for the process, providing an indication of a process which is being executed by said processor, said process being referred to as the current process, identifying a time-ordered collection of time dependent processes each having a respective specified scheduling time when the process may be executed by said processor, providing an indication of said specified scheduling time for each process in the time-ordered collection, the process in said collection having the earliest said specified scheduling time being indicated as the next process, and wherein execution of said current process comprises executing a sequence of instructions including a time related instruction indicating a specified scheduling time before which the current process is not to continue execution and responding to execution of said time related instruction by (a) comparing said specified scheduling time to the time indicated by said timer in said processor to determine whether said specified scheduling time has yet arrived, (b) in response to determining that the specified scheduling time has arrived, continuing execution of the said current process, and (c) in response to determining that the specified scheduling time has not yet arrived, (i) storing said second pointer for the process, (ii) stopping execution of the said current process, (iii) causing the said processor which executed said time related instruction to add the stopped process to said time-ordered collection at a position in the time-ordered collection such that its specified scheduling time forms an ordered sequence of specified times in the collection, and (iv) setting the indication of the current process to indicate a further process, and at a time after the specified scheduling time of said next process, responding to the execution of an instruction stopping the current process by setting the indication of the current process to indicate the said next process at a program stage indicated by the second pointer for the said next process.

29. A method of operating concurrent processes, at least some of which are time dependent processes, in a computer system having at least one processor, said processor including a timer and memory wherein each of said concurrent processes executes a plurality of instructions included in respective programs, the method comprising the steps of:
(a) establishing within the memory a respective workspace for each process, each workspace comprising a plurality of addressable memory locations, and recording in said locations of each workspace variables associated with the corresponding process;
(b) defining a respective first pointer for each process to identify the process;
(c) defining a respective second pointer for each process to indicate a program stage for the process; and
(d) scheduling a plurality of processes for execution by said one processor, including (i) providing an indication of a process which is being executed by said one processor, said process being referred to as the current process, (ii) forming a timeordered linked list of processes awaiting execution by the processor after a respective specified scheduling time indicated for each process in said list, said linked list being formed by providing in the workspace of each process in the list an indication of a specified scheduling time for the process, and an indication of said first pointer for the process with the next specified scheduling time, and wherein execution of said current process comprises executing a sequence of instructions including a time related instruction indicating a specified scheduling time before which the current process is not to continue execution and responding to execution of said time related instruction by (a) comparing said specified scheduling time to the time indicated by said timer in said processor to determine whether said specified scheduling time has yet arrived, (b) in response to determining that the specified scheduling time has arrived continuing execution of the said current process, and (c) in response to determining that the specified scheduling time has not yet arrived (i) storing said second pointer for the process, (ii) stopping execution of said current process, (iii) causing the said one processor which executed said time-related instruction to add the stopped process to said time-ordered collection at a position in the time-ordered collection such that its specified scheduling time forms an ordered sequence of specified scheduling times in the collection, (iv) setting the indication of the current process to indicate a further scheduled process, and (v) at a time after the specified scheduling time of said next process, responding to execution of an instruction stopping the current process by setting the indication of the current process to indicate said next process and executing said next process at a program stage indicated by the second pointer for the said next process.

30. The method according to claim 29 further comprising adding a further process to said linked list by the steps of indicating a scheduling time for said further process, examining the scheduling times of processes already on the list, and adding said further process to the list at a time-ordered position dependent on its scheduling time, said further process being inserted between a preceding process and a following process by providing in the workspace of said preceding process an indication of said first pointer of said further process and providing in the workspace of said further process an indication of said first pointer of the following process.

31. A method of operating concurrent processes, at least some of which are time dependent processes, in a computer system wherein each concurrent process executes a program having a plurality of instructions, said computer system including a timer, comprising the steps of:
forming a first pointer for each process to identify the process;
forming a second pointer for each process to indicate a program stage for the process;
scheduling a plurality of processes for execution by one processor including providing an indication of a process which is being executed by said one processor, said process being referred to as the current process;
identifying a time-ordered collection of processes each having a respective specified scheduling time when the process may be executed by said one processor; and providing an indication of said specified scheduling time for each process in the time-ordered collection, the process in said collection having the earliest scheduling time being indicated as the next process;

wherein execution of said current process comprises executing a sequence of instructions including a time related instruction indicating a specified scheduling time before which the current process is not to continue execution and responding to execution of said time related instruction by (a) comparing said specified scheduling time to the time indicated by said timer in said computer system to determine whether said specified scheduling time has yet arrived, (b) in response to determining that the specified scheduling time has arrived, then continuing execution of the said current process, and (c) in response to determining that the specified scheduling time has not yet arrived, (i) storing said second pointer for the current process, (ii) stopping execution of the said current process, (iii) causing the said one processor which executed same time-related instruction to add the stopped current process to said time-ordered collection at a position in the time-ordered collection such that its scheduling time forms an ordered sequence of scheduling times in the collection, and (iv) setting the indication of the current process to indicate a further scheduled process, and at a time after the specified scheduling time of said next process, responding to execution of an instruction stopping the current process by setting the indication of the current process to indicate the said next process and executing said next process at a program stage indicated by the second pointer for the said next process.

32. A method according to claim 31 wherein the current process continues execution without stopping when on execution of a time related instruction the step of determining whether said scheduling time has yet arrived indicates that the scheduling time has already arrived.

33. The method according to claim 31 wherein said scheduling step further comprises identifying a scheduled collection of processes awaiting execution by the processor and wherein said next process is added to said scheduled collection and removed from said time-ordered collection after its scheduling time.

34. The method according to claim 31 further comprising the steps of indicating a priority for each process and establishing first and second time-ordered collections of processes, said first collection comprising processes of a common first priority and said second collection comprising processes of a common second priority different from said first priority.

35. A method according to claim 31 wherein said next process on a time-ordered collection is removed therefrom when its scheduling time arrives and the process on the time-ordered collection with the next scheduling time is then indicated as the next process.

36. A method according to claim 31 further comprising executing a current process having a program sequence including a time dependent instruction, determining a scheduling time associated with said instruction, and continuing to execute the current process if said scheduling time has already been reached.

37. A microcomputer comprising a timer, memory and a processor configured to execute a plurality of concurrent processes by said processor in accordance with a plurality of program steps, at least some of said processes being time dependent, said time dependent processes including time-related instructions, said time-related instruction including a time value relative to said timer, the microcomputer including a scheduling system comprising:

(i) an addressable storage element for indicating a process which is being executed by said processor, said process being referred to as the current process;

(ii) a timer list coupled to said storage element for identifying one or more processes which form a time-ordered collection awaiting execution by said processor after respective specified scheduling times for the processes in said collection;

(iii) a set of storage locations associated with said timer list for indicating said specified scheduling times when the processes in said collection become ready for execution;

(iv) a control system coupled to said timer list and to said processor to cause said processor to add said current process to said collection at a time-ordered position between a preceding process having an earlier scheduling time and a following process having a later scheduling time;

(v) a next process indicator to indicate the next process in said time-ordered collection for execution by said processor; and (vi) a program stage indicator for each concurrent process;

said processor including timing logic responsive to said next process indicator to make said next process the current process for execution after its scheduling time occurs whereby when said processor executes a time-related instruction, said processor compares said time value in said time-related instruction to the time indicated by said timer, and, in response to said time value in said time-related instruction having arrived in said timer, continuing execution of said current process; in response to said time value in said time related instruction having not arrived, stopping execution of the current process and causing said control system to add said current process to said collection.

38. The microcomputer of claim 37 wherein said next process indicator comprises an addressable memory location.

39. A microcomputer according to claim 37 wherein said memory provides, for each process, a workspace having a plurality of addressable locations including locations for recording variables associated with the respective process, and wherein said addressable storage element for indicating the current process comprises a processor register for temporarily storing a workspace pointer identifying an address of the workspace of the current process.

40. The microcomputer according to claim 39 wherein said workspace includes a prescribed, addressable memory location for storing said program stage indicator.

41. The microcomputer according to claim 39 wherein said timer list for identifying one or more processes comprises a linked list of processes, each process workspace in said time-ordered collection including a link from said linked list, said link pointing to a subsequent process in said time-ordered collection.

42. The microcomputer according to claim 41 wherein each workspace includes a link location for storing link data, further comprising a special value stored in the link location in one of said process workspaces thereby to indicate that the corresponding process is currently the process with the last scheduling time in said time-ordered collection.

43. The microcomputer according to claim 41 further including means for deleting a process from said time-ordered collection and for altering data in said linked list of selected processes thereby to reestablish a link between the processes remaining on said time-ordered collection after said deletion.

44. The microcomputer according to claim 39 wherein each process workspace further includes an addressable location for storing data indicating the scheduling time of the corresponding process.

45. The microcomputer according to claim 39 wherein each process workspace includes means for holding a workspace pointer for another process in a scheduled collection of processes awaiting execution, thereby forming a linked list of scheduled processes awaiting execution.

46. The microcomputer according to claim 45 further comprising means for indicating the first and last processes on said linked list of scheduled processes.

47. The microcomputer according to claim 37 wherein said processes have first and second priorities, and wherein said timer list forms first and second time-ordered collections of processes awaiting execution by the processor, each process in said first time-ordered collection having said first priority, and each process in said second time-ordered collection having said second priority different from said first priority 48. The microcomputer according to claim 37 wherein said scheduling system further includes means for identifying one or more processes which form a scheduled collection of processes awaiting execution by the processor, control means for adding a further process to said scheduled collection, and second next process indicator to indicate the next process in said scheduled collection to be executed by the processor, the processor being responsive to selected instructions to terminate execution of the current process and to respond to said second next process indicator to make the process indicated therein the current process, whereby the processor is operated to share its processing time between a plurality of concurrent processes.

49. The microcomputer according to claim 48 wherein said means for identifying processes identifies first and second scheduled collections of processes, said collections having processes of common first priority and second priority, respectively, said first priority being different from said second priority.

50. The microcomputer according to claim 37 further comprising means for receiving time signals and removing a process from said time-ordered collection when said scheduling time for the process is reached.

51. The microcomputer according to claim 50 further comprising means for identifying processes which form a scheduled collection of processes awaiting execution, and control means for adding a process to the scheduled collection when it is removed from said time-ordered collection.

* * * * *